United States Patent
Takemura et al.

(10) Patent No.: US 9,721,460 B2
(45) Date of Patent: Aug. 1, 2017

(54) IN-VEHICLE SURROUNDING ENVIRONMENT RECOGNITION DEVICE

(71) Applicants: Clarion Co., Ltd., Saitama-shi, Saitama (JP); Nissan Motor Co., Ltd., Yokohama-shi, Kanagawa (JP)

(72) Inventors: Masayuki Takemura, Tokyo (JP); Akira Utagawa, Tokyo (JP); Shoji Muramatsu, Hitachinaka (JP); Masahiro Kiyohara, Tokyo (JP); Yasuhisa Hayakawa, Yokohama (JP); Osamu Fukata, Yokohama (JP)

(73) Assignees: Clarion Co., Ltd., Saitama-shi (JP); Nissan Motor Co., Ltd., Yokohama-shi (JP)

( * ) Notice: Subject to any disclaimer, the term of this patent is extended or adjusted under 35 U.S.C. 154(b) by 315 days.

(21) Appl. No.: 14/417,677

(22) PCT Filed: Jul. 11, 2013

(86) PCT No.: PCT/JP2013/068935
§ 371 (c)(1),
(2) Date: Jan. 27, 2015

(87) PCT Pub. No.: WO2014/017302
PCT Pub. Date: Jan. 30, 2014

(65) Prior Publication Data
US 2015/0161881 A1 Jun. 11, 2015

(30) Foreign Application Priority Data

Jul. 27, 2012 (JP) .................. 2012-167603

(51) Int. Cl.
*G08B 29/18* (2006.01)
*G06K 9/00* (2006.01)
*G08G 1/16* (2006.01)

(52) U.S. Cl.
CPC ....... *G08B 29/185* (2013.01); *G06K 9/00791* (2013.01); *G06K 9/00798* (2013.01);
(Continued)

(58) Field of Classification Search
CPC ............. G08B 29/185; G06K 9/00791; G06K 9/00798; G06K 9/00805; G08G 1/166;
(Continued)

(56) References Cited

U.S. PATENT DOCUMENTS 6,076,034 A * 6/2000 Satoh ................. B60K 31/0058
180/168
6,081,223 A * 6/2000 Kitahara ............... G01S 13/931
340/436

(Continued)

FOREIGN PATENT DOCUMENTS

JP 2000-99896 A 4/2000
JP 2007-265016 A 10/2007
(Continued)

OTHER PUBLICATIONS

Extended European Search Report issued in counterpart European Application No. 13822459.7 dated Sep. 2, 2016 (eleven (11) pages).
(Continued)

*Primary Examiner* — Sath V Perungavoor
*Assistant Examiner* — Howard D Brown, Jr.
(74) *Attorney, Agent, or Firm* — Crowell & Moring LLP

(57) ABSTRACT

An in-vehicle surrounding environment recognition device includes: a photographic unit that photographs a road surface around a vehicle and acquires a photographic image; an application execution unit that recognizes another vehicle on the basis of the photographic image, and detects a relative speed of the other vehicle with respect to the vehicle; a reflection determination unit that, on the basis of the photographic image, determines upon presence or absence of a
(Continued)

reflection of a background object from the road surface; a warning control unit that controls output of a warning signal on the basis of the result of recognition of the other vehicle; and a warning prevention adjustment unit that suppresses output of the warning signal on the basis of the relative speed of the other vehicle, if it has been determined that there is the reflection of the background object from the road surface.

10 Claims, 45 Drawing Sheets

(52) U.S. Cl.
CPC ......... *G06K 9/00805* (2013.01); *G08G 1/165* (2013.01); *G08G 1/166* (2013.01); *G08G 1/167* (2013.01); *G08G 1/168* (2013.01); *G06T 2207/30256* (2013.01); *G06T 2207/30261* (2013.01)

(58) Field of Classification Search
CPC ........ G08G 1/165; G08G 1/167; G08G 1/168; G06T 2207/30261; G06T 2207/30256
See application file for complete search history.

(56) References Cited

U.S. PATENT DOCUMENTS

| | | | |
|---|---|---|---|
| 2002/0110261 A1* | 8/2002 | Yanai | B60R 21/0132 382/104 |
| 2004/0218401 A1* | 11/2004 | Okubo | B60Q 1/085 362/526 |
| 2006/0184297 A1 | 8/2006 | Higgins-Luthman | |
| 2008/0040039 A1* | 2/2008 | Takagi | G01S 17/936 701/300 |
| 2008/0205706 A1 | 8/2008 | Hongo | |
| 2008/0272898 A1* | 11/2008 | Irion | B60Q 9/008 340/436 |
| 2009/0027180 A1 | 1/2009 | Shibata et al. | |
| 2011/0224878 A1* | 9/2011 | Nakamura | F16H 61/66259 701/56 |
| 2012/0070071 A1 | 3/2012 | Rankin et al. | |
| 2012/0099766 A1 | 4/2012 | Klein et al. | |
| 2012/0123657 A1* | 5/2012 | Taguchi | B60K 31/00 701/93 |
| 2012/0161987 A1* | 6/2012 | Yoo | G08G 1/042 340/933 |
| 2013/0013164 A1* | 1/2013 | Taguchi | B60W 30/143 701/96 |
| 2013/0188794 A1* | 7/2013 | Kawamata | G01S 3/803 381/56 |

FOREIGN PATENT DOCUMENTS

| | | |
|---|---|---|
| JP | 2007-272292 A | 10/2007 |
| JP | 2007-309832 A | 11/2007 |
| JP | 2008-94377 A | 4/2008 |
| JP | 2008-219063 A | 9/2008 |
| JP | 2008-287692 A | 11/2008 |
| JP | 2009-31053 A | 2/2009 |
| JP | 2010-36757 A | 2/2010 |
| JP | 2012-118874 A | 6/2012 |
| WO | WO 03/093857 A2 | 11/2003 |

OTHER PUBLICATIONS

Cover page of EP 1 504 276 A0 published Feb. 9, 2005 (one (1) page).
International Search Report (PCT/ISA/210) dated Aug. 20, 2013, with English translation (four (4) pages).
Japanese-language Office Action issued in counterpart Japanese Application No. 2014-526848 dated Apr. 18, 2017 with English translation (6 pages).

* cited by examiner

FIG.12
(a) RELATIVE SPEED
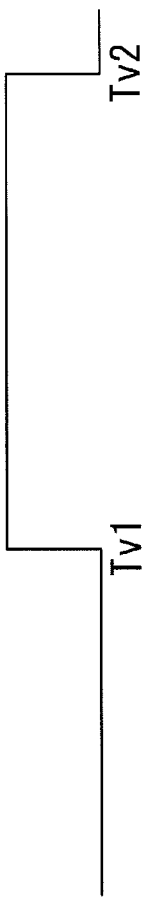
(b) REFLECTION DETERMINATION RESULT
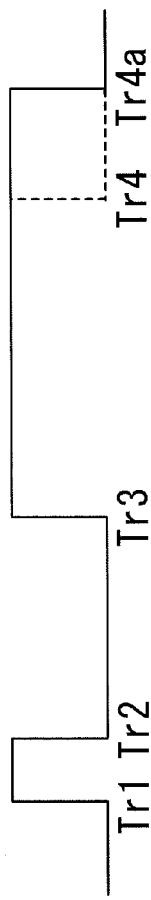
(c) OTHER VEHICLE RECOGNITION
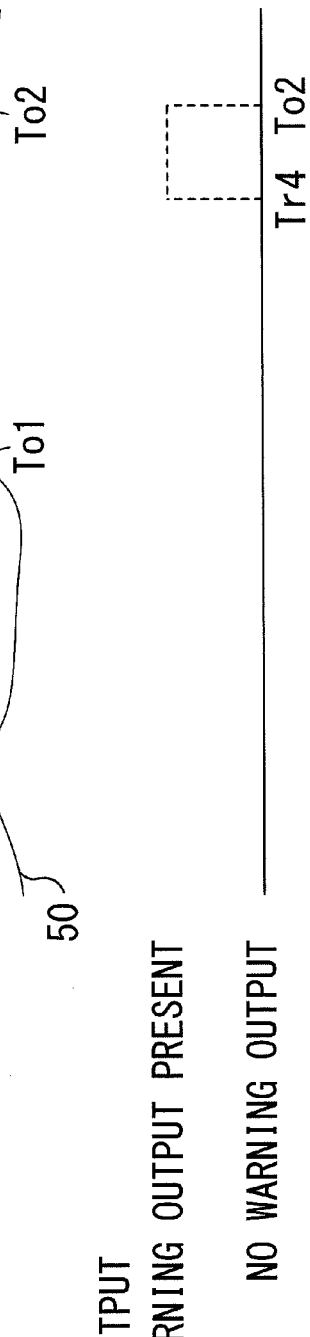
(d) WARNING OUTPUT

FIG.34
(A)
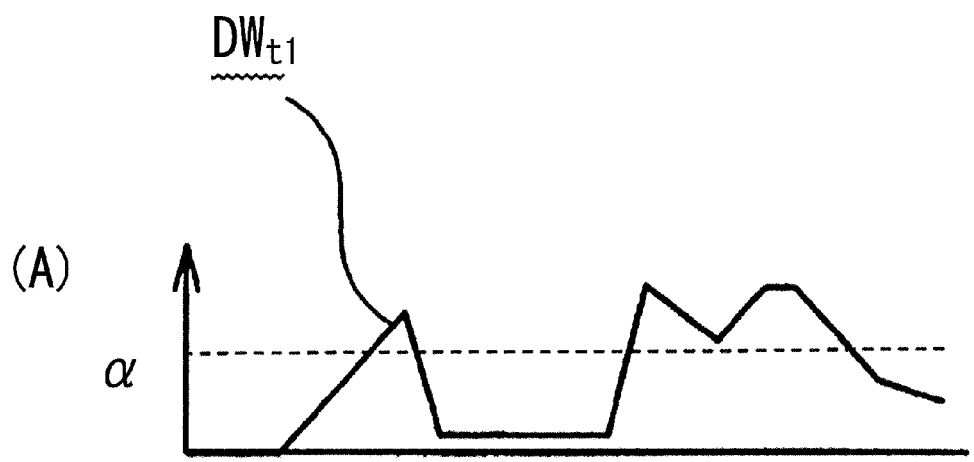
DW$_{t1}$
$\alpha$
(B)
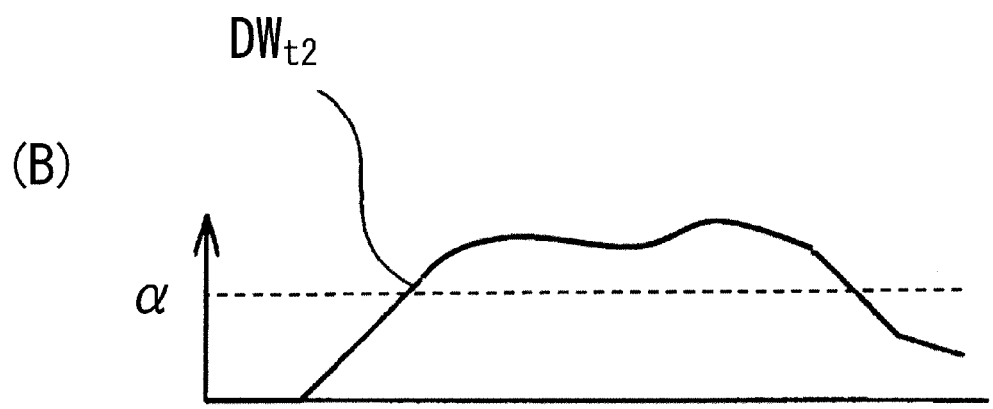
DW$_{t2}$
$\alpha$

FIG.43

(a) RELATIVE SPEED
   WITHIN PREDETERMINED RANGE
   OUTSIDE PREDETERMINED RANGE
   Tv1    Tv2

(b) REFLECTION DETERMINATION RESULT
   REFLECTION PRESENT
   REFLECTION ABSENT
   Tr1 Tr2    Tr3    Tr4 Tr4a (c) OTHER VEHICLE RECOGNITION
   THRESHOLD VALUE Th1
   THRESHOLD VALUE Th0
   Tr1    Tr2 Tr3    To3    To4a Tr4a
   50                              Tr4 To4

(d) WARNING OUTPUT
   WARNING OUTPUT PRESENT
   NO WARNING OUTPUT
   To3    To4a To4

FIG.44

(a) RELATIVE SPEED

WITHIN PREDETERMINED RANGE — Tv1 — Tv2

OUTSIDE PREDETERMINED RANGE (b) REFLECTION DETERMINATION RESULT

REFLECTION PRESENT — Tr1 Tr2 — Tr3 — Tr4

REFLECTION ABSENT (c) OTHER VEHICLE RECOGNITION

THRESHOLD VALUE Th1
THRESHOLD VALUE Th0

Tr1, Tr2, Tr3, To3, Tr4, To4a, Tv2, To4
50

(d) WARNING OUTPUT

WARNING OUTPUT PRESENT — To4a To4

NO WARNING OUTPUT — To3

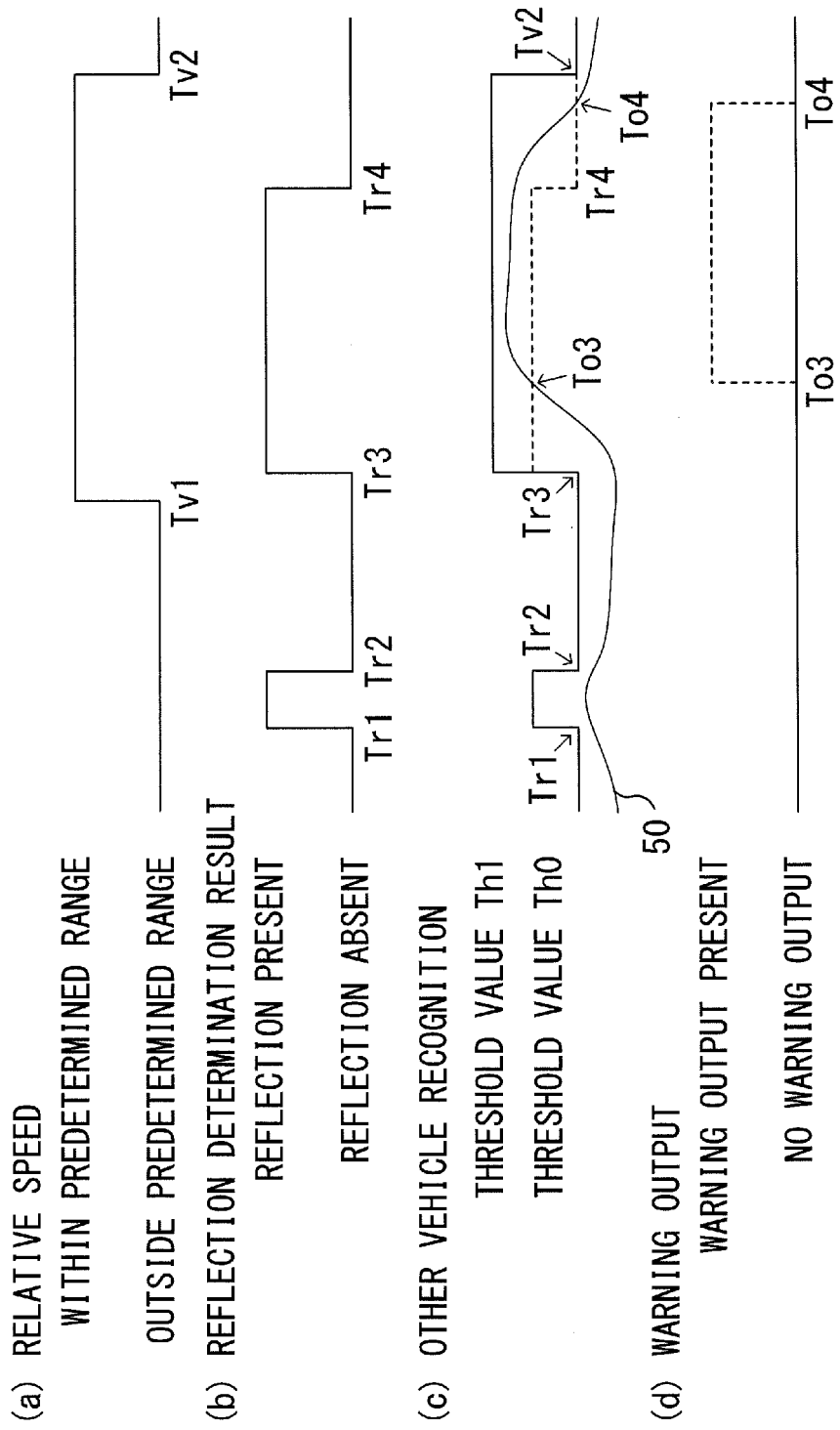

IN-VEHICLE SURROUNDING ENVIRONMENT RECOGNITION DEVICE

TECHNICAL FIELD

The present invention relates to an in-vehicle surrounding environment recognition device.

BACKGROUND ART

In the prior art a device has been proposed that is mounted to a vehicle, that detects other vehicles from an image that has been photographed with a camera, and that outputs a warning when there is a possibility of a collision with the subject vehicle. In relation to this type of device, a technique is per se known that detects regions of reflection from the road surface due to headlights in the image, and that, by performing processing while eliminating these regions, detects the fronts of vehicles and the rears of vehicles accurately, even when such reflections from the road surface due to headlights have spread out and become merged together (refer to Patent Document #1).

CITATION LIST

Patent Literature

Patent Document #1: Japanese Laid-Open Patent Publication No. 2007-265016.

SUMMARY OF INVENTION

Technical Problem

With such a prior art device, if the reflection coefficient is high due to the road surface being wet or the like, sometimes it happens that a background object that is reflected from the road surface is mistakenly detected as being a vehicle, and this is undesirable. However, the technique described in Patent Document #1 is a method for preventing erroneous detection by extracting high luminance regions in which headlights are being reflected from the road surface. Accordingly, it is not possible to prevent warnings being outputted at erroneous timings due to reflections from the road surface of background objects that are not of high luminance being erroneously detected as being vehicles.

Solution to Problem

An in-vehicle surrounding environment recognition device according to a first aspect of the present invention comprises: a photographic unit that photographs a road surface around a vehicle and acquires a photographic image; an application execution unit that recognizes another vehicle that is traveling near the vehicle on the basis of the photographic image acquired by the photographic unit, and detects a relative speed of the other vehicle with respect to the vehicle; a reflection determination unit that, on the basis of the photographic image, determines upon presence or absence of a reflection of a background object from the road surface; a warning control unit that controls output of a warning signal on the basis of the result of recognition of the other vehicle by the application execution unit; and a warning prevention adjustment unit that suppresses output of the warning signal on the basis of the relative speed of the other vehicle, if it has been determined by the reflection determination unit that there is the reflection of the background object from the road surface.

According to a second aspect of the present invention, in the in-vehicle surrounding environment recognition device of the first aspect, it is preferred that the warning prevention adjustment unit adjusts a level of suppression of output of the warning signal by changing a condition for the reflection determination unit to determine upon the presence or absence of the reflection of the background object from the road surface, according to the relative speed of the other vehicle.

According to a third aspect of the present invention, the in-vehicle surrounding environment recognition device of the second aspect further comprises an area setting unit that sets a background region and a reflection region in the photographic image. In this in-vehicle surrounding environment recognition device, it is preferred that the reflection determination unit determines upon the presence or absence of the reflection of the background object from the road surface by comparing an image within the background region in the photographic image, and an image within the reflected region in the photographic image, and by determining whether or not their correlation is greater than or equal to a predetermined threshold value. In addition, it is preferred that the warning prevention adjustment unit adjusts the level of suppression of output of the warning signal by changing the threshold value according to the relative speed of the other vehicle.

According to a fourth aspect of the present invention, the in-vehicle surrounding environment recognition device of the second aspect further comprises: an area setting unit that sets a background region and a reflection region in the photographic image; and a feature amount calculation unit that detects edges that satisfy a predetermined detection condition, both in an image within the background region in the photographic image, and in an image within the reflection region in the photographic image, and that calculates feature amounts for both of the background region and the reflection region corresponding to the edges that have been detected therein. In this in-vehicle surrounding environment recognition device, it is preferred that the reflection determination unit determines upon the presence or absence of the reflection of the background object from the road surface by comparing the feature amount of the background region and the feature amount of the reflection region. In addition, it is preferred that the warning prevention adjustment unit adjusts the level of suppression of output of the warning signal by changing the detection condition according to the relative speed of the other vehicle.

According to a fifth aspect of the present invention, in the in-vehicle surrounding environment recognition device of the first aspect, it is preferred that the warning prevention adjustment unit adjusts the level of suppression of output of the warning signal by changing a condition for the application execution unit to recognize the other vehicle according to the relative speed of the other vehicle.

According to a sixth aspect of the present invention, in the in-vehicle surrounding environment recognition device of the fifth aspect, it is preferred that the application execution unit recognizes the other vehicle by making a determination as to whether or not an image information value based upon an image within a detection region set in the photographic image is greater than or equal to a predetermined threshold value. And it is preferred that the warning prevention adjustment unit adjusts the level of suppression of output of the warning signal by changing the threshold value according to the relative speed of the other vehicle.

According to the seventh aspect of the present invention, in the in-vehicle surrounding environment recognition device of the fifth aspect, it is preferred that the application execution unit, if an image information value based upon an image within a detection region set in the photographic image satisfies a predetermined detection condition, detects this image information value as being a subject for detection, and recognizes the other vehicle on the basis of the image information value that has been detected. And it is preferred that the warning prevention adjustment unit adjusts the level of suppression of output of the warning signal by changing the detection condition according to the relative speed of the other vehicle.

According to an eighth aspect of the present invention, in the in-vehicle surrounding environment recognition device of the first aspect, it is preferred that, when the reflection determination unit has determined that there is the reflection of the background object from the road surface, and subsequently has determined that there is no reflection of the background object from the road surface, the warning prevention adjustment unit adjusts the level of suppression of output of the warning signal by performing the suppression of output of the warning signal prolongedly according to the relative speed of the other vehicle.

According to a ninth aspect of the present invention, in the in-vehicle surrounding environment recognition device according to any one of the first through eighth aspects, it is preferred that the warning prevention adjustment unit changes the level of suppression of output of the warning signal according to whether the relative speed of the other vehicle satisfies or does not satisfy a predetermined speed condition.

According to a tenth aspect of the present invention, in the in-vehicle surrounding environment recognition device of the ninth aspect, it is preferred that the speed condition includes at least one of the relative speed of the other vehicle being within a predetermined range, and fluctuation of the relative speed of the other vehicle being within a predetermined range.

An in-vehicle surrounding environment recognition device according to an eleventh aspect of the present invention comprises: a photographic unit that photographs a road surface around a vehicle and acquires a photographic image; an application execution unit that recognizes another vehicle that is traveling near the vehicle on the basis of the photographic image acquired by the photographic unit; and a reflection determination unit that distinguishes a background region and a reflection region of the photographic image, and determines upon presence or absence of a reflection of a background object from the road surface on the basis of correlation between image characteristics of those regions, and, if it has been determined by the reflection determination unit that the reflection of the background object from the road surface is present, recognition of the other vehicle by the application execution unit is suppressed.

Advantageous Effects of the Invention

According to the present invention, it is possible to prevent warnings at erroneous timings from being outputted due to the reflections of background objects from the road surface being erroneously detected as being vehicles.

BRIEF DESCRIPTION OF THE DRAWINGS

FIG. 12 A figure for explanation of the beneficial effects of reduction of erroneous warnings, obtained according to the first embodiment.

FIG. 16($a$) is a plan view showing the state of shifting of the vehicle, and FIG. 16($b$) is a figure showing a summary of position matching.

FIG. 25(a) is a plan view showing the positional relationships of detection regions and so on, and FIG. 25(b) is a perspective view showing the positional relationships of the detection regions and so on in actual space.

FIG. 26(a) is a figure showing the positional relationships of a subject line, a reference line, a subject point, and a reference point in a bird's-eye view image, and FIG. 26(b) is a figure showing the positional relationships of the subject line, the reference line, the subject point, and the reference point in actual space.

FIG. 27(a) is a figure showing a detection region in a bird's-eye view image, and FIG. 27(b) is a figure showing the positional relationships of a subject line, a reference line, a subject point, and a reference point in the bird's-eye view image.

FIG. 28(a) is a figure showing the luminance distribution when a three dimensional body (i.e. a vehicle) is present in a detection region, and FIG. 28(b) is a figure showing the luminance distribution when no three dimensional body is present in the detection region.

FIG. 34(A) is a figure showing an example of differential waveform information when another vehicle is present within a detection region, and FIG. 34(B) is a figure showing an example of differential waveform information when no other vehicle is present within the detection region, and a layer of water has been formed therein;

FIG. 43 A further figure for explanation of the beneficial effects of reducing erroneous warning that are obtained according to the second embodiment, and shows an example of a case in which the level of warning prevention is adjusted by using a method (B).

FIG. 44 A yet further figure for explanation of the beneficial effects of reducing erroneous warning that are obtained according to the second embodiment, and shows an example of a case in which the level of warning prevention is adjusted by using a method (C).

FIG. 45 An even further figure for explanation of the beneficial effects of reducing erroneous warning that are obtained according to the second embodiment, and shows an example of a case in which the level of warning prevention is adjusted by using a combination of the above method (A) and the above method (C).

DESCRIPTION OF EMBODIMENTS

Embodiment #1

Figure 1:
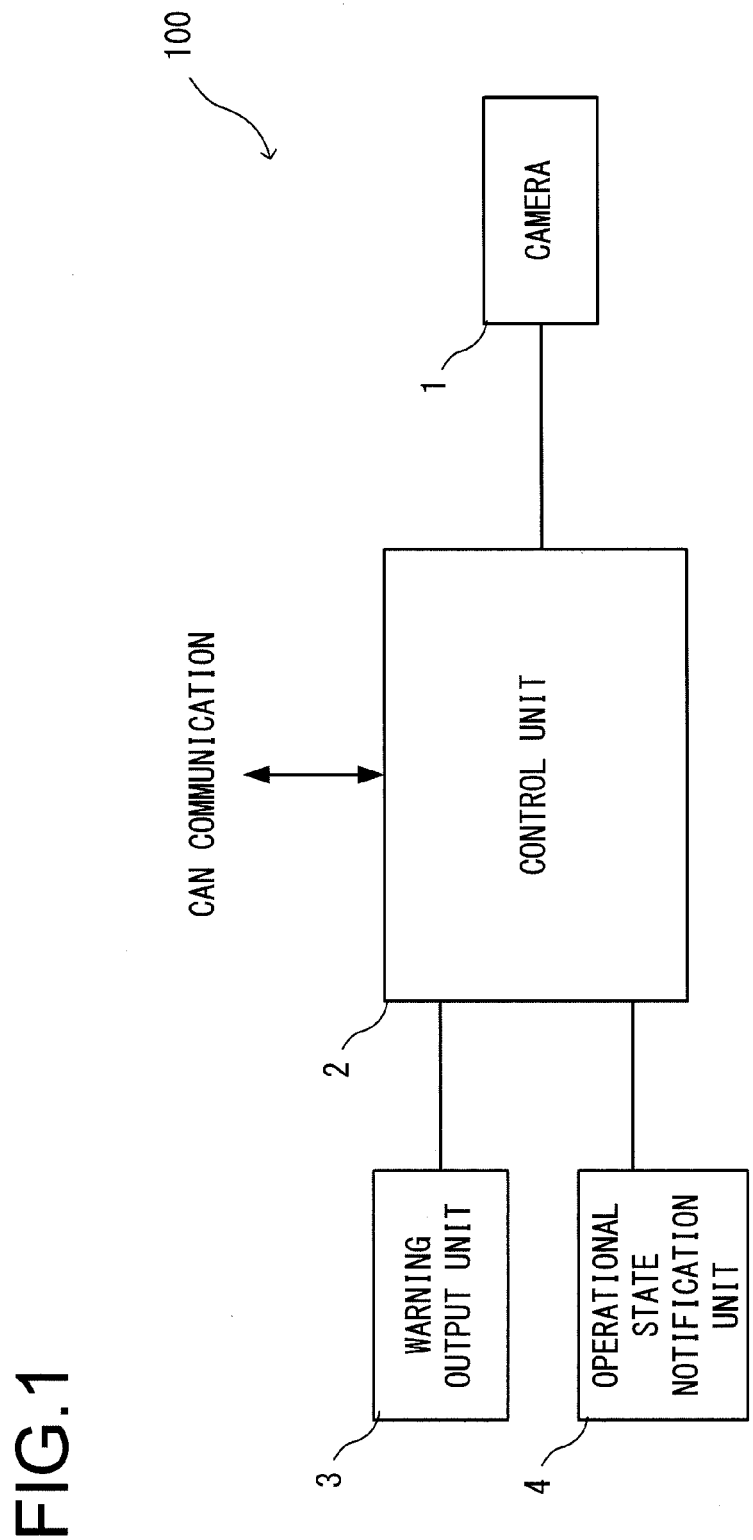
FIG. 1 A block diagram showing the structure of an in-vehicle surrounding environment recognition device according to an embodiment of the present invention.

FIG. 1 is a block diagram showing the structure of an in-vehicle surrounding environment recognition device 100 according to an embodiment of the present invention. The in-vehicle surrounding environment recognition device 100 is mounted to a vehicle for use, and comprises a camera 1, a control unit 2, a warning output unit 3, and an operational state notification unit 4.

The camera 1 is installed so as to face toward the rear of the vehicle, and photographs an image within a photographic region that includes the road surface behind the vehicle, at predetermined time intervals. An imaging element such as, for example, a CCD or a CMOS or the like is used in this camera 1. The photographic image acquired by the camera 1 is outputted from the camera 1 to the control unit 2.

Figure 2:
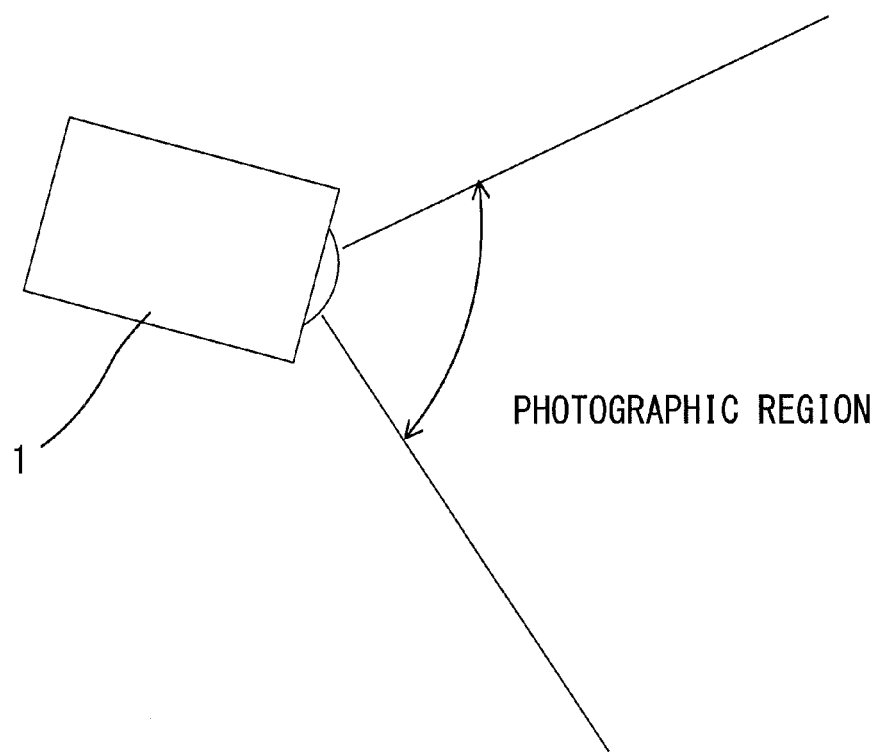
FIG. 2 A figure showing a region that is photographed by a camera.

FIG. 2 is a figure showing the region photographed by the camera 1, and shows the situation when the camera 1 is seen from the side. In the photographic region, the camera 1 photographs an image that includes the road surface behind the vehicle. Here, the photographic region of the camera 1 (i.e. its angle of view) is set to be comparatively wide, so that it can photograph the road surface behind the vehicle over a sufficiently broad range in both the left and right directions.

Figure 3:
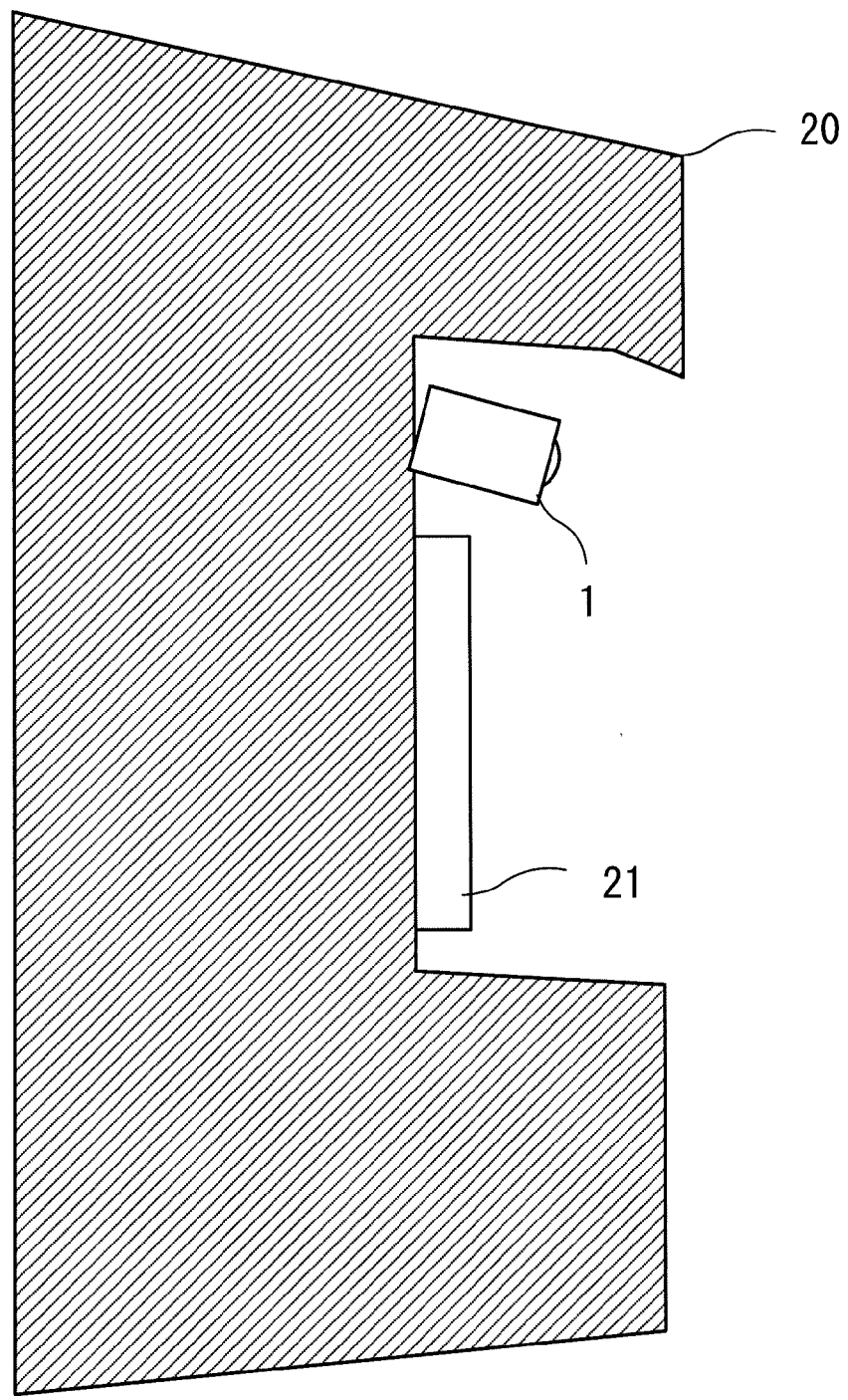
FIG. 3 A figure showing an example of an attachment position for the camera.

FIG. 3 is a figure showing an example of the position of attachment of the camera 1. At the rear portion of the subject vehicle, a number plate 21 is installed to the vehicle body 20. The camera 1 is attached at a position directly above this number plate 21, pointing slantingly downward. It should be understood that the position of attachment shown here is only an example; it would also be acceptable to attach the camera 1 in some other position. This technique could be also applied to a side camera or to a front camera.

The control unit 2 performs predetermined image processing upon the photographic image from the camera 1, and performs control of various kinds according to the results of this processing. Due to this control performed by the control unit 2, various kinds of functions are implemented by the in-vehicle surrounding environment recognition device 100, such as, for example, lane recognition, other vehicle recognition, pedestrian detection, sign detection, right-turn collision prevention detection, parking box recognition, and moving body detection.

The warning output unit 3 is a section for outputting a warning to the driver of the vehicle via a warning lamp or a warning buzzer or the like. The operation of this warning output unit 3 is controlled by the control unit 2. For example if, in the lane recognition mentioned above, it has been determined that the subject vehicle appears to be deviating from the road lane upon which it is traveling, or if, in the other vehicle detection, the pedestrian detection, the right-turn collision prevention, the moving body detection, or the like, a vehicle has been detected for which there is a possibility of collision with the subject vehicle, then a warning is outputted from the warning output unit 3 according to control by the control unit 2.

The operational state notification unit 4 is a section for notifying the operational state of the in-vehicle surrounding environment recognition device 100 to the driver of the vehicle. For example, if some predetermined condition for operation is not satisfied and the in-vehicle surrounding environment recognition device 100 is in the non-operational state, then, due to control by the control unit 2, a lamp that is installed in the vicinity of the driver's seat and that serves as the operational state notification unit 4 may be illuminated. Due to this, the fact that the in-vehicle surrounding environment recognition device 100 is in the non-operational state is notified to the driver.

Next, the warning prevention that is performed by the in-vehicle surrounding environment recognition device 100 when a reflection from the road surface is present will be explained. During detection of bodies by the previously mentioned other vehicle recognition unit, by the pedestrian detection unit, by the moving body detection unit, or the like, if the road surface is wet and the coefficient of reflection is high or the like, then sometimes it may happen that a background object of some type that is a background portion in the photographic image may be reflected by a layer of water or the like that has been formed upon the road surface. In this type of case, mistaken detection may undesirably occur in which the background object that has been reflected by the road surface is taken as a subject to be recognized, and in this case sometimes it may happen that a warning to the driver is outputted at an erroneous timing. Accordingly, the presence or absence of a reflection of a background object due to such a layer of water or the like upon the road surface is determined by the in-vehicle surrounding environment recognition device 100, and if it is determined that such a reflection is present, then warning output is suppressed. Due to this, output of a warning at an erroneous timing due to the reflection of a background object from the road surface being mistakenly detected as being another vehicle is prevented.

Figure 4:
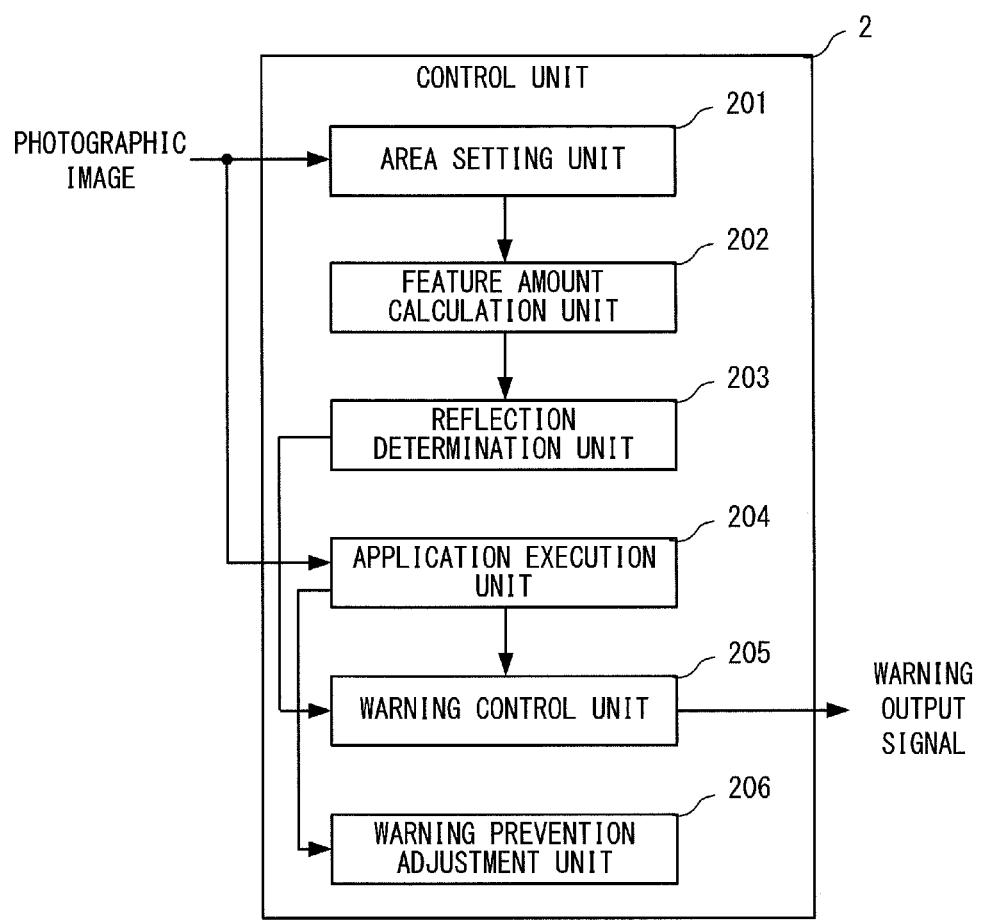
FIG. 4 A control block diagram related to warning prevention when a reflection from the road surface is present.

FIG. 4 is a control block diagram for the control unit 2 related to warning prevention when a reflection from the road surface is present. In relation to such warning prevention when a reflection from the road surface is present, the control unit 2 comprises the following control blocks: an area setting unit 201, a feature amount calculation unit 202, a reflection determination unit 203, an application execution unit 204, a warning control unit 205, and a warning prevention adjustment unit 206. For example, the control blocks of FIG. 4 may be implemented by programs corresponding to these control blocks being executed by a microcomputer in the control unit 2.

Figure 7:
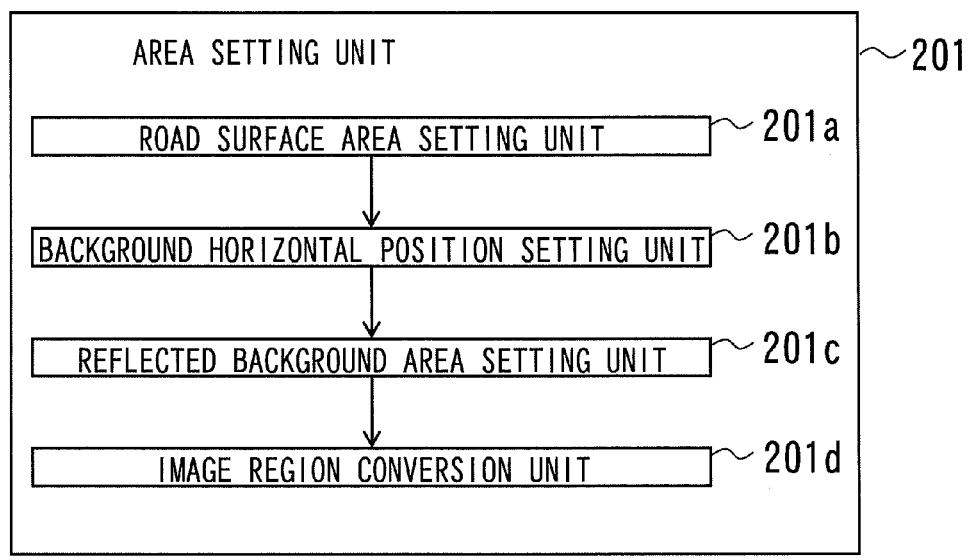
FIG. 7 A figure showing an example of functional blocks of an area setting unit.

On the photographic image that has been acquired by the camera 1, the area setting unit 201 sets a plurality of background regions in the background portion, and sets a plurality of reflection regions upon the road surface to correspond to these background regions, on both the left and the right. FIG. 7 is a figure showing an example of functional blocks of the area setting unit 201. As shown in FIG. 7, for example, the area setting unit 201 may comprise a road surface area setting unit 201a, a background horizontal position setting unit 201b, a reflected background area setting unit 201c, and an image region conversion unit 201d.

Figure 11:
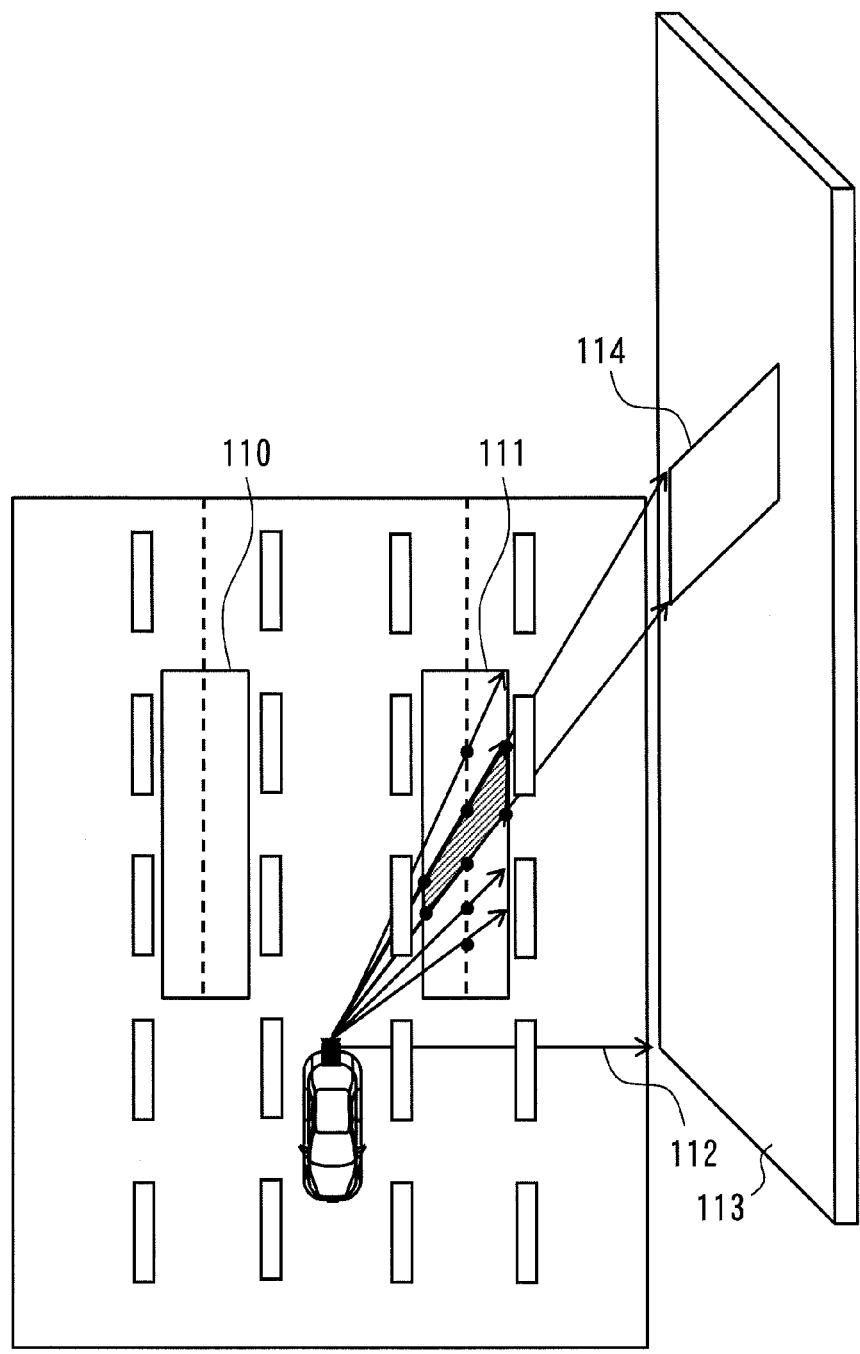
FIG. 11 A figure for explanation of the setting of a road surface region and a background region in three dimensions.

On the photographic image that has been acquired by the camera 1, road surface regions of adjacent road lanes that are to be employed for other vehicle recognition are set by the road surface area setting unit 201a in the area setting unit 201. FIG. 11 is a figure for explanation of the setting of the road surface regions and the background regions in three dimensions. As shown in FIG. 11, in order to detect vehicles in the left and right adjacent road lanes, left and right processing regions 110 and 111 centered on the position of the camera of the subject vehicle are set by the road surface area setting unit 201a, and a plurality of local regions are set by further subdividing each of these road surface regions for vehicle detection. After these road surface regions have been set, the positions of the background where it is reflected from the road surface are specified by the reflected background area setting unit 201c by using the characteristic of specular reflection that the angle of incidence and the angle of reflection are equal, since the camera position on the subject vehicle and the three dimensional positions of the road surface regions are already known. However, while it is possible to calculate the vector directions that have been subjected to specular reflection by the road surface from the camera on the subject vehicle, this procedure is not capable of specifying at what horizontal position from the subject vehicle camera the background is. In other words, whether a background that is reflected by the road surface is an obstacle that is very close, or whether it is a street light that is twenty meters away, is unknown. Due to this, it will be supposed that the horizontal position is set by the background horizontal position setting unit 201b to some prescribed value that is provided. Under the condition that a background to be reflected is somewhat specified, it would also be acceptable to determine upon the presence of reflection from a water layer at higher accuracy by specifying this horizontal position dynamically. However it would be possible to permit some limited deviation of the processing region, even if some prescribed value is provided. Supposing that the horizontal position 112 has been determined by the reflected background area setting unit 201c, and that a large wall 113 is standing there as shown in FIG. 11, then the reflection vectors at the vertices of the road surface local region previously obtained are prolonged, and the three dimensional position 114 at which they meet the wall 113 is estimated. Estimation calculation of the reflected background regions is implemented in this manner. Finally, since in the previous explanation the estimation calculation was formulated in world coordinates taking the subject vehicle as the center, at what positions they are in the image is determined for each of the regions by the image region conversion unit 201d.

Figure 8:
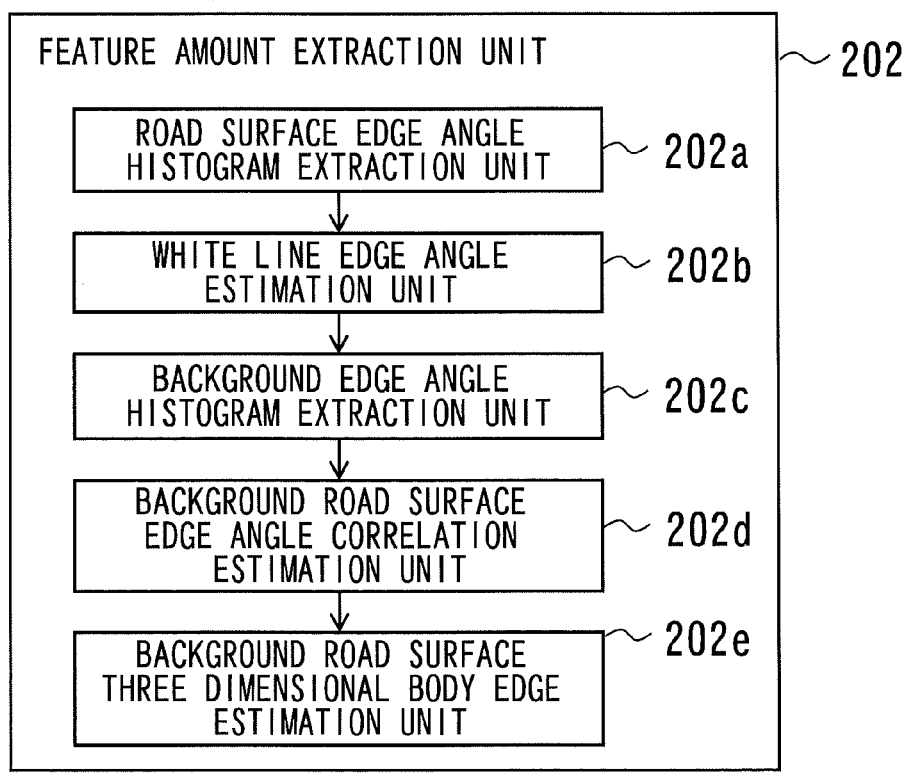
FIG. 8 A figure showing an example of functional blocks of a feature amount calculation unit.

For each of the background regions and the reflection regions that have been set by the area setting unit 201, the feature amount calculation unit 202 calculates feature amounts that give the special characteristics of the image within each of these regions. FIG. 8 is a figure showing an example of functional blocks of the feature amount calculation unit 202. As shown in FIG. 8, for example, the feature amount calculation unit 202 may comprise a road surface edge angle histogram extraction unit 202a, a white line edge angle estimation unit 202b, a background edge angle histogram extraction unit 202c, a background road surface edge angle correlation estimation unit 202d, and a background road surface three dimensional body edge estimation unit 202e.

Figure 9:
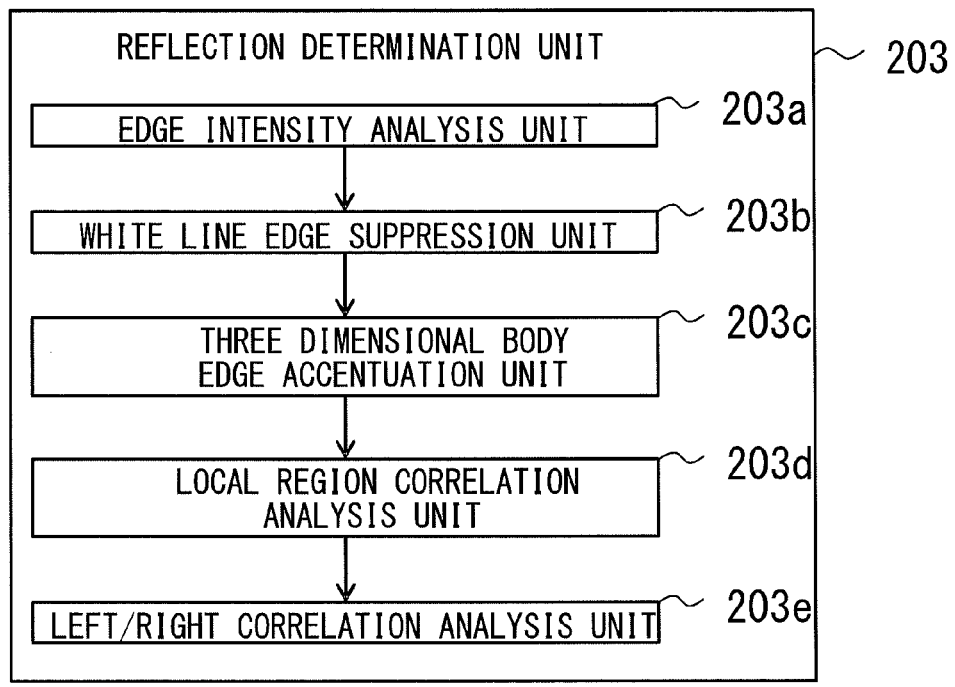
FIG. 9 A figure showing an example of functional blocks of a reflection determination unit.

On the basis of the feature amounts calculated by the feature amount calculation unit 202, the reflection determination unit 203 compares together corresponding pairs of images within the background regions in the photographic image, and images within the reflection regions in the photographic image. And, from the results of these comparisons, the reflection determination unit 203 determines upon the presence or absence of a reflection of a background object from the road surface, and, if it has determined that a reflection is present, notifies the warning control unit 205 to that effect. FIG. 9 is a figure showing an example of functional blocks of the reflection determination unit 203. As shown in FIG. 9, the reflection determination unit 203, for example, may comprise an edge intensity analysis unit 203a, a white line edge suppression unit 203b, a three dimensional body edge accentuation unit 203c, a local region correlation analysis unit 203d, and a left/right correlation analysis unit 203e.

Figure 10:
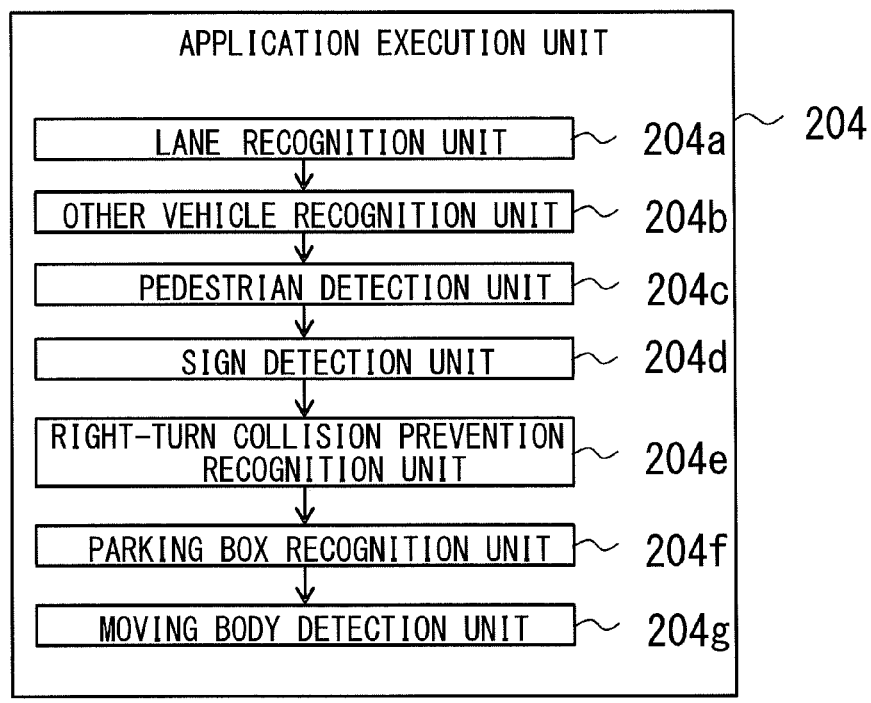
FIG. 10 A figure showing an example of functional blocks of an application execution unit.

FIG. 10 is a figure showing an example of functional blocks of the application execution unit 204. As shown in FIG. 10, the application execution unit 204 may, for example, comprise a lane recognition unit 204a, an other vehicle recognition unit 204b, a pedestrian detection unit 204c, a sign detection unit 204d, an right-turn collision prevention recognition unit 204e, a parking box recognition unit 204f, and a moving body detection unit 204g.

The lane recognition unit 204a recognizes lane to the left and the right of the subject vehicle on the basis of the photographic image that has been acquired by the camera 1. A determination is made as to whether or not the vehicle appears to be deviating from its road lane by extracting white line feature amounts from the image that has been captured, by extracting straight lines on which these white line feature amounts are lined up, and finally by calculating the relative position and the relative attitude of the subject vehicle and the white lines in world coordinates from the lines in the image. If it is forecast that the vehicle is deviating from its road lane, then a command for warning output is issued to the warning control unit 205.

On the basis of the photographic image that has been acquired by the camera 1, the other vehicle recognition unit 204b recognizes other vehicles that are present leftward and rearward, or rightward and rearward, of the subject vehicle. At this time, by executing other vehicle recognition processing as will be explained in detail hereinafter, the application execution unit 204 recognizes other vehicles on the basis of image information values based upon images within the detection regions set within the photographic image, and also detects the relative speeds with respect to the subject vehicle of the other vehicles that have been thus recognized. And, on the basis of the results of this other vehicle recognition, the application execution unit 204 determines upon the presence or absence of other vehicles for which there is a possibility of collision with the subject vehicle. For example, if it seems that the subject vehicle is going to start to change its road lane, and some other vehicle that is present in the direction of this road lane change is approaching the subject vehicle, then it is determined that there is a possibility of collision with the subject vehicle, and a command to output a warning is issued to the warning control unit 205.

On the basis of the captured image that has been acquired by the camera 1, the pedestrian detection unit 204c detects pedestrians within the captured image. And, if a pedestrian with whom there is a possibility of collision is detected in the direction of progression of the subject vehicle, so that there is a danger of a collision, then a warning is issued.

On the basis of the captured image that has been acquired by the camera 1, the sign detection unit 204d detects signs from within the captured image, and transmits the types of the signs to the user via audio or via a display.

When the subject vehicle is making a turn at an intersection, on the basis of the captured image that has been acquired by the camera 1, the right-turn collision prevention recognition unit 204e recognizes whether an intruding two-wheeled vehicle or the like may be present, and issues a warning if such a two-wheeled vehicle presents a danger of contact with the subject vehicle.

The parking box recognition unit 204f recognizes a parking box with the objective of performing automatic parking or parking assistance, and implements assistance or control for parking the subject vehicle according to the position and the orientation of the parking box.

On the basis of the captured image that has been acquired by the camera 1, the moving body detection unit 204g recognizes a moving body in the neighborhood of the subject vehicle when the vehicle speed is low. If a moving body is detected from the captured image and it has been determined on the basis of its direction of shifting and the behavior of the subject vehicle that the possibility of contact is high, then a command is issued to the warning control unit 205 to output a warning.

According to a command from the application execution unit 204, the warning control unit 205 outputs a warning output signal to the warning output unit 3. And, due to the output of this warning output signal, a warning is outputted to the driver from the warning output unit 3. As has been explained above, due to the operation of the application execution unit 204 and of the warning control unit 205, a warning is implemented by the in-vehicle surrounding environment recognition device 100 when there is a danger of collision with an obstacle or the like.

It should be understood that, if a notification is received from the reflection determination unit 203 to the effect that there is a reflection, then the warning control unit 205 stops output of the warning output signal to the warning output unit 3. At this time, even if a command for output of a warning is issued from the application execution unit 204, no warning output signal is outputted from the warning control unit 205 to the warning output unit 3. Due to this, it is arranged to suppress output of a warning by the warning output unit 3 when there is a reflection of a background object from the road surface.

And, on the basis of the relative speed of the other vehicle as detected by the other vehicle recognition unit 204b of the application execution unit 204, the warning prevention adjustment unit 206 adjusts the level of suppression of the warning output performed by the warning control unit 205 described above. In other words, if the relative speed of the other vehicle is comparatively small, then it is considered that the possibility is high that a background object that is being reflected from the road surface is being mistakenly recognized as another vehicle. Accordingly, in this type of case, by enhancing the level of suppression of the warning output by the warning prevention adjustment unit 206, it is made more difficult for an erroneous warning to be generated due to reflection of a background object. It should be understood that the method for adjustment of the level of this suppression of warning output performed by the warning prevention adjustment unit 206 will be explained subsequently in concrete terms.

Figure 5:
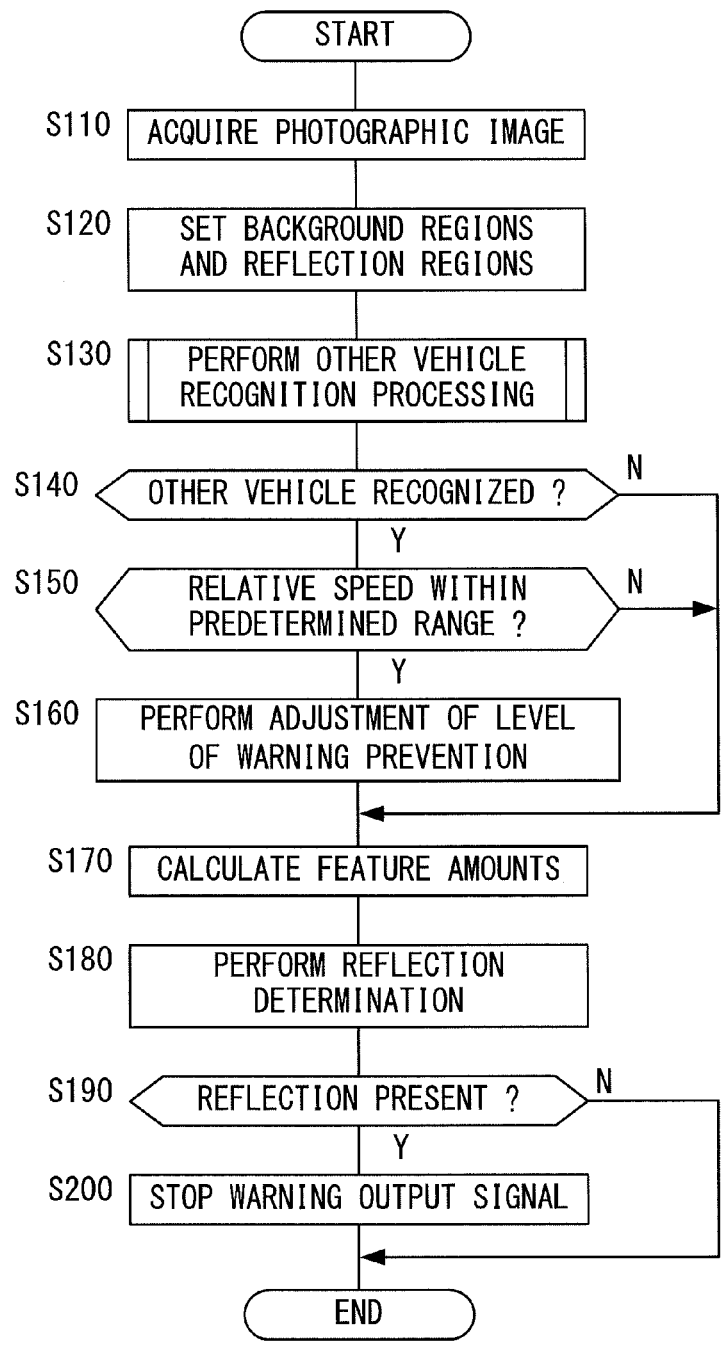
FIG. 5 A flow chart of processing that is executed, in the first embodiment, for warning prevention when a reflection from the road surface is present.

FIG. 5 is a flow chart for processing that is executed for warning prevention when a reflection from the road surface is present, as explained above. During the execution of this application, the processing shown in this flow chart is performed by the control unit 2 on a predetermined processing cycle.

In step S110, using the camera 1, the control unit 2 photographs within a predetermined photographic region including the road surface around the vehicle, and acquires a photographic image. This photographic image is outputted from the camera 1 to the control unit 2, and is used in the subsequent processing.

In step S120, the control unit 2 sets background regions and reflection regions in the photographic image that was acquired in step S110. Here, a plurality of background regions and a plurality of reflection regions are set by the area setting unit 201 in predetermined portions within the photographic image, such as, for example, regions that will be used for rearward road lane detection, for rearward and sideways vehicle recognition, and for right-turn collision prevention recognition. Apart from this, it is also supposed as a premise that a front camera is used if pedestrian detection and sign detection are to be performed. It would also be acceptable to employ either a front camera, or a side camera, or a rear camera in relation to lane recognition, other vehicle recognition, and moving body detection. Moreover, either a side camera or a rear camera could be used for right-turn collision prevention and for parking box recognition. Whatever camera may be used, it can be applied without modification in relation to the fundamental techniques and concepts herein.

Figure 6:
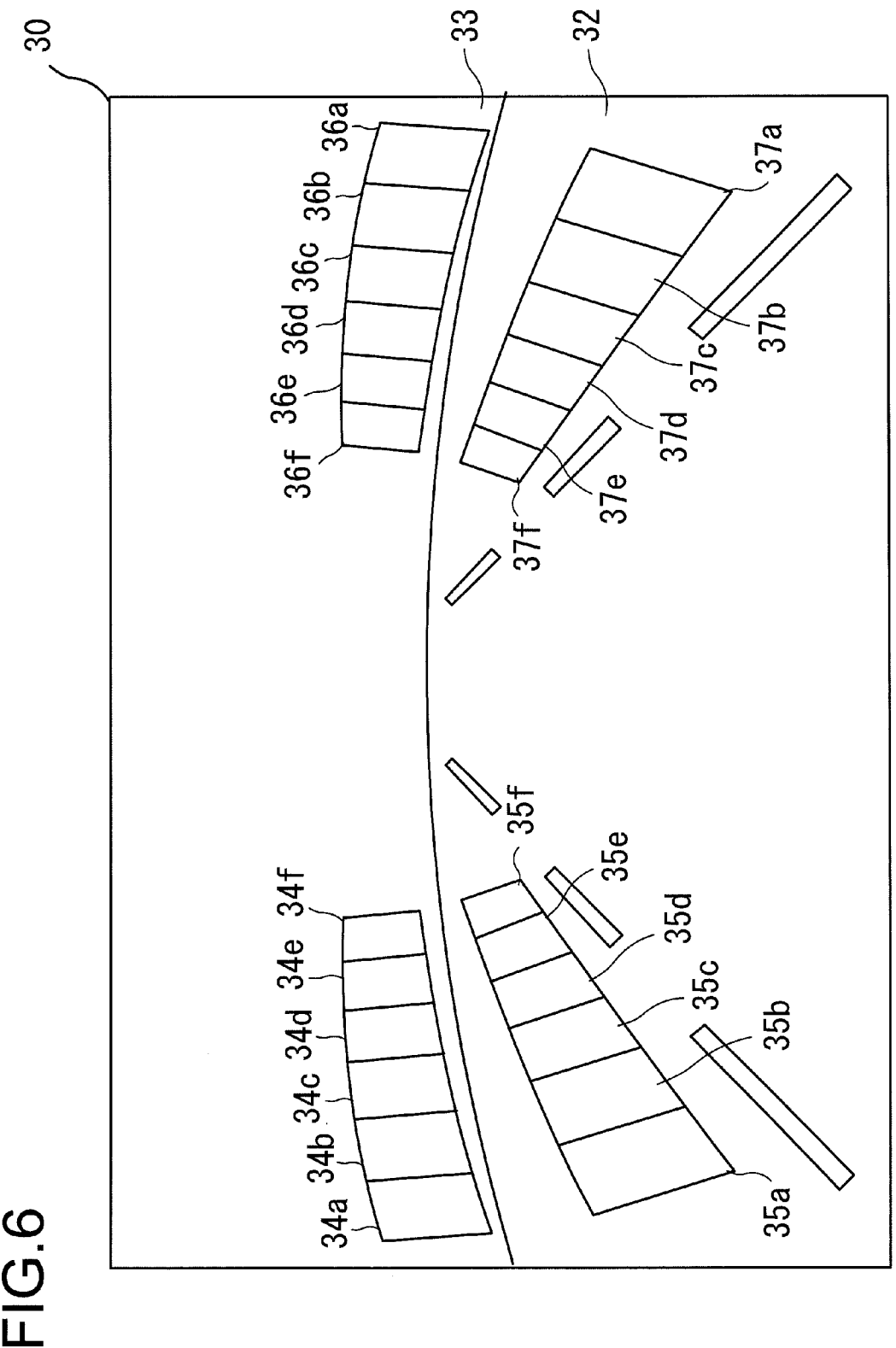
FIG. 6 A figure showing examples of background regions and reflection regions that are set in the photographic image.

FIG. 6 is a figure showing examples of background regions and reflection regions that are set in the photographic image. The photographic image 30 shown in FIG. 6 is divided into a road surface image region 32 in which the road surface is photographed and a background image region 33. In step S120, in this photographic image 30, background regions 34a through 34f and reflection regions 35a through 35f are set at positions corresponding to the rightward and rearward of the vehicle (in the case of the rear camera) or to its leftward and forward (in the case of a front camera), and background regions 36a through 36f and reflection regions 37a through 37f are set at positions corresponding to the leftward and rearward of the vehicle (in the case of the rear camera) or to its rightward and forward (in the case of a front camera), as shown in FIG. 6. In this manner, right or left adjacent road lane reflection regions 35a through 35f and left or right adjacent road lane reflection regions 37a through 37f are set by the road surface area setting unit 201a. Moreover, right or left background regions 34a through 34f and left or right background regions 36a through 36f are set by the reflected background area setting unit 201c.

The background regions 34a through 34f and 36a through 36f are set at positions that are symmetric left and right within the background image region 33, and that extend along the direction of the change of position of the background objects within the photographic images 30 that are successively generated as the vehicle travels. And reflection regions 35a through 35f and 37a through 37f are set within the road surface image region 32, corresponding to these background regions 34a through 34f and 36a through 36f respectively. For example, the background regions 34a and 36a at the left and right edges of the photographic image 30, in other words the regions that are set at the positions closest to the vehicle in actual space, correspond respectively to the reflection regions 35a and 37a. Moreover, the background regions 34f and 36f nearest to the center of the photographic image 30, in other words the regions that are set at positions furthest from the vehicle in actual space, correspond respectively to the reflection regions 35f and 37f. By doing this, the reflection regions 35a through 35f and 37a through 37f are all set within the road surface image region 32, and the background regions 34a through 34f and 36a through 36f are all set at matching positions within the background image region 33 that are appropriate for generating reflections of background objects in these reflection regions. It should be understood that it is desirable for the positions in the photographic image 30 at which the reflection regions 35a through 35f and 37a through 37f are set to be positioned to correspond to the regions in which detection by the application is performed, for example to the detection regions that are employed when the other vehicle recognition unit 204b recognizes other vehicles that are present leftward and rearward, or rightward and rearward, of the subject vehicle.

In step S130, via the other vehicle recognition unit 204b of the application execution unit 204, the control unit 2 performs other vehicle recognition processing for recognizing other vehicles that are traveling in the neighborhood of the subject vehicle. Due to this other vehicle recognition processing, along with recognizing some other vehicle that is present leftward and rearward or rightward and rearward of the subject vehicle if such a vehicle is present, also the relative speed of that other vehicle with respect to the subject vehicle is determined. It should be understood that the concrete contents of this other vehicle recognition processing that is executed here will be explained hereinafter in detail.

In step S140, the control unit 2 determines whether or not, due to the other vehicle recognition processing operation in step S130, some other vehicle has been recognized that is present leftward and rightward (or rightward and forward) or rightward and rearward (or leftward and forward) of the subject vehicle. If such another vehicle has been recognized then the flow of control proceeds to step S150, whereas if no such other vehicle has been recognized then the flow of control is transferred to step S170.

In step S150, the control unit 2 determines whether or not the relative speed of the other vehicle, as detected by the other vehicle recognition processing of step S130, is within a predetermined range, for example whether its current speed is within the range 0 to 10 km per hour. If the relative speed of the other vehicle is within this range then the flow of control proceeds to step S160, whereas if the relative speed is outside this range then the flow of control is transferred to step S170.

In step S160, the control unit 2 performs adjustment of the level of warning prevention by the warning prevention adjustment unit 206. Here, by relaxing the condition for determining upon the presence or absence of a reflection of a background object from the road surface in step S180 that will be described hereinafter, it is made easier to obtain a determination result that a reflection is present, and according to this the temporal level (i.e. the frequency) at which suppression of warning output is performed is increased. Due to this, the level of warning prevention is adjusted so that warning prevention becomes easier to perform if the relative speed of the other vehicle is within the predetermined range, as compared with when this is not the case. It should be understood that the concrete method for relaxing the condition for determining upon the presence or absence of a reflection of a background object will be explained in detail hereinafter.

In step S170, for the background regions 34a through 34f and 36a through 36f and for the reflection regions 35a through 35f and 37a through 37f that were set in step S120, the control unit 2 calculates respective feature amounts that specify the particular characteristics of the images within each of these regions, using the feature amount calculation unit 202. For example, for each pixel in the image corresponding to each of the background regions 34a through 34f and 36a through 36f, and for each pixel in the image corresponding to each of the reflection regions 35a through 35f and 37a through 37f, an edge angle in the interior of the photographic image 30 may be calculated on the basis of the luminance of each pixel surrounding it. By creating a histogram for the edge angles of each of the pixels calculated in this manner for each of the regions, it is possible to calculate a feature amount for each of the regions corresponding to the edge angles of the image for that region. It should be understood that the method for calculating the feature amounts is not to be considered as being limited to the method described above, provided that it is capable of specifying characteristics of the images in each of the regions in an appropriate manner.

The details of the processing performed by the feature amount calculation unit 202 will now be explained with reference to the functional block diagram shown in FIG. 8. First, for each of the reflection regions 35a through 35f and 37a through 37f that are set for each local region of the road surface, the angles of vectors that give the directions of the gradients of luminance are extracted by the road surface edge angle histogram extraction unit 202a as edge angles. Here, the distribution of edge angles within each of the reflection regions is investigated by extracting the edge angle for each pixel within each of the reflection regions, and by constructing a histogram of these edge angles for each reflection region. The possibility is comparatively high that angle components for edges of white lines drawn on the road surface will be included in these histograms of edge angles. However, if in step S180 to be described hereinafter a correlation is found between a background region and a reflection region upon the road surface, then the accuracy of the correlations can be enhanced by performing a correlation while eliminating the edge angle components of the white line, since it is already known that white lines are only present upon the road surface. By doing this, the white line edge angles for each reflection region are estimated by the white line edge angle estimation unit 202b. The results of this estimation are employed for suppressing the white line edge angle components in the reflection regions, when performing correlations between the background regions and the reflection regions in the processing of the following step S180. Next, in a similar manner as was done for the reflection regions, edge angles are extracted for each of the background regions 34a through 34f and 36a through 36f that have been set for each local region in the background by the background edge angle histogram extraction unit 202c, and a histogram thereof is constructed for each of these regions. For each mutually corresponding pair of a background region and a reflection region, an estimation is made by the background road surface edge angle correlation estimation unit 202d of the correspondence between the background edge angles and the road surface edge angles.

Here, a correspondence table is generated that shows, for example, if an edge at an angle of 45° is present in a background region and this edge is reflected from the road surface, how much angle the reflected edge has in the image of the corresponding reflection region. Finally, for edge angles of a three dimensional body in the background and on the road surface (which constitute the most likely cause of erroneous detection), apart from the correspondence table described above, estimation is performed by the background road surface three dimensional body edge estimation unit 202e for each mutually corresponding pair of background regions and reflection regions, and the results of these estimations are recorded.

In step S180, on the basis of the feature amounts for each region calculated in step S170, the control unit 2 performs reflection determination in order to determine upon the presence or absence of reflections of background objects from the road surface, using the reflection determination unit 203. Here, first, the control unit 2 performs comparison between corresponding ones of the respective feature amounts calculated for the background regions 34a through 34f and 36a through 36f, and the respectively corresponding feature amounts calculated for the reflection regions 35a through 35f and 37a through 37f. For example, the feature amount for the background region 34a and the feature amount for the reflection region 35a that corresponds thereto are compared together, and the feature amount for the background region 36a and the feature amount for the reflection region 37a that corresponds thereto are compared together. Moreover, the feature amount for the background region 34f and the feature amount for the reflection region 35f that corresponds thereto are compared together, and the feature amount for the background region 36f and the feature amount for the reflection region 37f that corresponds thereto are compared together. In a similar manner, the feature amounts for the other mutually corresponding pairs of the background regions and the reflection regions are compared together. By comparing together the feature amounts for the corresponding background regions and reflection regions in this manner, the images within the background regions and the images within the corresponding reflection regions are compared together, and the correlation is analyzed for each of the combinations thereof.

The detailed processing performed by the reflection determination unit 203 will now be explained with reference to the functional block diagram given in FIG. 9. Here, the reason that it is desired to determine upon reflections from the road surface is in order, if the reflection of a background object has been generated by reflection from the road surface, to suppress erroneous detection due to this fact. In other words, if the edge intensity of the road surface is weak, then erroneous detection in lane recognition, other vehicle recognition, pedestrian detection and so on will not occur in the first place. Moreover, if the edge intensity of the background is low, then in the first place the possibility is high that no object is present in the background that might be reflected, and accordingly the possibility is high that no object is present that is being reflected from the road surface. Due to this, before implementing reflection determination, the edge intensity analysis unit 203a analyzes whether there is a reasonably good edge distribution in the road surface and in the background. Next, from among the histograms of edge angles in the reflection regions upon the road surface, the sizes of histograms in the neighborhood of the white line edge angles are reduced by the white line edge suppression unit 203b, using the white line edge angles estimated in step S170 as previously described. For example, for a predetermined range of angles centered upon the white line edge angles, pre-processing is executed by the white line edge suppression unit 203b to multiply the height of the actual histogram by 0.3 so as to reduce the influence of white lines, before performing correlation with the background. Due to this, it is possible to alleviate the influence of white lines, that can constitute a cause for erroneous reflection determination.

Next, from among the edge angle histograms, the heights of the portions of the histograms corresponding to the three dimensional body edge angles for the background regions that have been estimated by the background road surface three dimensional body edge estimation unit 202e, and the heights of the portions of the histograms corresponding to the three dimensional reflection edge angles for the road surface reflection regions, are accentuated by being doubled by the three dimensional body edge accentuation unit 203c. Since, due to this, it is possible to see the correlations of the edge angles of the three dimensional bodies, accordingly it becomes possible to obtain correlations of the three dimensional body edges that may be detected erroneously by the recognition logic of the application in a stable manner.

Next, the correlations of the edge angle histograms of corresponding road surface reflection regions and background regions are analyzed by the local region correlation analysis unit 203d.

It should be understood that, in the comparison of feature amounts as described above, it is desirable to compare the histograms of the edge angles that, as previously described, have been calculated as the feature amounts for each region, while taking into account the changes of the edge angles due to reflection. In other words, to which position of arrangement in the histogram of edge angles of the reflection regions the position of arrangement in the histogram of the edge angles for each background region belongs, is calculated in advance by the background road surface edge angle correlation estimation unit 202d, and the comparison of the two histograms is performed on the basis of the result of this calculation. When this is done, it is possible to analyze the correlation between the histograms of the edge angles that specify the feature amounts of the background regions, and the histograms of the edge angles that specify the feature amounts of the reflection regions, in a correct manner that takes into account the states of reflection. In the checking of correlations for the local regions, from the left side of the screen, the corresponding processing regions of the reflection region 35a and the background region 34a are compared together. Subsequently, for each of the pairs consisting of the reflection region 35b and the background region 34b, of the reflection region 35c and the background region 34c, of the reflection region 35d and the background region 34d, of the reflection region 35e and the background region 34e, and of the reflection region 35f and the background region 34f, it is analyzed whether there is any correlation between the feature amount of the road surface reflection and the feature amount of the corresponding background region. In a similar manner, for the right side of the screen as well, correlations are analyzed for each of the pairs consisting of the reflection region 37a and the background region 36a, of the reflection region 37b and the background region 36b, of the reflection region 37c and the background region 36c, of the reflection region 37d and the background region 36d, of the reflection region 37e and the background region 36e, and of the reflection region 37f and the background region 36f.

As has been explained above, the feature amounts between corresponding background regions and reflection regions are compared together. In other words, on the left side of the screen, the feature amount that has been calculated for each of the background regions 34a through 34f is compared with the feature amount calculated for the corresponding reflection region 35a through 35f on the road surface. In a similar manner, on the right side of the screen, the feature amount that has been calculated for each of the background regions 36a through 36f is compared with the feature amount calculated for the corresponding reflection region 37a through 37f on the road surface. Among these regions, the ones to which the same alphabetic letter is suffixed are compared together.

Next, the correlations between the background regions and the reflection regions on the left and right of the screen, each taken all together, are analyzed by the left/right correlation analysis unit 203e. First, it is confirmed whether, according to shifting of the subject vehicle, the feature amounts for both the background regions and the road surface reflection regions are shifting rearward. For example, if there is a feature amount for the reflection region 35b on the left of the screen that indicates an edge angle of 45°, then it is supposed that in the next frame, due to the flow rearward of this feature amount, the same tendency should be expressed in, for example, the reflection region 35e. Moreover it is also supposed that, in the background, a background edge angle whose correlation is high should be present, and that this also should shift over time from the background region 34b to the background region 34e. In this type of case, it is determined that the possibility is high that reflection of a background object from the road surface is taking place.

Furthermore, apart from local correlations between the background regions and the reflection regions from the road surface, a determination is also made as to whether or not there is any correlation between the presence or absence of feature amounts and the depth direction. For example, if there is a correlation on the screen left side only between the background region 34b and the reflection region 35b, but in the other regions the correlations are low even though feature amounts are present, then it is considered that the possibility is high that there is a local region in which there is a correlation by chance. By contrast, if there is a correlation only between the background region 34b and the reflection region 35b, while in the other regions the feature amounts for both the background regions and the road surface reflection regions are low and they are in states in which there is no correlation, then this is considered as being a high correlation on the left side of the screen for which the possibility is high that a road surface reflection is being generated on the left side of the screen. After having performed correlations for each of the local regions, the correlations between left and right are analyzed with reference to the directions of alignment of the correlations and the directions of movement for the local regions as viewed between left and right in this manner, and thereby determination of reflection from the road surface between left and right is implemented.

In step S180, comparison together of the feature amounts explained above for each of the regions is performed, and, on the basis of the results of these comparisons, it is determined whether or not there is a reflection of a background object between the background regions 34a through 34f and the reflection regions 35a through 35f respectively, and between the background regions 36a through 36f and the reflection regions 37a through 37f respectively. For example, if correlations between the background regions 34a through 34f and the reflection regions 35a through 35f are sufficiently high, and moreover the images within the background region group 34a through 34f and the images within the reflection region group 35a through 35f are shifting in a direction so as overall to move away from the vehicle, then it is determined that this is the reflection of a background object from the road surface rightward and rearward of the vehicle. In a similar manner, if correlations between the background regions 36a through 36f and the reflection regions 37a through 37f are sufficiently high, and moreover the images within the background region group 36a through 36f and the images within the reflection region group 37a through 37f are shifting in a direction so as overall to move away from the vehicle, then it is determined that this is the reflection of a background object from the road surface leftward and rearward of the vehicle.

It should be understood that, in step S160 previously described, it is possible to perform adjustment of the level of warning prevention by changing the reference value when determining upon the presence or absence of a reflection of a background object from the road surface by comparing together the feature amounts of the various regions in step S180, and from their correlations, as described above. In other words, in step S180 described above, if correlation of feature amounts between the background regions 34a through 34f and the reflection regions 35a through 35f, and between the background regions 36a through 36f and the reflection regions 37a through 37f, is greater than or equal to a predetermined threshold value, then it is considered that the correlation between the images in these regions is high, so that it is determined that the reflection of a background object is present. The condition for determining upon the presence or absence of a reflection of a background object in step S180 is relaxed by lowering the threshold value for this correlation in step S160, and accordingly it is possible to adjust the level of warning prevention so that the warning prevention in step S200 to be described hereinafter becomes more easy to perform.

Moreover, it is also possible to perform adjustment of the level of warning prevention in step S160 previously described by changing a condition when calculating the feature amount in step S170 for each region; in more concrete terms, by changing the condition for edge detection. In other words, in step S170 described above, for each of the background regions 34a through 34f and 36a through 36f, and for each of the reflection regions 35a through 35f and 37a through 37f, portions for which the luminance differences between adjacent pixels are greater than or equal to a predetermined value are detected as being edges, and a feature amount for each region is calculated by constructing a histogram of the angles between these edges. In step S160, the condition for determining upon the presence or absence of a reflection of a background object in step S180 is relaxed by lowering the luminance difference that is used in this edge detection condition so that more edge components are detected, and accordingly it is possible to adjust the level of warning prevention so that the warning prevention in step S200 to be described hereinafter becomes more easy to perform.

It should be understood that it would be acceptable, during adjustment of the level of warning prevention in step S160, to perform change of the threshold value for correlation in step S180 described above, and change of the edge detection condition in step S170 described above, both singly, or alternatively both together.

In step S190, from the results of reflection determination in step S180, the control unit 2 determines upon the presence or absence of a reflection of a background object from the road surface. If in step S180 it was determined that a reflection of a background object from the road surface was present at least at one of leftward and rearward of the vehicle, and rightward and rearward of the vehicle, then the flow of control proceeds from step S190 to step S200. On the other hand, if in step S180 it was determined that no reflection of a background object from the road surface was present either leftward and rearward of the vehicle or rightward and rearward of the vehicle, then step S200 is not executed, and the flow chart of FIG. 5 terminates.

In step S200, the control unit 2 stops output of the warning output signal to the warning output unit 3. At this time, the control unit 2 stops output of the warning output signal from the warning control unit 205 to the warning output unit 3 by issuing a predetermined notification from the reflection determination unit 203 to the warning control unit 205, and thereby suppresses output of a warning by the warning output unit 3. Due to this, even if a background object that has been reflected from the road surface leftward and rearward, or rightward and rearward, of the subject vehicle has been mistakenly detected as being another vehicle for which there is a possibility of collision with the subject vehicle, still it is arranged for no warning to be erroneously outputted from the warning output unit 3. It should be understood that, in step S200, it is desirable to stop warning output only for leftward and rearward, or rightward and rearward, of the subject vehicle for which it has been determined in step S180 that there is a reflection of a background object from the road surface. After step S200 has been executed, the control unit 2 terminates the flow chart of FIG. 5.

Moreover, in a similar manner to that described above, in the case of the lane recognition unit 204a as well, if it has been determined that the horizontal position of the result of recognition is unstable and moreover that it is a reflection, then the beneficial effect of suppression of an erroneous warning is obtained by suppressing warning during deviation from the road lane using lane recognition.

Furthermore, in the case of the pedestrian recognition unit 204c as well, the beneficial effect of suppression of an erroneous warning is obtained by suppressing output of a warning, since there is a danger of erroneously detecting a reflection as being a moving body. And, in the case of the sign detection unit 204d as well, the beneficial effect of prevention of an erroneous warning is obtained by suppressing output of a warning, since there is a danger of erroneously detecting a reflection as being a sign. Even further, in the case of the right-turn collision prevention recognition unit 204e as well, the beneficial effect of prevention of an erroneous warning is obtained by suppressing output of a warning, since there is a danger of erroneously detecting a reflection as being an obstacle. And, in the case of the parking box recognition unit 204f as well, erroneous control or the like is prevented by stopping the application that employs a parking box, since there is a danger of the position of the parking box becoming unstable due to reflection, and of consequent erroneous recognition.

Moreover, since there is also a danger that the moving body detection unit 204g may erroneously detect a reflection as being a moving body, accordingly, by suppressing the output of a warning, the beneficial effect is obtained of preventing erroneous warning.

FIG. 12 is a figure for explanation of the beneficial effects of the reduction of erroneous warnings obtained with the in-vehicle surrounding environment recognition device 100 according to this embodiment as explained above. Here an example is shown of how the output timing of the warning from the warning output unit 3 changes due to adjustment of the level of suppression of warning output performed by the warning prevention adjustment unit 206 as previously described, if for example the relative speed of the other vehicle changes as shown in FIG. 12(*a*). In the FIG. 12 example, as explained with reference to step S150 of FIG. 5, the relative speed of the other vehicle shown in FIG. 12(*a*) is within the predetermined range in the interval from the time point Tv1 to the time point Tv2, and is outside that range at other times.

During the previously described interval from the time point Tv1 to the time point Tv2, the warning prevention adjustment unit 206 performs adjustment of the level of suppression of warning output as previously described, and thereby relaxes the condition for determination of the presence or absence of reflection of a background object from the road surface. Due to this, it becomes easier for a determination result to the effect that a reflection is present to be obtained by the reflection determination unit 203. As a result, as for example shown in FIG. 12(*b*), the timing at which it is determined that no reflection is present is shifted from the time point Tr4 to the time point Tr4a, so that the length of the interval in which a determination result to the effect that a reflection is present is arrived at is made longer. It should be understood that the portion shown by a broken line in FIG. 12(*b*) shows an example of a determination result for reflection of a background object from the road surface that would be obtained if adjustment of the level of suppression of warning output were not performed.

Here, in the other vehicle recognition processing executed by the other vehicle recognition unit 204*b* of the application execution unit 204, an image information value as shown by the reference symbol 50 in FIG. 12(*c*) is obtained. If this image information value 50 exceeds a threshold value Th0, then the appearance is recognized as being another vehicle. Since, in the example of FIG. 12(*c*), the image information value 50 is greater than the threshold value Th0 in the interval from the time point To1 to the time point To2, accordingly the presence of another vehicle is recognized in this interval.

According to the warning output signal from the warning control unit 205, the warning output unit 3 provides output of a warning at the timing shown in FIG. 12(*d*). The timing of this warning output is the interval in FIG. 12(*b*) in which it is determined that a reflection is present, and moreover in which another vehicle is recognized in FIG. 12(*c*). It should be understood that the portion in FIG. 12(*d*) shown by the broken line is the timing of the warning output that would be made if no adjustment of the level of suppression of warning output were performed, and shows the warning output that would be provided in the interval from the time point Tr4 described above to the time point To2. In other words, the level of suppression of warning output is adjusted in the interval from the time point Tv1 to the time point Tv2 in which the relative speed of the other vehicle is within the predetermined range, and corresponding thereto the length of the interval in which a determination result to the effect that a reflection is present is obtained is prolonged, as shown in FIG. 12(*b*). As a result, it is possible to suppress warning output in the interval from the time point Tr4 to the time point To2.

(Explanation of the Other Vehicle Recognition Processing)

Next, the other vehicle recognition processing that is executed by the other vehicle recognition unit 204*b* of the application execution unit 204 in step S130 of FIG. 5 will be explained in the following.

Figure 13:
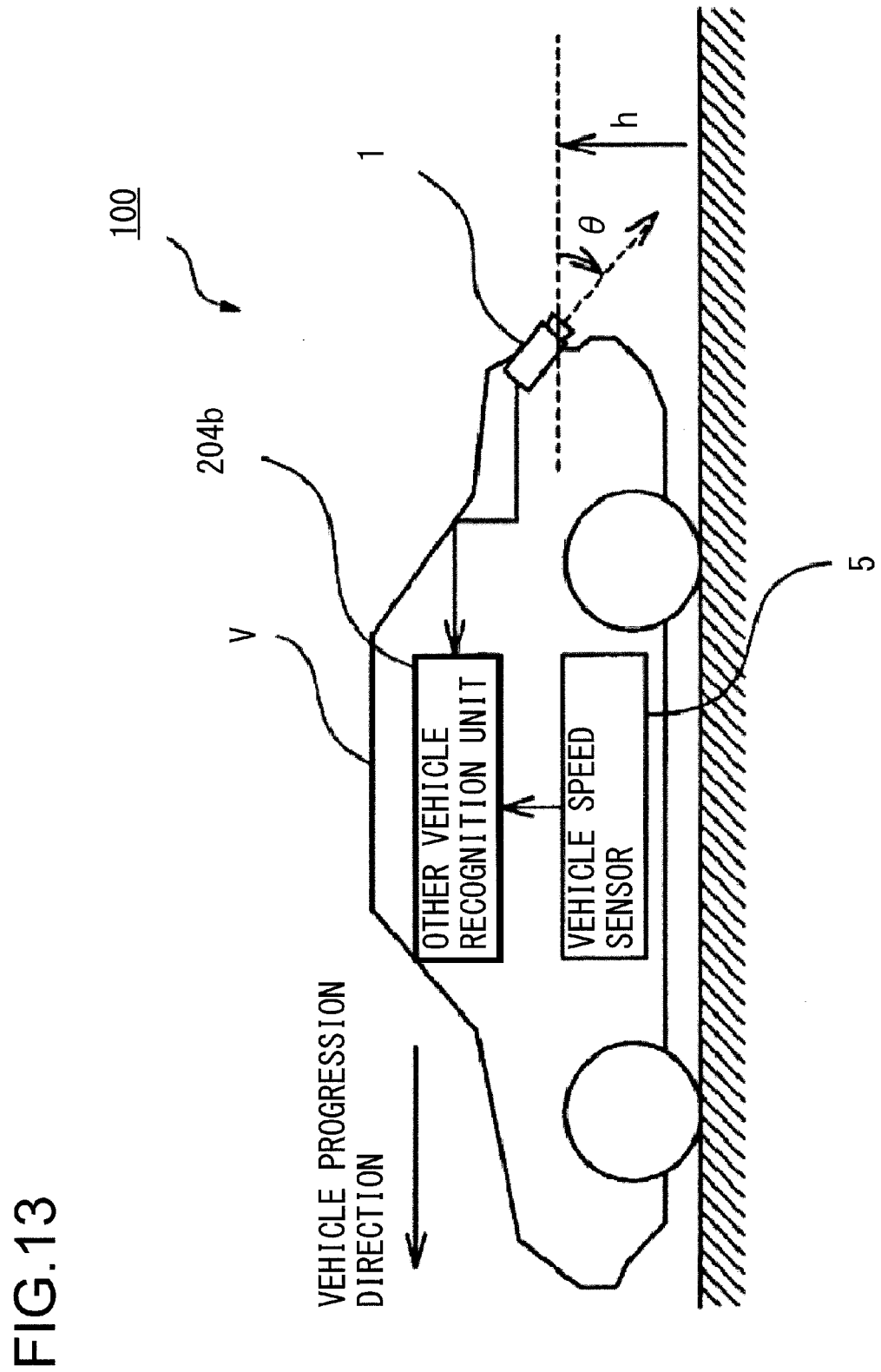
FIG. 13 A figure showing the general structure of the vehicle, for explanation of other vehicle recognition processing.

FIG. 13 is a figure showing the general structure of the vehicle, for explanation of the other vehicle recognition processing that is performed by the other vehicle recognition unit 204*b* of the in-vehicle surrounding environment recognition device 100 of the present invention. The in-vehicle surrounding environment recognition device 100 is a device that detects another vehicle as being an obstacle to which the driver of the subject vehicle V must pay attention during driving, for example another vehicle with which there is a possibility of contact when the subject vehicle V changes its road lane. In particular, the in-vehicle surrounding environment recognition device 100 of this example may detect some other vehicle that is traveling in an adjacent road lane that is next to the road lane upon which the subject vehicle is traveling (hereinafter sometimes simply termed an "adjacent road lane"). Moreover, the in-vehicle surrounding environment recognition device 100 of this example is capable of calculating the shifting distance and the shifting speed of this other vehicle that has been detected. Due to this, the example shown below is one in which the in-vehicle surrounding environment recognition device 100 is mounted to the subject vehicle V, and, from among the three dimensional bodies that are detected around the subject vehicle, detects another vehicle that is traveling in an adjacent road lane next to the road lane in which the subject vehicle V is traveling. As shown in this figure, the in-vehicle surrounding environment recognition device 100 of this example comprises the camera 1, the vehicle speed sensor 5 and the other vehicle recognition unit 204*b*.

As shown in FIG. 1, the camera 1 is attached to the subject vehicle V at a spot at a height h on the rear end of the vehicle V, so that its optical axis is oriented downward at an angle θ. From this position, the camera 1 captures an image of a predetermined region in the environment surrounding the subject vehicle V. While, in this embodiment, a single camera 1 is provided for detecting three dimensional bodies rearward of the subject vehicle V, it would also be possible to provide one or more other cameras for other applications, for example for acquiring images around the vehicle. The vehicle speed sensor 5 is a device that detects the running speed of the subject vehicle V; for example, the vehicle speed may be calculated from the wheel rotational speed that is detected by a wheel speed sensor that detects the rotational speed of a vehicle wheel. And the other vehicle recognition unit 204*b* detects a three dimensional body rearward of the vehicle as being another vehicle, and also, in this example, calculates the shifting distance and the shifting speed for this three dimensional body.

Figure 14:
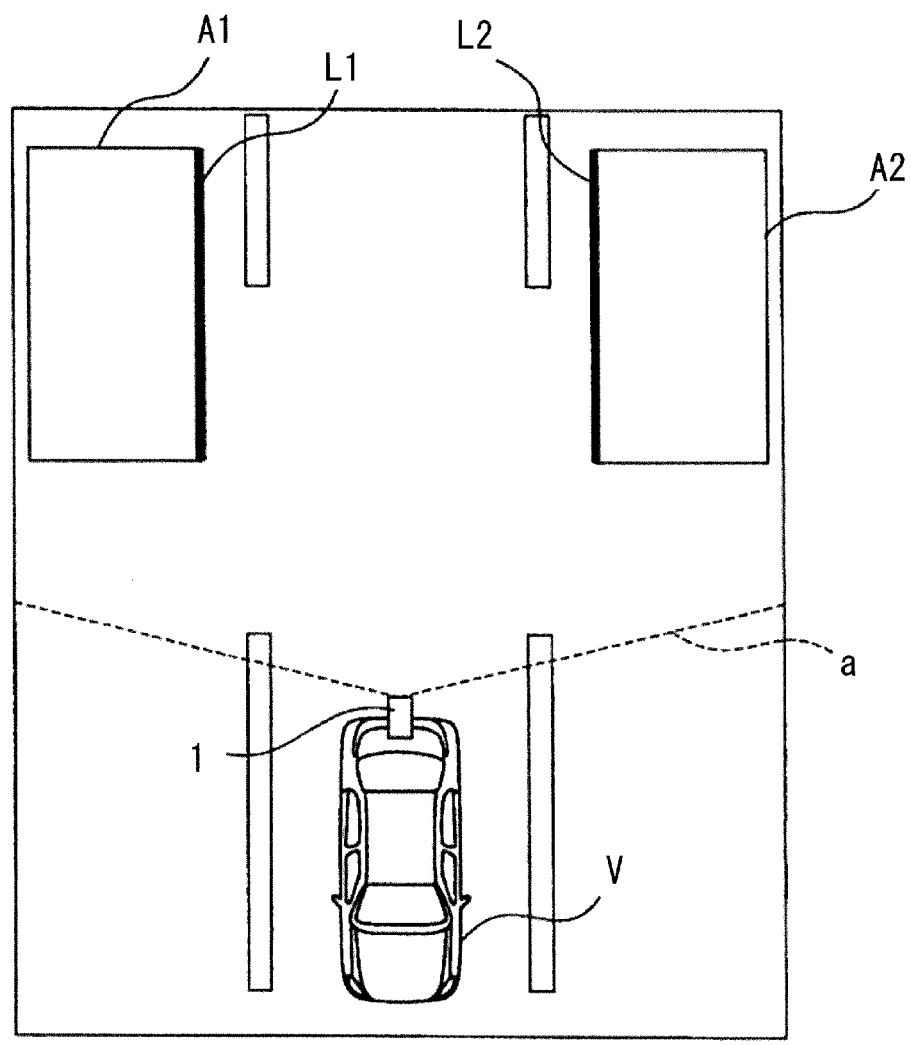
FIG. 14 A plan view showing the running state of the vehicle of FIG. 13 (for three dimensional body detection by differential waveform information).

FIG. 14 is a plan view showing the running state of the vehicle of FIG. 13. As shown in this figure, the camera 1 captures images to the rear of the vehicle over a predetermined angle of view a. At this time, the angle of view a of the camera 1 is set to an angle of view that is capable of image capture, not only for the road lane in which the subject vehicle V is traveling, but also for the road lanes to the left and right of that road lane as well. Detection subject regions A1 and A2 that are rearward of the subject vehicle V in the neighboring left and right road lanes adjacent to the road lane on which the subject vehicle V is traveling are included in the region of which images can be captured.

Figure 15:
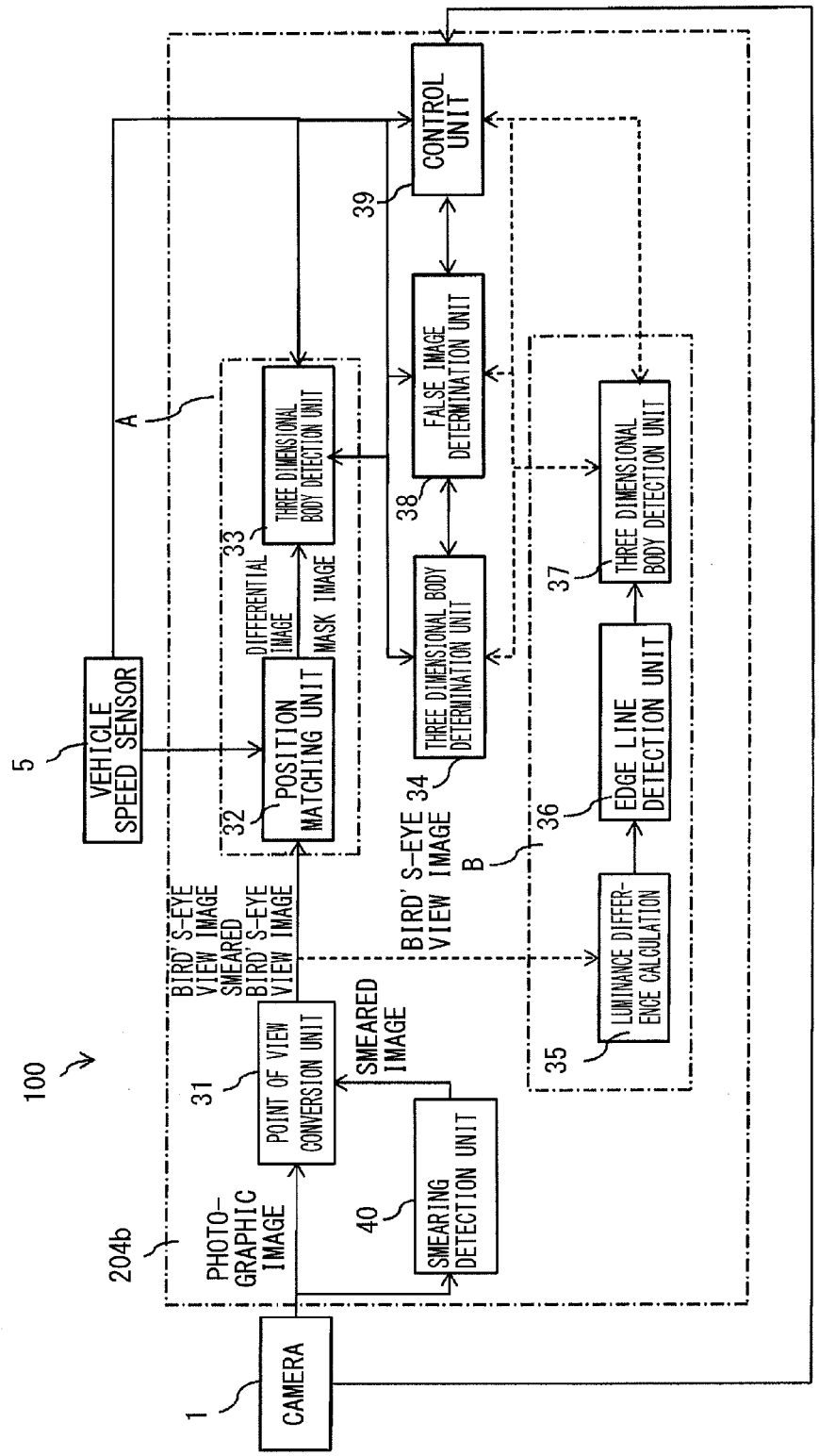
FIG. 15 A block diagram showing the details of an other vehicle recognition unit.

FIG. 15 is a block diagram showing the details of the other vehicle recognition unit 204*b* of FIG. 13. It should be understood that, in order to make their connection relationships clear, the camera 1 and the vehicle speed sensor 5 are also shown in FIG. 15.

As shown in FIG. 15, the other vehicle recognition unit 204*b* comprises a point of view conversion unit 31, a position matching unit 32, a three dimensional body detection unit 33, a three dimensional body determination unit 34, a false image determination unit 38, a control unit 39, and a smearing detection unit 40. The other vehicle recognition unit 204b of this embodiment is a structure related to a three dimensional body detection block that employs differential waveform information. And the other vehicle recognition unit 204b of this embodiment is also capable of possessing a structure related to a three dimensional body detection block that employs edge information. In this case, in the structure shown in FIG. 15, it is possible to obtain this structure by replacing a detection block structure A that comprises the position matching unit 32 and the three dimensional body detection unit 33 with a detection block structure B surrounded by the broken line that comprises a luminance difference calculation unit 35, an edge line detection unit 36, and a three dimensional body detection unit 37. Of course, it would also be possible to provide both the detection block structure A and also the detection block structure B, and to make it possible, along with performing detection of a three dimensional body by using differential waveform information, also to perform detection of a three dimensional body by using edge information. If both the detection block structure A and the detection block structure B are provided, then it would be possible to operate either the detection block structure A or the detection block structure B, depending upon some environmental cause such as, for example, brightness or the like. These structures will now be explained in detail in the following.

<<Detection of a Three Dimensional Body from the Differential Waveform Information>>

On the basis of the image information that has been obtained by the monocular camera 1 that captures an image rearward of the vehicle, the in-vehicle surrounding environment recognition device 100 of this embodiment detects a three dimensional body that is present rearward of the vehicle in the right side detection region or in the left side detection region.

The point of view conversion unit 31 inputs the captured image data of a predetermined region that has been obtained by image capture by the camera 1, and converts this captured image data that has been inputted to bird's-eye view point of view image data that is in a state as seen in a bird's-eye view. By a state as seen in a bird's-eye view is meant a state as seen from the point of view of a virtual camera that is, for example, looking downward from the sky overhead in a vertically downward direction. This point of view conversion may, for example, be performed by executing the method described in Japanese Laid-Open Patent Publication No. 2008-219063. This point of view conversion from the captured image data to image data as seen in a bird's-eye view is performed because, if this conversion is employed, it is possible to identify a planar object with a three dimensional body on the basis of a theory in which vertical edges that are characteristic of a three dimensional body are converted into a straight line group passing through a particular point that is specified by the point of view conversion to image data as seen in a bird's-eye view. It should be understood that the result of this image conversion processing by the point of view conversion unit 31 is also employed in the detection of a three dimensional body according to edge information, as will be described hereinafter.

Figure 16:
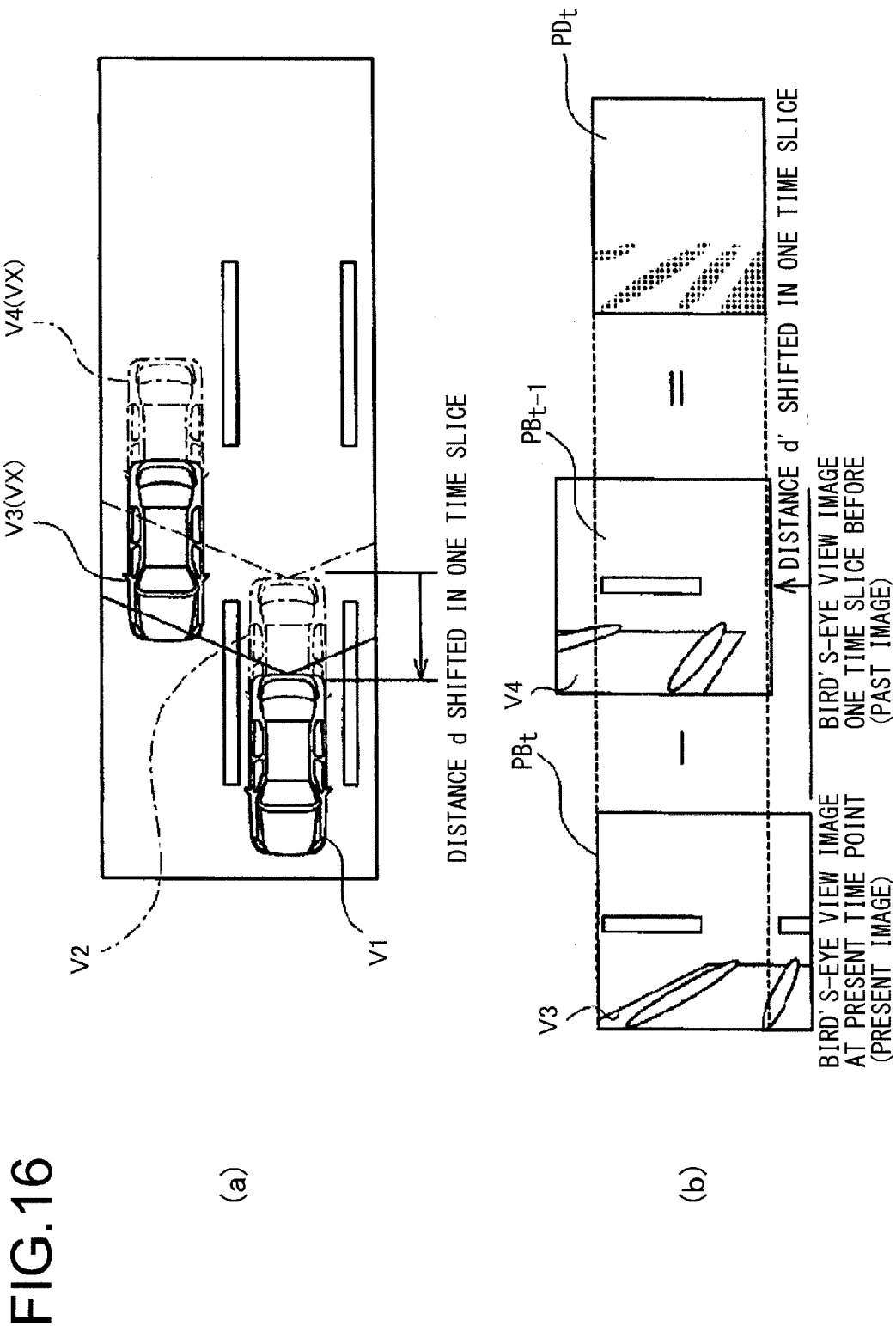
FIG. 16 A figure for explanation of a summary of processing by a position matching unit of FIG. 15.

The position matching unit 32 sequentially inputs the bird's-eye view image data obtained by the point of view conversion performed by the point of view conversion unit 31, and matches it to the position of bird's-eye view image data that was inputted at different time points. FIG. 16 is a figure for explanation of a summary of processing by the position matching unit 32, in which FIG. 16(a) is a plan view showing the state of shifting of the subject vehicle V, while FIG. 16(b) is a figure showing a summary of the position matching.

As shown in FIG. 16(a), it will be supposed that the subject vehicle V is positioned at V1 at the present time point, and that the subject vehicle V was positioned at V2 one time slice before. Moreover, it will be supposed that another vehicle VX is positioned in the direction rearward from the subject vehicle V and is in the state of being lined up with the subject vehicle V, that this other vehicle VX is positioned at V3 at the present time point, and that the other vehicle VX was positioned at V4 one time slice before. Yet further, it will be supposed that the subject vehicle V shifts through a distance d in one time slice. It should be understood that the term "one time slice before" could mean a time point in the past exactly one time period that has been determined in advance (for example a single control cycle) earlier than the present time point, or could mean a time point in the past exactly any specified time period earlier.

In this type of state, the bird's-eye view image $PB_t$ at the present time point is as shown in FIG. 16(b). In this bird's-eye view image $PB_t$, the rectangular shape represents the white lines drawn upon the road surface, and, while the figure shows a state that is comparatively accurate in plan view, the shape of the other vehicle VX that is at the position V3 is somewhat distorted. Moreover, in a similar manner in the bird's-eye view image $PB_{t-1}$ at one time point before, the rectangular shape represents the white lines drawn upon the road surface, and, while the figure shows a state that is comparatively accurate in plan view, the shape of the other vehicle VX that is at the position V4 is somewhat distorted. This is because, as already described, in relation to the vertical edges of a three dimensional body (as well as the vertical edges according to the precise meaning, this also includes edges that rise up into three dimensional space from the road surface) appearing as a straight line group along the direction of distortion by the point of view conversion processing into image data as seen in a bird's-eye view, this type of distortion does not occur even if the point of view is converted, since the plane image upon the road surface does not include any vertical edges.

The position matching unit 32 performs position matching between the data for the bird's-eye view images $PB_t$ and $PB_{t-1}$ described above. At this time, the position matching unit 32 offsets the bird's-eye view image $PB_{t-1}$ at one time point before, so as to make its position agree with the position of the bird's-eye view image $PB_t$ at the present time point. The image at the left side of FIG. 16(b) and the image at the center show a state in which the offset is just the shifting distance d'. This offset amount d' is the shifting amount in the image data for the bird's-eye view that corresponds to the actual shifting distance d of the subject vehicle V shown in FIG. 16(a), and is determined on the basis of the signal from the vehicle speed sensor 5 and the time period from one time point before to the present time point.

Moreover, after the position matching, the position matching unit 32 obtains the differential between the bird's-eye view images $PB_t$ and $PB_{t-1}$, thus generating data for a differential image $PD_t$. Here, it would be acceptable to make the pixel values of the differential image $PD_t$ equal to the absolute values of the differences between the pixel values of the bird's-eye view images $PB_t$ and $PB_{t-1}$; or it would also be acceptable, in order to deal with changes of the luminous flux density in the environment, to set each pixel value equal to "1" if the above absolute value is greater than a predetermined threshold value p, while setting it to "0" otherwise. The image on the right side of FIG. 16(b) is such a differential image $PD_t$. This threshold value p could be set in advance, or could alternatively be changed according to a control command corresponding to the result of false image determination by the control unit 39 as will be described hereinafter.

Returning to FIG. 15, the three dimensional body detection unit 33 detects a three dimensional body on the basis of the data for the differential image $PD_t$ shown in FIG. 16(b). At this time, the three dimensional body detection unit 33 of this embodiment also calculates the shifting distance in actual space of the three dimensional body. Having detected the three dimensional body and calculated its shifting distance, the three dimensional body detection unit 33 creates a first differential waveform. It should be understood that the shifting distance per unit time of the three dimensional body is used in the calculation of the shifting speed of the three dimensional body. And the shifting speed of the three dimensional body may be used for determining whether or not the three dimensional body is a vehicle.

The three dimensional body detection unit 33 of this embodiment sets detection regions in the differential image $PD_t$ for generation of the differential waveform. The in-vehicle surrounding environment recognition device 100 of this embodiment detects, as being a subject for detection, another vehicle that is a vehicle to which the driver of the subject vehicle V ought to pay attention and, in particular, that is traveling in a road lane that is adjacent to the road lane upon which the subject vehicle V is traveling and with which there is a possibility of contact if the subject vehicle V changes its road lane. Due to this, in this embodiment in which a three dimensional body is detected on the basis of image information, two detection regions are set in the image that has been obtained by the camera 1, to the right side and to the left side of the subject vehicle V. In concrete terms, in this embodiment, as shown in FIG. 14, detection regions A1 and A2 having rectangular shapes are set rearward of the subject vehicle V, to its left side and to its right side. Another vehicle that is detected in one of these detection regions A1 and A2 is detected as being an obstacle that is traveling in an adjacent road lane next to the road lane in which the subject vehicle V is traveling. It should be understood that it would be possible to arrange for the detection regions A1 and A2 of this type to be set in positions that are defined relative to the subject vehicle V, or it would also be possible to arrange for them to be set by taking the positions of the white lines as a reference. If they are set by taking the positions of the white lines as a reference, then the shifting distance detection device 1 may, for example, employ a per se already known white line recognition technique, or the like.

Furthermore, the three dimensional body detection unit 33 recognizes the sides of the set detection regions A1 and A2 that are toward the subject vehicle V (i.e. the sides along the direction of travel) as being ground lines L1 and L2 (refer to FIG. 14). While in general "ground line" means a line at which a three dimensional body contacts the surface of the ground, in this embodiment they are set as described above, even though they are not actually lines of contact against the ground surface. It should be understood that, in this case, from experience, the difference between a ground line according to this embodiment and a ground line according to its original meaning that is obtained from the position of the other vehicle VX is not very great, so that no problem arises in practice.

Figure 17:
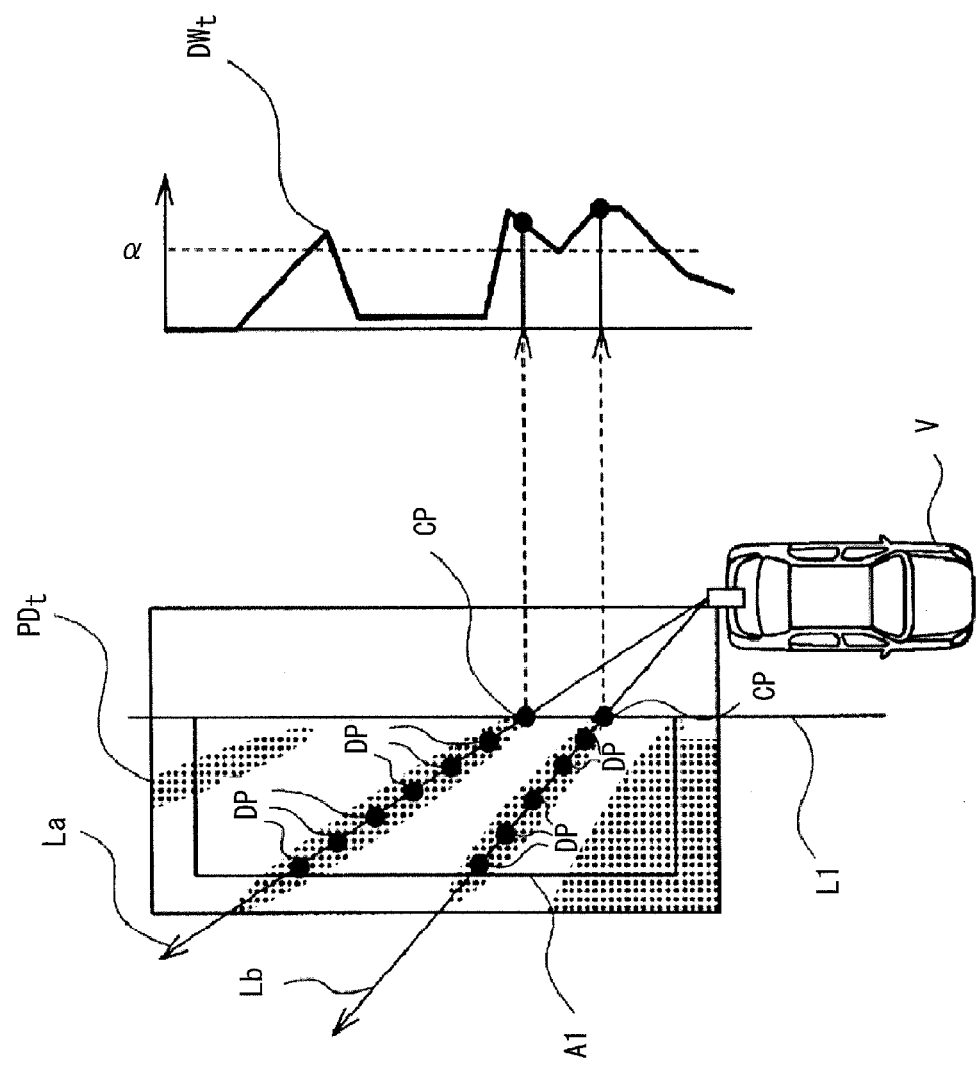
FIG. 17 A schematic figure showing the way in which a differential waveform is generated by a three dimensional body detection unit of FIG. 15.

FIG. 17 is a schematic figure showing the way in which a differential waveform is generated by the three dimensional body detection unit 33 shown in FIG. 3. As shown in FIG. 17, the three dimensional body detection unit 33 generates the differential waveform $DW_t$ from the portions in the differential image $PD_t$ (the right side figure in FIG. 16(b)) calculated by the position matching unit 32 that correspond to the detection regions A1 and A2. At this time, the three dimensional body detection unit 33 generates the differential waveform $DW_t$ along the direction in which the three dimensional body is distorted by the point of view conversion. It should be understood that for convenience, in the example shown in FIG. 17, the explanation employs only the detection region A1, but a differential waveform $DW_t$ is also generated for the detection region A2 by a similar procedure.

To explain this in concrete terms, the three dimensional body detection unit 33 defines a line La along the direction of distortion of the three dimensional body in the data for the differential image $DW_t$. And the three dimensional body detection unit 33 counts the number of differential pixels DP upon the line La that exhibit a predetermined differential. Here, the differential pixel DP that exhibits the predetermined differential is a pixel that exceeds a predetermined threshold value if the pixel values in the differential image $DW_t$ are expressed as the absolute values of the differences between the pixel values in the bird's-eye view images $PB_t$ and $PB_{t-1}$, and is a pixel that is expressed as "1" if the pixel values in the differential image $DW_t$ are expressed as "0" and "1".

After having counted the number of differential pixels DP, the three dimensional body detection unit 33 obtains the point of intersection CP between the line La and the ground line L1. And, corresponding to the point of intersection CP and the counted number, along with determining a position on the horizontal axis based upon the position of the point of intersection CP, in other words a position in the direction of the vertical axis in the figure at the right of FIG. 17, the three dimensional body detection unit 33 also determines a position on the vertical axis from the counted number, in other words a position in the direction of the horizontal axis in the figure at the right of FIG. 17, and plots this as the counted number at the point of intersection CP.

Subsequently, in a similar manner, the three dimensional body detection unit 33 defines lines Lb, Lc, . . . along the directions of distortion of the three dimensional body, counts the numbers of differential pixels DP, determines positions on the horizontal axis on the basis of the positions of the points of intersection CP, determines positions on the vertical axis from the counted numbers (i.e. the numbers of differential pixels DP), and plots them. And the three dimensional body detection unit 33 generates a differential waveform $DW_t$ as shown in the figure at the right of FIG. 17 by sequentially repeating the procedure described above and by constructing a frequency distribution.

It should be understood that, as shown in the figure at the left side of FIG. 17, the distances by which the line La and the line Lb on the direction of distortion of the three dimensional body overlap the detection region A1 are different. Due to this, when the detection region A1 is filled by the differential pixels DP, the number of differential pixels DP on the line La becomes greater than the number on the line Lb. And, due to this, when the three dimensional body detection unit 33 determines the position along the vertical axis from the counted number of differential pixels DP, this is normalized on the basis of the distance through which the line La or Lb on the direction of distortion of the three dimensional body and the detection region A1 overlap. To cite a concrete example, there are six differential pixels DP on the line La in the figure at the left side of FIG. 17, while there are only five differential pixels on the line Lb. Due to this, in the determination of the vertical axis positions from the counted numbers in FIG. 17, the three dimensional body detection unit 33 normalizes the counted numbers by dividing by the distance of overlap, or the like. And, due to this, as shown in the differential waveform $DW_t$, the values of the differential waveform $DW_t$ that correspond to the lines La and Lb on the direction of distortion of the three dimensional body become almost the same.

After generation of the differential waveform $DW_t$, the three dimensional body detection unit 33 calculates the shifting distance by correlating it with the differential waveform $DW_{t-1}$ one time point before. In other words, the three dimensional body detection unit 33 calculates the shifting distance from the change over time between the differential waveforms $DW_t$ and $DW_{t-1}$.

Figure 18:
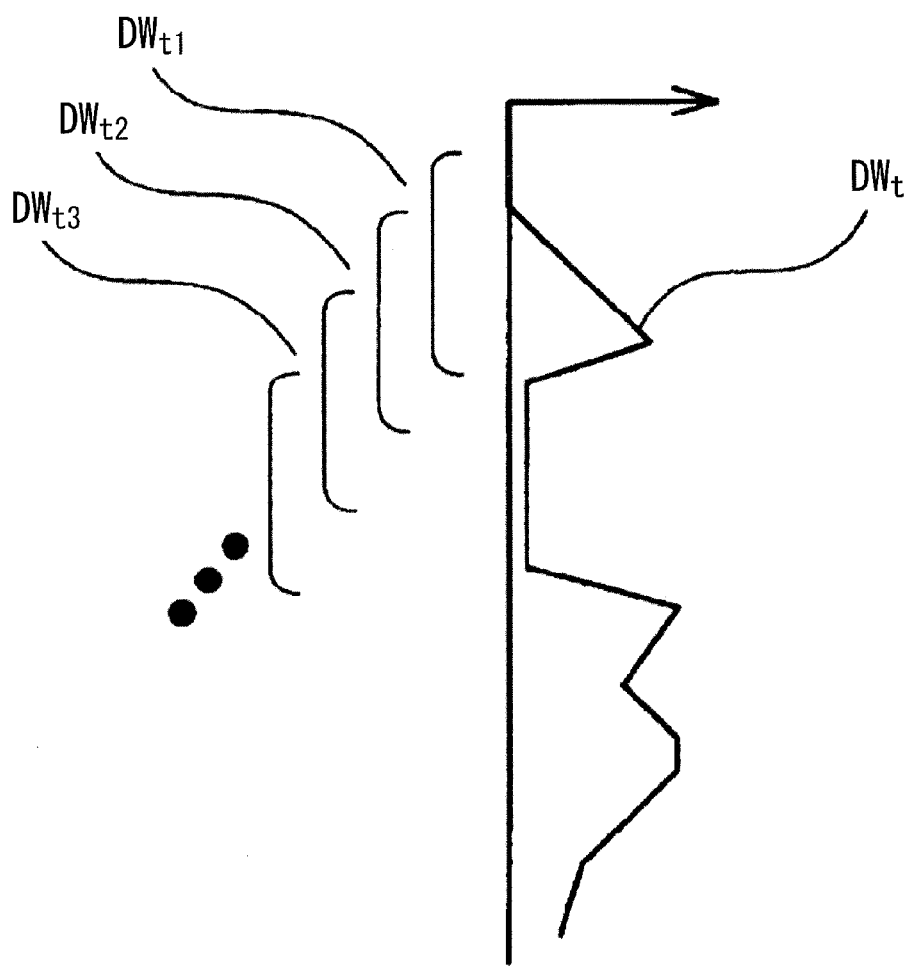
FIG. 18 A figure showing small regions that are subdivided by the three dimensional body detection unit of FIG. 15.

To explain this in more detail, as shown in FIG. 18, the three dimensional body detection unit 33 divides the differential waveform $DW_t$ into a plurality of small regions $DW_{t1}$ through $DW_{tn}$ (where n is any desired integer equal to two or greater). FIG. 18 is a figure showing these small regions $DW_{t1}$ through $DW_{tn}$ that have thus been subdivided by the three dimensional body detection unit 33. These small regions $DW_{t1}$ through $DW_{tn}$ are subdivided so as to overlap one another, as shown for example in FIG. 18. For example, the small region $DW_{t1}$ and the small region $DW_{t2}$ may overlap one another, and the small region $DW_{t2}$ and the small region $DW_{t3}$ may overlap one another.

Next, the three dimensional body detection unit 33 obtains an offset amount for each of the small regions $DW_{t1}$ through $DW_{tn}$ (i.e. a shifting amount for the differential waveform along the direction of the horizontal axis (the vertical direction in FIG. 18)). Here, the offset amount is obtained from the difference between the differential waveform $DW_{t-1}$ one time point before and the differential waveform $DW_t$ at the present time point (i.e. the distance along the direction of the horizontal axis). At this time, for each of the small regions $DW_{t1}$ through $DW_{tn}$, when shifting the differential waveform $DW_{t-1}$ one time before in the direction of the horizontal axis, the three dimensional body detection unit 33 determines the position (i.e. the position in the direction of the horizontal axis) at which the error with respect to the differential waveform $DW_t$ at the present time point becomes a minimum, and determines the shifting amount in the direction of the horizontal axis between the original position of the differential waveform $DW_{t-1}$ and the position at which the error becomes minimum, as being the offset amount. And the three dimensional body detection unit 33 constructs a histogram by counting the offset amounts obtained for each of the small regions $DW_{t1}$ through $DW_{tn}$.

Figure 19:
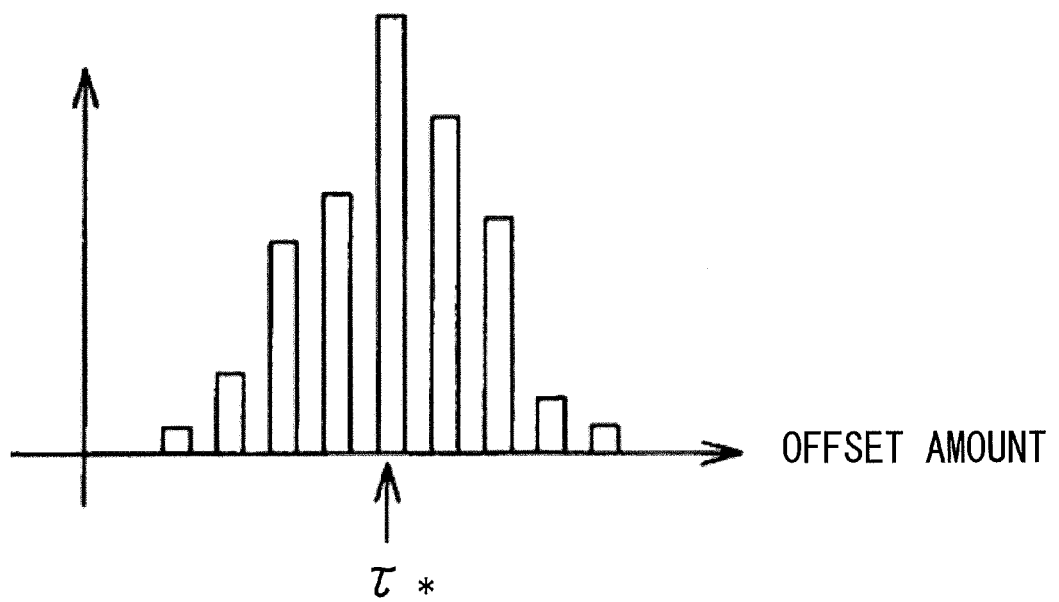
FIG. 19 A figure showing an example of a histogram that is obtained by the three dimensional body detection unit of FIG. 15.

FIG. 19 is a figure showing an example of such a histogram that is obtained by the three dimensional body detection unit 33. As shown in FIG. 19, there is a certain amount of random variation in the offset amounts, that are the shifting amounts that make minimum the errors between each of the small regions $DW_{t1}$ through $DW_{tn}$ and the differential waveform $DW_{t-1}$ one time before. Due to this, the three dimensional body detection unit 33 constructs a histogram from the offset amounts in which such random variation is included, and calculates the shifting distance from this histogram. At this time, the three dimensional body detection unit 33 calculates the shifting distance of the three dimensional body from the local maximum value of the histogram. In other words, in the example shown in FIG. 19, the three dimensional body detection unit 33 calculates the offset amount that yields the local maximum value of the histogram as being the shifting distance $\tau^*$. It should be understood that this shifting distance $\tau^*$ is the relative shifting distance of the other vehicle VX with respect to the subject vehicle V. Due to this, when the absolute shifting distance is to be calculated, the three dimensional body detection unit 33 finally calculates the absolute shifting distance on the basis of the shifting distance $\tau^*$ that has been obtained and the signal from the vehicle speed sensor 5.

Figure 20:
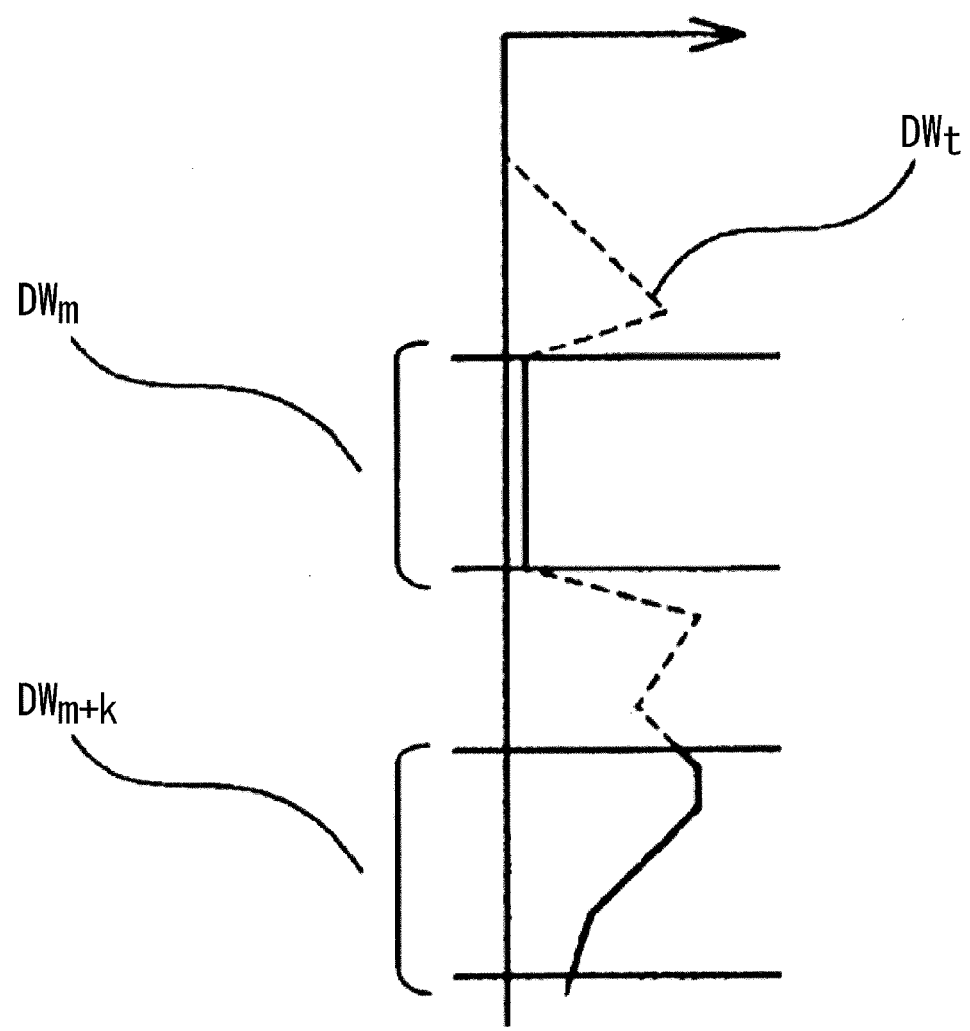
FIG. 20 A figure showing weightings assigned by the three dimensional body detection unit of FIG. 15.

It should be understood that, for constructing this histogram, it would also be acceptable for the three dimensional body detection unit 33 to assign a weighting to each of the plurality of small regions $DW_{t1}$ through $DW_{tn}$, and to construct the histogram by reckoning the offset amount obtained for each of the small regions $DW_{t1}$ through $DW_{tn}$ according to its weighting. FIG. 20 is a figure showing this type of weighting by the three dimensional body detection unit 33.

As shown in FIG. 20, the small region $DW_m$ (where m is an integer from 1 to n−1) is flattened. In other words, in the small region $DW_m$, the difference between the maximum value and the minimum value of the count of the number of pixels that gives the predetermined differential becomes small. The three dimensional body detection unit 33 assigns a low weighting to this type of small region $DW_m$. This is because there are no particular characteristics for a flat small region $DW_m$, so that the possibility is high that the error during calculation of the offset amount may become great.

On the other hand, the small region $DW_{m+k}$ (where k is an integer less than or equal to n−m) is full of variations. In other words, in this small region $DW_m$, the difference between the maximum value and the minimum value of the count of the number of pixels that gives the predetermined differential becomes great. The three dimensional body detection unit 33 assigns a high weighting to this type of small region $DW_m$. This is because this small region $DW_{m+k}$ that is full of variations is particularly distinguished, so that the possibility is high that the calculation of the offset amount can be performed accurately. By assigning weightings in this manner, it is possible to enhance the accuracy of calculation of the shifting distance.

It should be understood that while in the embodiment described above, in order to enhance the accuracy of calculation of the shifting distance, the differential waveform $DW_t$ was subdivided into the plurality of small regions $DW_{t1}$ through $DW_{tn}$, it would also be possible not to subdivide the differential waveform $DW_t$ into the small regions $DW_{t1}$ through $DW_{tn}$, if a very great accuracy for calculation of the shifting distance is not required. In this case, the three dimensional body detection unit 33 would calculate the shifting distance from the offset amount of the differential waveform $DW_t$ when the error between the differential waveform $DW_t$ and the differential waveform $DW_{t-1}$ becomes a minimum. In other words, the method of obtaining an offset amount between the differential waveform $DW_{t-1}$ one time point before and the differential waveform $DW_t$ at the present time point is not to be considered as being limited by the details described above.

Returning to FIG. 15, the other vehicle recognition unit 204b comprises a smearing detection unit 40. From the image data that was obtained by image capture by the camera 1, this smearing detection unit 40 detects regions in which smearing has occurred. It should be understood that, since smearing is a white bleeding phenomenon that is generated in the CCD image sensor or the like, accordingly it would be possible to eliminate the smearing detection unit 40 if the camera 1 that is employed uses a CMOS image sensor and the like, with which this type of smearing does not take place.

Figure 21:
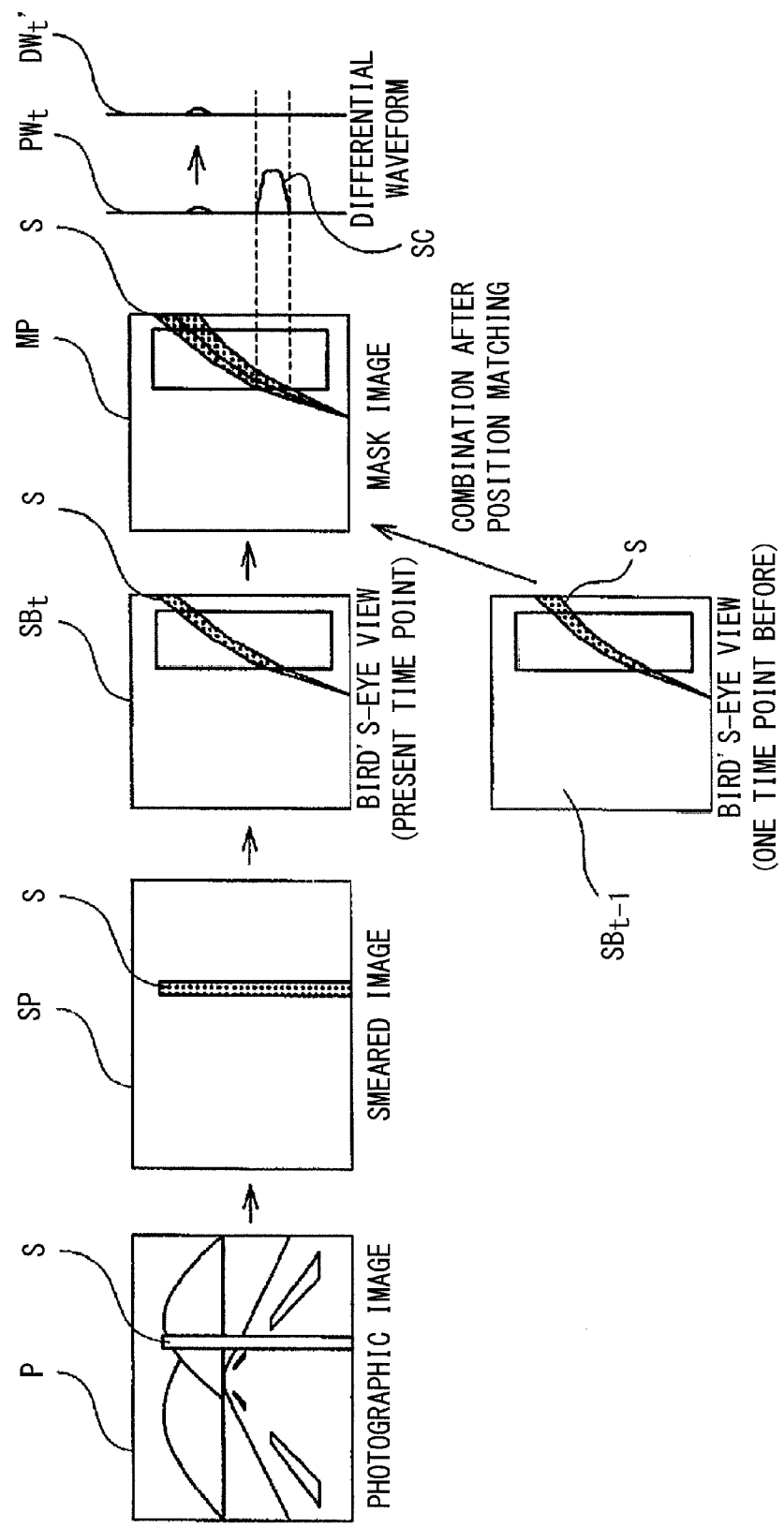
FIG. 21 A figure showing processing performed by a smearing detection unit of FIG. 15 and differential waveform calculation processing that is performed, FIG. 22 A figure showing another example of a histogram obtained by the three dimensional body detection unit of FIG. 15.

FIG. 21 is a figure showing certain images for explanation of the processing performed by the smearing detection unit 40 and of the calculation processing of the differential waveform $DW_t$ due thereto. It will be supposed that, first, captured image data P in which smearing S is present is inputted to the smearing detection unit 40. At this time, the smearing detection unit 40 detects this smearing S from the captured image P. While methods of various types may be used for detecting such smearing S, for example, in the case of a typical CCD (Charge Coupled Device) camera, smearing S only occurs downward in the image from the light source. Due to this, in this embodiment, regions having luminance values greater than or equal to a predetermined value, and that moreover are continuous in the vertical direction, are searched for from the lower side of the image towards its upper side, and these are specified as being regions in which smearing S is present.

Furthermore, the smearing detection unit 40 generates data for a smeared image SP by setting the pixel value to "1" for spots where smearing S is occurring, and by setting it to "0" in other places. After this data generation, the smearing detection unit 40 transmits the data for the smeared image SP to the point of view conversion unit 31. Moreover, upon input of this data for the smeared image SP, the point of view conversion unit 31 performs point of view conversion upon this data to the state as seen in a bird's-eye view. By doing this, the point of view conversion unit 31 generates data for a smeared bird's-eye view image $SB_t$. After this generation, the point of view conversion unit 31 transmits the data for this smeared bird's-eye view image $SB_t$ to the position matching unit 33. Moreover, the point of view conversion unit 31 also transmits the data for the smeared bird's-eye view image $SB_{t-1}$ one time point before to the position matching unit 33.

The position matching unit 32 performs position matching upon the data for the smeared bird's-eye view images $SB_t$ and $SB_{t-1}$. In concrete terms, this is the same position matching as when position matching is performed upon the data for the bird's-eye view images $PB_t$ and $PB_{t-1}$. Moreover, after the position matching, the position matching unit 32 takes the logical sum of the regions where smearing S occurred in the smeared bird's-eye view images $SB_t$ and $SB_{t-1}$. By doing this, the position matching unit 32 generates data for a mask image MP. After having generated this data, the position matching unit 32 transmits this data for the mask image MP to the three dimensional body detection unit 33.

The three dimensional body detection unit 33 takes the counted number for the frequency distribution as being zero for spots where smearing S has occurred in the regions in the mask image MP. In other words, when the differential waveform $DW_t$ has been generated as shown in FIG. 21, the three dimensional body detection unit 33 sets the counted number SC due to the smearing S to zero, and generates a corrected differential waveform $DW_t'$.

It should be understood that the three dimensional body detection unit 33 of this embodiment obtains the shifting speed of the vehicle V (i.e. of the camera 1) and obtains the offset amount for a stationary object from this shifting speed that has been obtained. After having obtained the offset amount for the stationary object, the three dimensional body detection unit 33 calculates the shifting distance of the three dimensional body after having ignored the offset amounts among the local maximum values of the histogram corresponding to the stationary object.

Figure 22:
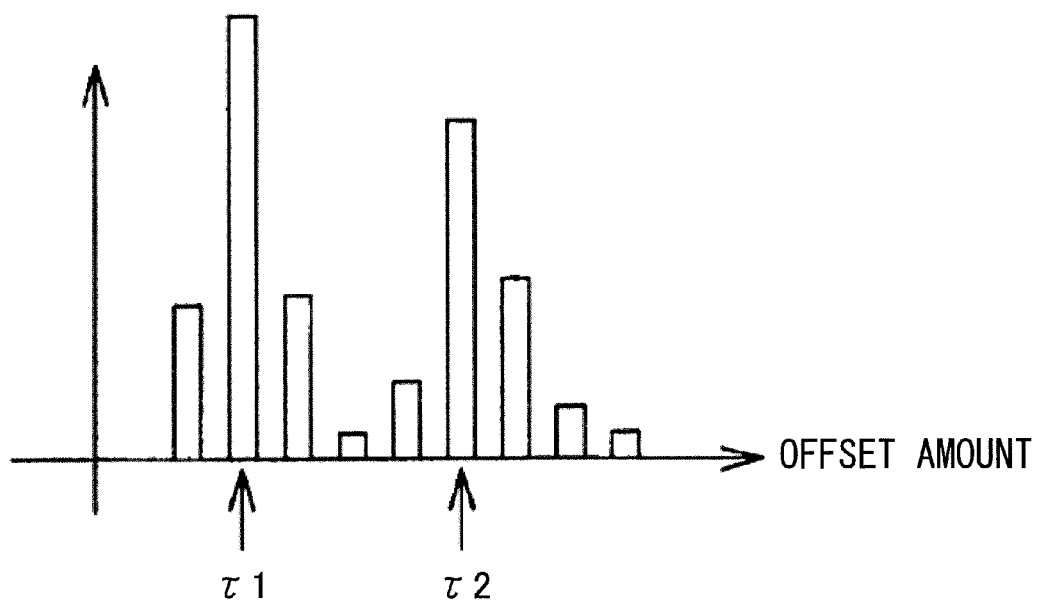

FIG. 22 is a figure showing another example of a histogram obtained by the three dimensional body detection unit 33. If a stationary object other than another vehicle VX is present within the angle of view of the camera 1, then two local maximum values τ1 and τ2 will appear in the histogram that is obtained. In this case, among these two local maximum values τ1 and τ2, either one may be the offset amount of the stationary object. Due to this, the three dimensional body detection unit 33 obtains the offset amount for the stationary object from the shifting speed, ignores the local maximum value that corresponds to this offset amount, and calculates the shifting distance of the three dimensional body by employing the other remaining local maximum value.

It should be understood that, if a plurality of local maximum values are present even though the offset amount that corresponds to a stationary object has been ignored, then it is supposed that a plurality of other vehicles VX are present within the angle of view of the camera 1. However, it is extremely rare for a plurality of other vehicles VX to be present within the detection regions A1 and A2. Due to this, the three dimensional body detection unit 33 stops the calculation of the shifting speed.

Figure 23:
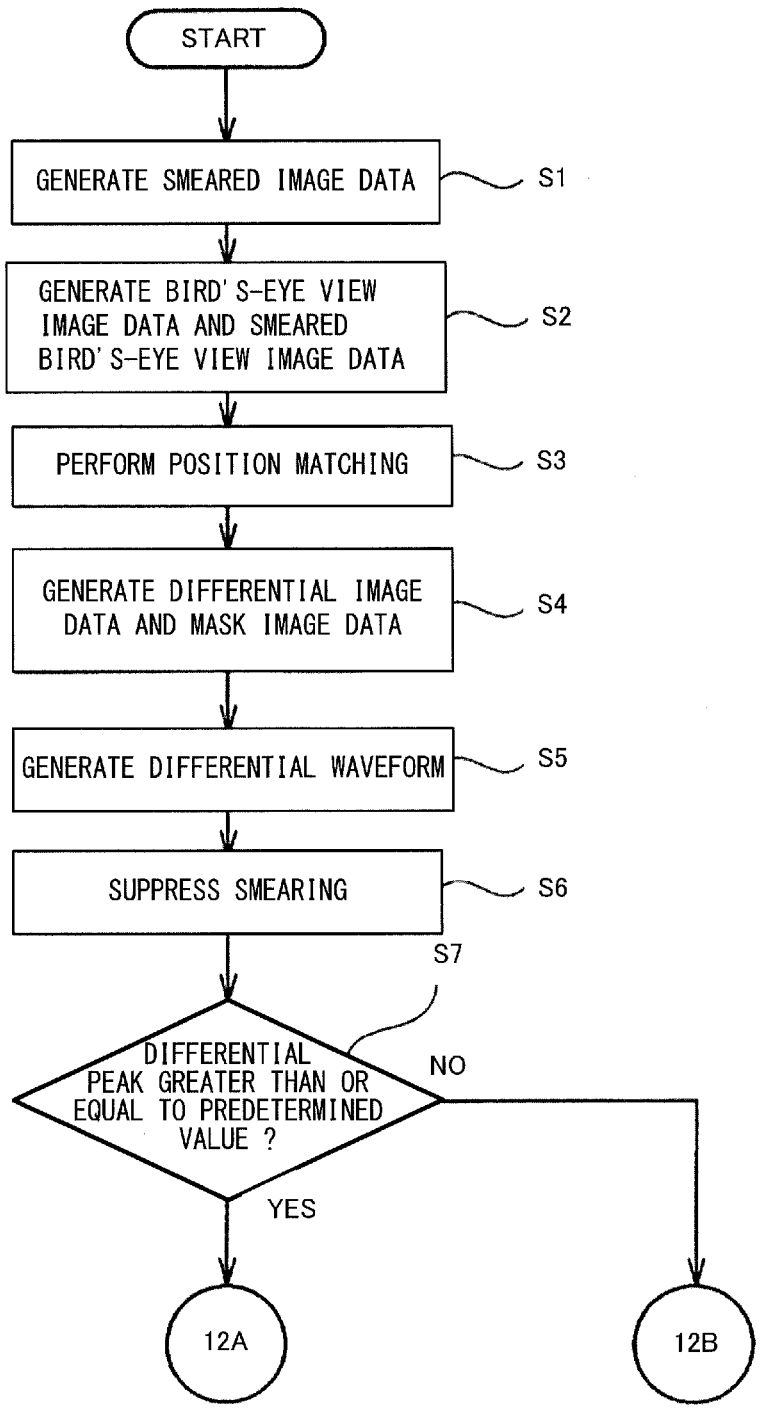
FIG. 23 A first part of a flow chart showing a three dimensional body detection method using differential waveform information, performed by a point of view conversion unit, the position matching unit, the smearing detection unit, and the three dimensional body detection unit of FIG. 15.
Figure 24:
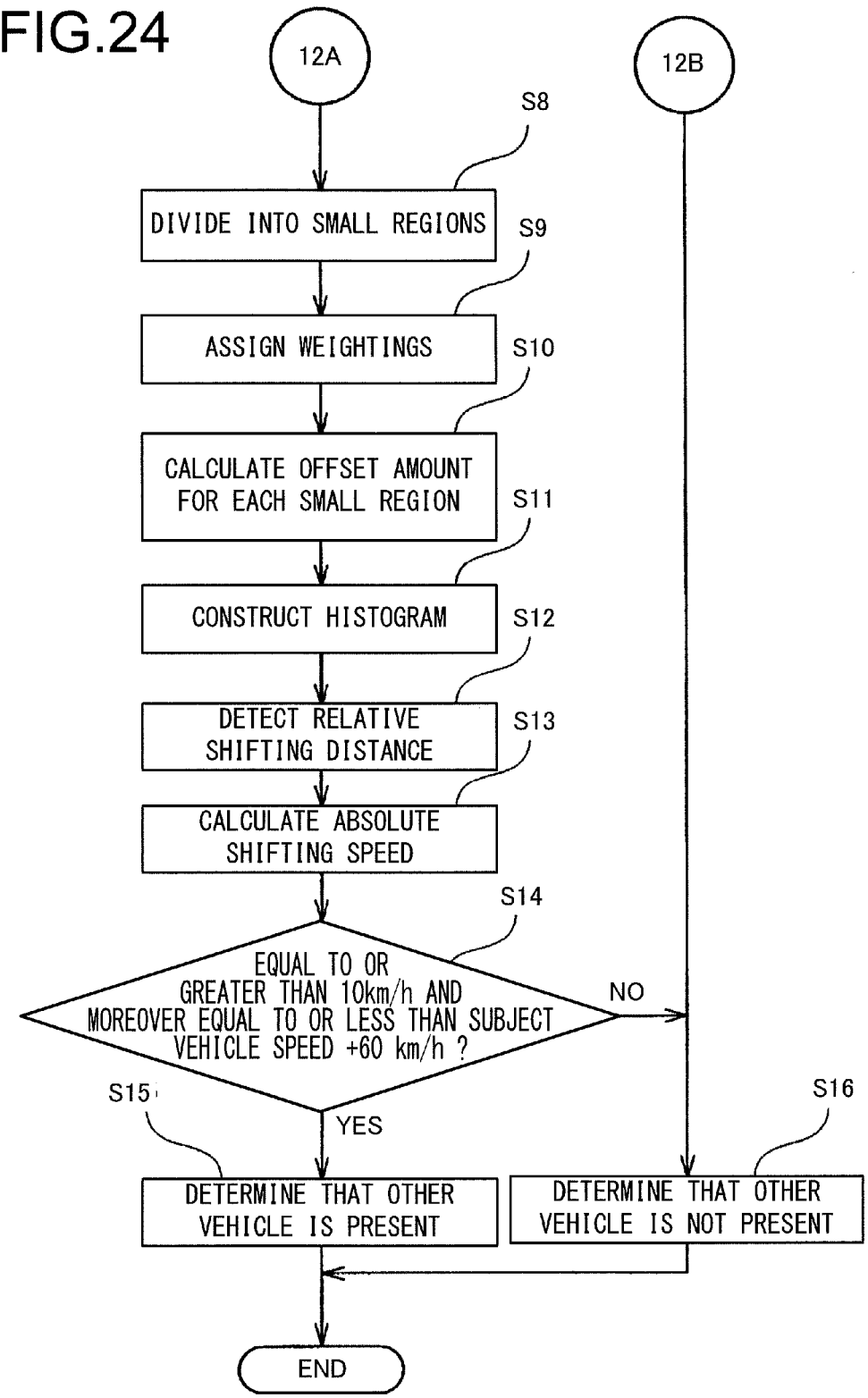
FIG. 24 A second part of the flow chart showing the three dimensional body detection method using differential waveform information, performed by the point of view conversion unit, the position matching unit, the smearing detection unit, and the three dimensional body detection unit of FIG. 15.

Next, the procedure for three dimensional body detection according to the differential waveform information will be explained. FIG. 23 and FIG. 24 are flow charts showing the three dimensional body detection procedure according to this embodiment. As shown in FIG. 23, first, the other vehicle recognition unit 204b inputs the data of the image P captured by the camera 1, and creates a smeared image SP using the smearing detection unit 40 (S1). Next, the point of view conversion unit 31 generates data for the bird's-eye view image $PB_t$ from the data for the captured image P from the camera 1, and also generates data for the smeared bird's-eye view image $SB_t$ from the data for the smeared image SP (S2).

And the position matching unit 33 performs position matching between the data for the bird's-eye view image $PB_t$ and the data for the bird's-eye view image $PB_{t-1}$ one time point before, and also performs position matching between the data for the smeared bird's-eye view image $SB_t$ and the data for the smeared bird's-eye view image $SB_{t-1}$ one time point before (S3). After this position matching, the position matching unit 33 generates data for the differential image $PD_t$, and also generates data for the mask image MP (S4). Thereafter, the three dimensional body detection unit 33 generates the differential waveform $DW_t$ from the data for the differential image $PD_t$ and the data for the differential image $PD_{t-1}$ one time before (S5). And, after having generated the differential waveform $DW_t$, for the differential waveform $DW_t$, the three dimensional body detection unit 33 sets the count number corresponding to the region where the smearing S occurs to zero, and suppresses the influence due to the smearing S (S6).

Then the three dimensional body detection unit 33 determines whether or not the peak of the differential waveform $DW_t$ is greater than or equal to a first threshold value α (S7). While this first threshold value α is set in advance and can also be changed according to a control command from the control unit 39 shown in FIG. 15, the details thereof will be explained hereinafter. Here, if the peak of the differential waveform $DW_t$ is not greater than or equal to the first threshold value α, in other words if there is almost no differential, then it is considered that no three dimensional body is present within the captured image P. Due to this, if it is decided that the peak of the differential waveform $DW_t$ is not greater than or equal to the first threshold value α (NO in S7), then the three dimensional body detection unit 33 determines that no three dimensional body is present, so that no other vehicle is present that could constitute an obstacle (S16 in FIG. 24). And in this case the processing shown in FIG. 23 and FIG. 24 terminates.

On the other hand, if it is determined that the peak of the differential waveform $DW_t$ is greater than or equal to the first threshold value α (YES in S7), then the three dimensional body detection unit 33 determines that a three dimensional body is present, and divides up the differential waveform $DW_t$ into the plurality of small regions $DW_{t1}$ through $DW_{tn}$ (S8). Next, the three dimensional body detection unit 33 assigns weightings to these small regions $DW_{t1}$ through $DW_{tn}$ (S9). Subsequently, the three dimensional body detection unit 33 calculates an offset amount for each of the small regions $DW_{t1}$ through $DW_{tn}$ (S10), and constructs a histogram by taking these weightings into account (S11).

And, on the basis of this histogram, the three dimensional body detection unit 33 calculates the relative shifting distance, i.e. the shifting distance of the three dimensional body with respect to the subject vehicle V (S12). Next, the three dimensional body detection unit 33 calculates the absolute shifting speed of the three dimensional body from the relative shifting distance (S13). At this time, the three dimensional body detection unit 33 calculates the absolute shifting speed by calculating the relative shifting speed by differentiating the relative shifting distance with respect to time, and by then adding thereto the speed of the subject vehicle V as detected by the speed sensor 5.

Subsequently, the three dimensional body detection unit 33 determines whether or not the absolute shifting speed of the three dimensional body is 10 km/h or greater, and moreover the relative shifting speed of the three dimensional body with respect to the subject vehicle V is 60 km/h or less (S14). If both these conditions are satisfied (S14: YES), then the three dimensional body detection unit 33 decides that the three dimensional body is another vehicle VX (S15). And then the processing shown in FIG. 23 and FIG. 24 terminates. On the other hand, if either one of the above conditions is not satisfied (S14: NO), then the three dimensional body detection unit 33 decides that no other vehicle is present (S16). And then the processing shown in FIG. 23 and FIG. 24 terminates.

It should be understood that, in this embodiment, the detection regions A1 and A2 rearward and sideways from the subject vehicle V are established so that, in particular, detection of another vehicle VX that is traveling in an adjacent road lane next to the road lane in which the subject vehicle is traveling and to which it is necessary for the subject vehicle V to pay attention during traveling places great emphasis upon whether or not there is a possibility of contact when the subject vehicle V changes road lanes. This is in order to determine whether or not, when the subject vehicle V changes road lanes, there is a possibility of contact with the other vehicle VX that is traveling on an adjacent road lane next to the road lane upon which the subject vehicle is traveling. The processing of step S14 is executed for this reason. In other words, supposing that the system of this embodiment is being operated upon a high speed road, if the speed of the three dimensional body is less than 10 km/h, then, even if for example some other vehicle VX is present, still it is unlikely for a problem to develop when the subject vehicle V changes road lanes, since that other vehicle VX is positioned far rearward of the subject vehicle V. In a similar manner, if the relative shifting speed of the three dimensional body relative to the subject vehicle V is greater than +60 km/h (in other words, if the three dimensional body is shifting at a speed that is more than +60 km/h faster than the speed of the subject vehicle V), then it is unlikely for a problem to develop when the subject vehicle V changes road lanes, since it will have shifted to be ahead of the subject vehicle V. Due to this it may be said that, in step S14, it is decided whether the three dimensional body is another vehicle VX that may constitute a problem during changing of road lanes.

Moreover, by determining in step S14 whether or not the absolute shifting speed of the three dimensional body is 10 km/h or greater and also the relative shifting speed of the three dimensional body with respect to the subject vehicle V is 60 km/h or less, the following beneficial effects are obtained. For example a case may occur in which, due to an error in mounting the camera 1, the absolute shifting speed of an actually stationary object is detected as being a few km/h, and this is undesirable. Accordingly, by determining whether or not that speed is 10 km/h or greater, it is possible to reduce the possibility of undesirably determining that an actually stationary object is another vehicle VX. Moreover, it may occur that, due to noise, the relative speed of the three dimensional body with respect to the subject vehicle V is undesirably detected as being a speed greater than +60 km/h. Accordingly, it is possible to reduce the possibility of erroneous detection due to noise by determining whether or not the relative speed is +60 km/h or less.

The threshold value of the relative shifting speed for determining upon the presence of another vehicle VX may be set in step S14 as desired. For example, it would be possible to set threshold values for the relative shifting speed so that it is required to be greater than or equal to −20 km/h and less than or equal to 100 km/h. Here, the negative lower limit value is a lower limit value for the shifting speed when the object that has been detected is shifting rearward from the subject vehicle VX, in other words for the shifting speed when the detected object is in the state of moving rearward. While this threshold value may be set as appropriate in advance, it may also be varied according to a control command from the control unit 39, as will be described hereinafter.

Furthermore, instead of the processing of step S14, it would also be acceptable to arrange to determine whether the absolute shifting speed is not negative, or whether it is not 0 km/h. Moreover, since in this embodiment great emphasis is placed upon whether or not there is a possibility of contact when the subject vehicle V changes road lanes, accordingly, if another vehicle VX has been detected in step S15, it would also be acceptable to arrange to emit a warning sound to the driver of the subject vehicle, or to provide display of a warning with a predetermined display device.

According to the procedure of this example for detecting a three dimensional body according to the differential waveform information, the differential waveform $DW_t$ is generated by counting the number of pixels that exhibit a predetermined differential along the direction in which the three dimensional body is distorted by the point of view conversion, and constructing a frequency distribution. Here, by a pixel in the data for the differential image $PD_t$ that exhibits a predetermined differential, is meant a pixel that has changed from the image at a different time point, or, to put it in another manner, a spot where a three dimensional body is present. Due to this, at a spot where a three dimensional body is present, a three dimensional waveform $DW_t$ is generated by counting the number of pixels along the direction in which the three dimensional body is distorted and constructing a frequency distribution. In particular, since the number of pixels is counted along the direction in which the three dimensional body is distorted, the differential waveform $DW_t$ is generated from the information relating to the three dimensional body along its height direction. And the shifting distance of the three dimensional body is calculated from the change over time of the differential waveform $DW_t$ that includes this information relating to the height direction. Due to this, as compared with a case in which attention is simply paid to the shifting of a single point, it is easy for the same spot on the three dimensional body to be employed for specifying information including information in the height direction for the detection spot before a change over time and for the detection spot after that change, so that the shifting distance is calculated from the change over time at a single spot, and accordingly it is possible to enhance the accuracy of calculation of the shifting distance.

Furthermore, the count number in the frequency distribution for the differential waveform $DW_t$ is set to zero for a spot that corresponds to a region where smearing S has occurred. Due to this, a waveform site that occurs due to smearing S in the differential waveform $DW_t$ comes to be eliminated, and accordingly it is possible to prevent such smearing S from causing erroneous identification of a three dimensional body.

Moreover, the shifting distance of the three dimensional body is calculated from the offset amount of the differential waveform $DW_t$ when the deviation from the differential waveform $DW_t$ generated at a different time point becomes a minimum. Due to this, the shifting distance is calculated from the offset amount of one dimensional information, i.e. of the waveform, so that it is possible to reduce the cost of calculation during calculation of the shifting distance.

Yet further, the differential waveform $DW_t$ that is generated at different time points is subdivided into the plurality of small regions $DW_{t1}$ through $DW_{tn}$. By performing this subdivision into the plurality of small regions $DW_{t1}$ through $DW_{tn}$ in this manner, it is possible to obtain a plurality of waveforms that appear at each spot of the three dimensional body. Moreover, the shifting distance of the three dimensional body is calculated by obtaining the offset amounts when the deviations of the waveforms in each of the small regions $DW_{t1}$ through $DW_{tn}$ become minimum, and by constructing a histogram in which these offset amounts that have been obtained for each of the small regions $DW_{t1}$ through $DW_{tn}$ are counted. Due to this, an offset amount is obtained at each spot on the three dimensional body, and the shifting distance is obtained from this plurality of offset amounts, so that it is possible to enhance the accuracy of calculation of the shifting distance.

Furthermore, a weighting may be assigned to each of the small regions $DW_{t1}$ through $DW_{tn}$, and the histogram is constructed by counting the offset amounts that have been obtained for each of the small regions $DW_{t1}$ through $DW_{tn}$ according to their weightings. Due to this, it is possible to calculate the shifting distance yet more appropriately by assigning high weightings to the regions that are particularly distinguished and by assigning low weightings to the regions that have no particular characteristics. Accordingly, it is possible to improve the accuracy at which the shifting distance is calculated by yet a further level.

Moreover, for each of the small regions $DW_{t1}$ through $DW_{tn}$ of the differential waveform $DW_t$, the weighting is made to be the higher, the greater is the difference between the maximum value and the minimum value of the count of the number of pixels that exhibit the predetermined differential. Due to this, the weightings become greater for regions in which the differential between the maximum value and the minimum value is large and that exhibit distinctive variations, while the weightings become smaller for uniform regions in which the variations are small. Here, since it is geometrically easier to obtain the offset amounts accurately for regions in which the variations are high than for flat regions, accordingly, by making the weightings higher for regions in which the differential between the maximum value and the minimum value is greater, it is possible to enhance the accuracy of calculation of the shifting distance by yet a further level.

Furthermore, the shifting distance of the three dimensional body is calculated from the local maximum value of the histogram that is obtained by counting the offset amounts obtained for each of the small regions $DW_{t1}$ through $DW_{tn}$. Due to this, even if there is a certain random variation in the offset amounts, it is still possible to calculate the shifting distance at higher accuracy from this local maximum value.

Moreover, since the offset amount for a stationary object is obtained and this offset amount is ignored, accordingly it is possible to prevent the occurrence of undesirable reduction of the accuracy of calculation of the shifting distance of the three dimensional body due to that stationary object. Moreover if, after having ignored the offset amount corresponding to a stationary object, there are still a plurality of local maximum values, then the calculation of the shifting distance of the three dimensional body is halted. Due to this, it is possible to prevent erroneous calculation of the shifting distance from being performed, such as in a case in which there are a plurality of local maximum values.

It should be understood that while, in the embodiment described above, the speed of the subject vehicle V is determined on the basis of the signal from the vehicle speed sensor 5, this is not to be considered as being limitative; it would also be acceptable to arrange for the vehicle speed to be estimated from a plurality of images that are taken at different time points. In this case the vehicle speed sensor would be unnecessary, so that it would be possible to anticipate simplification of the structure.

Furthermore while, in the embodiment described above, the image captured at the present time point and the image one time point before are converted into bird's-eye views, the differential image $PD_t$ is created after having performed position matching upon these bird's-eye views after conversion, and the differential waveform $DW_t$ is generated by evaluating this differential image $PD_t$ that has been created along its direction of distortion (i.e. along the direction of distortion of a three dimensional body when the captured image is converted into a bird's-eye view image), this is not to be considered as being limitative. For example, it would also be acceptable to convert only the image one time point before into a bird's-eye view, to convert the bird's-eye view after conversion into a corresponding image that has been captured a second time after having performed position matching, to generate a differential image between this image and the image at the present time point, and to generate the differential waveform $DW_t$ by evaluating this differential image that has been created along a direction corresponding to its direction of distortion (in other words, a direction obtained by converting the direction of distortion into a direction upon the captured image). In other words, it would also be acceptable not necessarily to generate a clear bird's-eye view, provided that it is possible to perform position matching between the image at the present time point and the image one time point before, to generate a differential image PD$_t$ from the differential between the two images after having performed position matching, and to evaluate this differential image PD$_t$ along the direction of distortion of a three dimensional body when performing conversion into a bird's-eye view.

<<Detection of a Three Dimensional Body from the Edge Information>>

Figure 25:
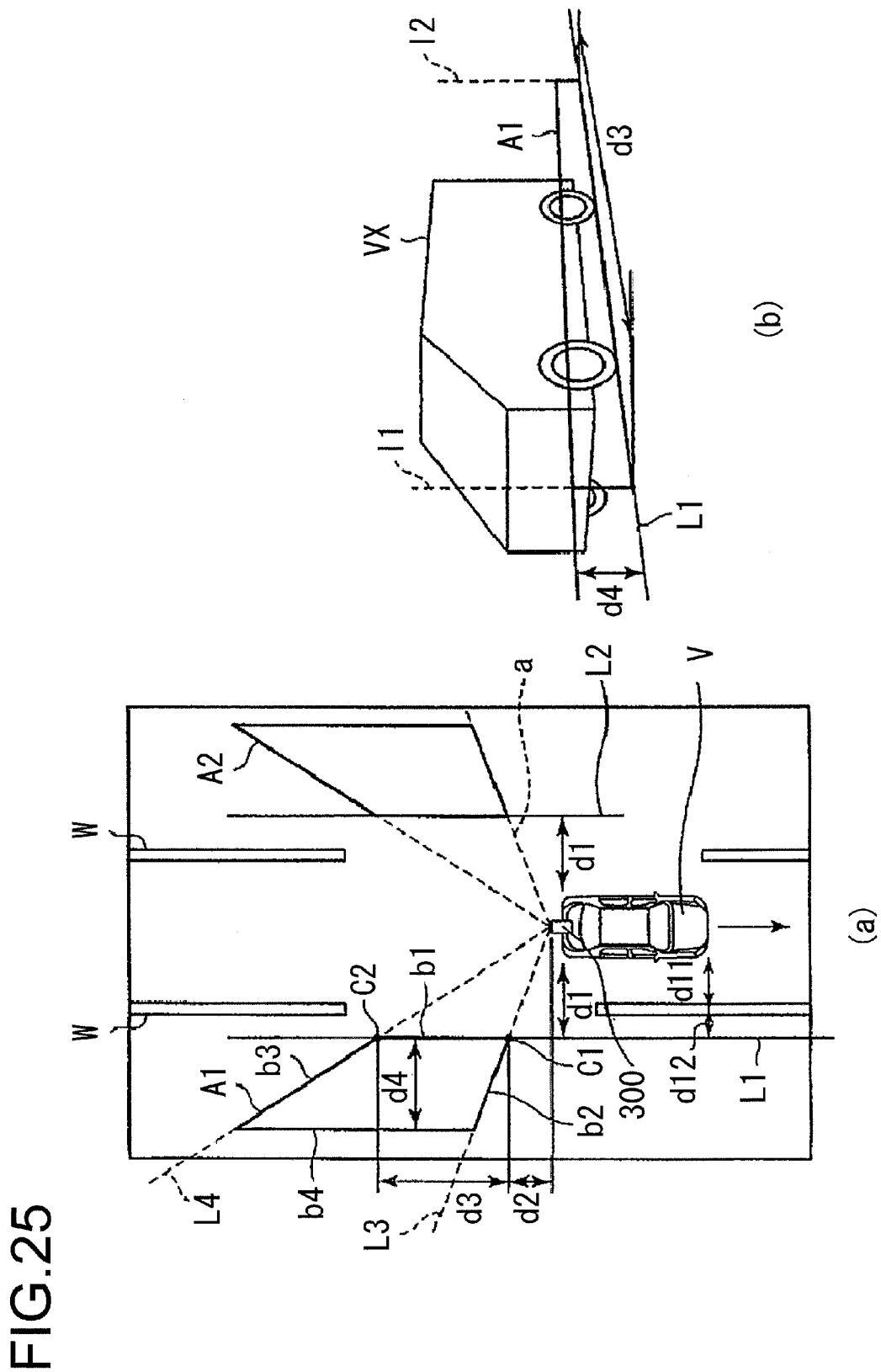
FIG. 25 A figure showing the running state of the vehicle of FIG. 13 (for three dimensional body detection using edge information)

Next, the use will be explained of the detection block B for a three dimensional body that employs edge information, with which it is possible to operate instead of the detection block A shown in FIG. 15, and that comprises the luminance difference calculation unit 35, the edge line detection unit 36, and the three dimensional body detection unit 37. FIG. 25 is a figure showing the image capturing range of the camera 1 of FIG. 15 and so on: FIG. 25(*a*) is a plan view, and FIG. 25(*b*) is a perspective view, both showing the image capturing range rearwards and sideways from the subject vehicle V in actual space. As shown in FIG. 25(*a*), the camera 1 is fitted so as to have the predetermined angle of view a, and captures the image rearward and sideways of the subject vehicle V that is included in this predetermined angle of view a. In a similar manner to the case in FIG. 14, the angle of view a of the camera 1 is set so as to include the adjacent road lanes in its image capture range, in addition to the road lane in which the subject vehicle V is traveling.

The detection regions A1 and A2 of this example are shaped as trapezoids in plan view (i.e. in the state as seen in a bird's-eye view), and the positions, the sizes, and the shapes of these detection regions A1 and A2 are determined on the basis of distances $d_1$ through $d_4$. It should be understood that the detection regions A1 and A2 of the example shown in this figure are not limited to having trapezoidal shapes; it would also be acceptable for them to have other shapes in the state as seen in a bird's-eye view, such as rectangular shapes or the like, as shown in FIG. 14.

Here, the distance d1 is the distance from the subject vehicle V to the ground lines L1 and L2. The ground lines L1 and L2 mean the lines where a three dimensional body that is present in a road lane adjacent to the road lane in which the subject vehicle V is traveling contacts the surface of the ground. In this embodiment, the objective is to detect another vehicle VX or the like (this also includes a two wheeled vehicle or the like) that is traveling in a road lane adjacent to the road lane of the subject vehicle V, rearward and sideways left or right from the subject vehicle V. Due to this, from the distance d11 from the subject vehicle V to the white line W and from the distance d12 from the white line W to the position where it is forecast that the other vehicle VX will be traveling, it is possible to determine in an approximately constant manner the distance d1, that is the position at which the ground line L1 or L2 of another vehicle VX will be located.

Moreover, the present invention is not limited to the case in which the distance d1 is determined as being fixed; it could also be arranged for this distance d1 to be variable. In this case, the other vehicle recognition unit 204*b* would recognize the position of the white line W with respect to the subject vehicle V by employing a technique for white line recognition or the like, and would determine the distance d11 on the basis of the position of the white line W that has been recognized. By doing this, the distance d1 could be set in a variable manner by using the distance d11 that has thus been determined. In the following description of this embodiment, it will be supposed that the distance d1 has been determined in a fixed manner, since the position at which the other vehicle VX is traveling (i.e. its distance d12 from the white line W) and the position at which the subject vehicle V is traveling (i.e. its distance d11 from the white line W) are approximately determined.

The distance d2 is a distance extending in the direction of progression of the vehicle from the rear end portion of the subject vehicle V. This distance d2 is determined so that at least the detection regions A1 and A2 are included within the angle of view of the camera 1. In particular, in this embodiment, the distance d2 is set so as to contact against a range that is determined by the angle of view a. And the distance d3 is a distance specifying the lengths of the detection regions A1 and A2 in the direction of progression of the vehicle. This distance d3 is determined on the basis of the size of the three dimensional body that is the subject of detection. In this embodiment, since the subject of detection is another vehicle VX or the like, accordingly the distance d3 is set to a length that will include such another vehicle VX.

As shown in FIG. 25(*b*), the distance d4 is a distance that specifies a height in actual space that is set so as to include the tires of the other vehicle VX and so on. The distance d4 is made to be the length shown in FIG. 25(*a*) in the image as seen in a bird's-eye view. It should be understood that it is also possible to make the distance d4 be a length that, as seen in the bird's-eye view image, does not include further road lanes adjacent to the adjacent road lanes to the left and right (i.e. the two outside neighboring road lanes). If two neighboring road lanes from the road lane of the subject vehicle V are included, then this is undesirable, because it becomes impossible to distinguish whether another vehicle VX is present in the adjacent road lane to the left or right of the subject vehicle lane that is the road lane in which the subject vehicle V is traveling, or whether that other vehicle VX is present in one of the two outside neighboring lanes.

As described above, the positions, sizes, and shapes of the detection regions A1 and A2 are determined by the distances d1 through d4 being determined. To explain this in concrete terms, the positions of the upper edges b1 of the detection regions A1 and A2, that outline the trapezoids, are determined by the distances d1. And the start positions C1 of the upper edges b1 are determined by the distances d2. Moreover, the end point positions C2 of the upper edges b1 are determined by the distances d3. And the sides b2 of the detection regions A1 and A2, that outline the trapezoids, are determined by the straight lines L3 that extend from the camera 1 toward the start point positions C1. In a similar manner, the sides b3 of the detection regions A1 and A2, that outline the trapezoids, are determined by the straight lines L4 that extend from the camera 1 towards the end point positions C2. And the positions of the lower sides b4 of the detection regions A1 and A2, that outline the trapezoids, are determined by the distances d4. The regions that are surrounded by the sides b1 through b4 in this manner constitute the detection regions A1 and A2. And, as shown in FIG. 25(*b*), each of these detection regions A1 and A2 forms a right quadrilateral (i.e. a rectangle) in actual space rearwards and sideways from the subject vehicle V.

Returning to FIG. 15, the point of view conversion unit 31 inputs the captured image data of the predetermined region obtained by image capture by the camera 1. And the point of view conversion unit 31 performs point of view conversion processing upon this captured image data that has been inputted, thus converting it into bird's-eye view image data in the state of being seen in a bird's-eye view. By a state as seen in a bird's-eye view is meant a state as seen from the point of view of a virtual camera that is, for example, looking downward from the sky overhead in a vertically downward direction (or in a somewhat slanted orientation).

This point of view conversion may, for example, be performed according to the technique described in Japanese Laid-Open Patent Publication No. 2008-219063.

In order to detect the edges of a three dimensional body that is included in the bird's-eye view image, the luminance difference calculation unit 35 performs luminance difference calculation upon the bird's-eye view image data whose point of view has been converted by the point of view conversion unit 31. At each of a plurality of positions along one or more vertical virtual lines that extend in the vertical direction in actual space, the luminance difference calculation unit 35 calculates the luminance differences between two neighboring pixels at those positions. And the luminance difference calculation unit 35 may calculate these luminance differences either by a technique of setting one virtual line that extends in the vertical direction in actual space, or by a technique of setting two such vertical virtual lines.

This technique of setting two vertical virtual lines will now be explained in concrete terms. In the image whose point of view has been converted and that is now as seen in a bird's-eye view, the luminance difference calculation unit 35 sets a first vertical virtual line corresponding to a line segment that extends in the vertical direction in actual space, and a second vertical virtual line corresponding to a line segment that extends in the vertical direction in actual space and that is different from the first vertical virtual line. Along the first vertical virtual line and the second vertical virtual line, the luminance difference calculation unit 35 successively and repeatedly obtains the luminance differences of points on the first vertical virtual line and of points on the second vertical virtual line. In the following this operation of the luminance difference calculation unit 35 will be explained in detail.

Figure 26:
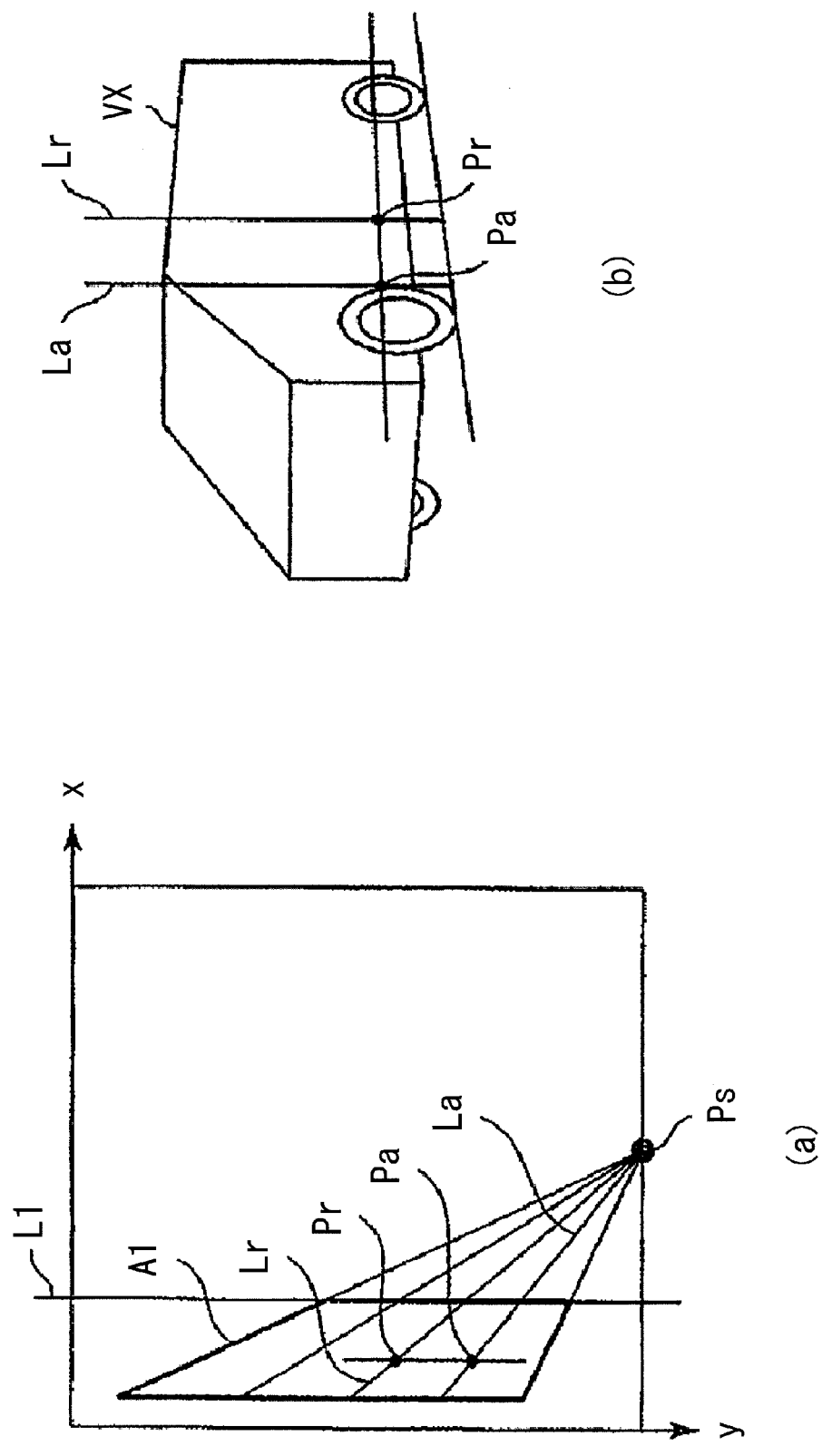
FIG. 26 A figure for explanation of the operation of a luminance difference calculation unit of FIG. 15.

As shown in FIG. 26(a), the luminance difference calculation unit 35 sets a first vertical virtual line La (hereinafter referred to as the "subject line La"), that corresponds to a line segment extending in the vertical direction in actual space, and that moreover passes through the detection region A1. Moreover, the luminance difference calculation unit 35 sets a second vertical virtual line Lr (hereinafter referred to as the "reference line Lr") that is different from the subject line La, also corresponding to a line segment extending in the vertical direction in actual space and moreover passing through the detection region A1. Here, the reference line Lr is set at a position that, in actual space, is separated from the subject line La by just a predetermined distance. It should be understood that, the lines corresponding to line segments extending in the vertical direction in actual space correspond to lines each extending radially from the position Ps of the camera 1 in the image as seen in a bird's-eye view. This widening out and radially extending line is a line along the direction in which the three dimensional body was distorted during the conversion to the bird's-eye view.

The luminance difference calculation unit 35 sets a subject point Pa upon the subject line La (i.e. a point upon the first vertical virtual line). Moreover, the luminance difference calculation unit 35 sets a reference point Pr upon the reference line Lr (i.e. a point upon the second vertical virtual line). The subject line La, the subject point Pa, the reference line Lr, and the reference point Pr have the relationship in actual space shown in FIG. 26(b). As is clear from FIG. 26(b), the subject line La and the reference line Lr are lines that extend in the vertical direction in actual space, and the subject point Pa and the reference point Pr are points that are set at approximately the same height in actual space. It should be understood that it is not necessary for the subject point Pa and the reference point Pr to be at precisely the same height; a certain amount of error is permitted, provided that the subject point Pa and the reference point Pr can be considered as being at the same height.

The luminance difference calculation unit 35 obtains the luminance difference between the subject point Pa and the reference point Pr. And, supposing that the luminance difference between the subject point Pa and the reference point Pr is large, then it is considered that an edge is present between the subject point Pa and the reference point Pr. Due to this, the edge line detection unit 36 shown in FIG. 15 detects an edge line on the basis of the luminance difference between the subject point Pa and the reference point Pr.

Figure 27:
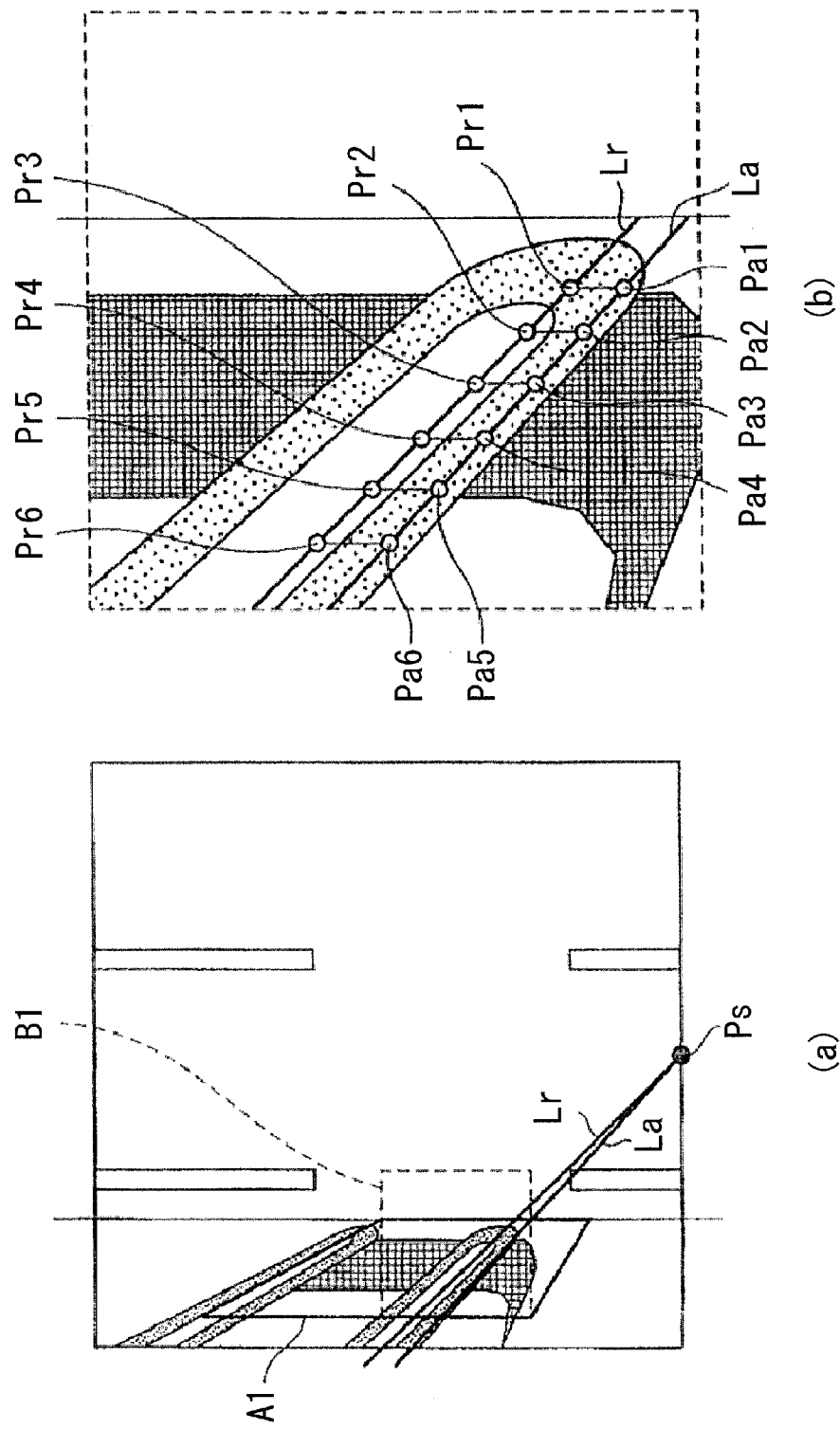
FIG. 27 A figure for explanation of the detailed operation of the luminance difference calculation unit of FIG. 15.

This point will now be explained in more detail. FIG. 27 is a figure showing the details of the operation of the luminance difference calculation unit 35: FIG. 27(a) shows a bird's-eye view image in the state as seen in a bird's-eye view, and FIG. 27(b) is an enlarged view of a portion B1 of the bird's-eye view image shown in FIG. 27(a). It should be understood that, while the explanation in FIG. 27 only relates to the detection region A1, the luminance difference is also calculated for the detection region A2, by a similar procedure.

If some other vehicle VX has been photographed within the image captured by the camera 1, then, as shown in FIG. 27(a), this other vehicle VX will appear in the detection region A1 in the bird's-eye view image. As shown in FIG. 27(b) that is an enlarged view of the region B1 in FIG. 27(a), it is supposed that, in the bird's-eye view image, the subject line La is set to be over the rubber portions of the tires of the other vehicle VX. In this state, first, the luminance difference calculation unit 35 sets the reference line Lr. The reference line Lr is set along the vertical direction at a position separated in actual space from the subject line La by just a predetermined distance. In concrete terms, with the in-vehicle surrounding environment recognition device 100 according to this embodiment, the reference line Lr is set at a position that is separated by just 10 cm in actual space from the subject line La. Due to this, in the bird's-eye view image, the reference line Lr is set to be over the wheels of the tires of the other vehicle VX, and for example may be separated from the rubber of the tires of the other vehicle VX by a distance corresponding to just 10 cm.

Next, the luminance difference calculation unit 35 sets a plurality of subject points Pa1 through PaN on the subject line La. In FIG. 27(b), for the convenience of explanation, six subject points Pa1 through Pa6 are set (in the following, if any one of these points is to be referred to, it will simply be termed the "subject point Pai"). It should be understood that the number of subject points that are set upon the subject line La may be set as desired. In the following explanation, it will be supposed that N subject points Pa have been set upon the subject line La.

Next, the luminance difference calculation unit 35 sets reference points Pr1 through PrN, so that they have the same heights in actual space as the subject points Pa1 through PaN. And the luminance difference calculation unit 35 calculates the luminance difference between each pair of the subject points Pa and the reference points Pr having the same height. Due to this, the luminance difference calculation unit 35 calculates the luminance differences between pairs of pixels for each of a plurality of positions (1 through N) extending along vertical virtual lines in the vertical direction in actual space. The luminance difference calculation unit 35, for example, calculates the luminance difference between the first subject point Pa1 and the first reference point Pr1, and then calculates the luminance difference between the second subject point Pa2 and the second reference point Pr2. Due to this, the luminance difference calculation unit 35 obtains successive luminance differences along the subject line La and the reference line Lr. In other words, the luminance difference calculation unit 35 then sequentially obtains the luminance differences between the third through the N-th subject points Pa3 through PaN and the third through the N-th reference points Pr3 through PrN, respectively.

While moving along the subject line La within the detection region A1, the luminance difference calculation unit 35 repeatedly performs processing to set the reference line Lr described above, to set the subject points Pa and the reference points Pr, and to calculate their luminance differences. In other words, the luminance difference calculation unit 35 repeatedly executes the above described processing for both the subject line La and the reference line Lr, while changing their positions by the same distance along the direction in which the ground line L1 extends in actual space. And the luminance difference calculation unit 35, for example, may obtain the luminance differences sequentially by setting the line that was the reference line Lr in the previous cycle of processing as the subject line La, and by setting a reference line Lr for this subject line La.

Returning to FIG. 15, the edge line detection unit 36 detects edge lines from the successive luminance differences calculated by the luminance difference calculation unit 35. For example, in the case of FIG. 27(*b*), for the first subject point Pa1 and the first reference point Pr1, the luminance difference is small, since they are positioned upon the same tire portion. On the other hand, the second through the sixth subject points Pa2 through Pa6 are positioned upon the rubber portion of the tire, while the second through the sixth reference points Pr2 through Pr6 are positioned upon the wheel portion of the tire. Accordingly, for the second through the sixth subject points Pa2 through Pa6 and the second through the sixth reference points Pr2 through Pr6 respectively, the luminance differences are great. Due to this, the edge line detection unit 36 is able to detect that an edge line at which the luminance difference is large is present between the second through the sixth subject points Pa2 through Pa6 and the second through the sixth reference points Pr2 through Pr6 respectively.

In concrete terms, in edge line detection, the edge line detection unit 36 first performs attribute assignment to the i-th subject point Pai from the difference in luminance between the i-th subject point Pai (whose coordinates are (xi,yi)) and the i-th reference point Pri (whose coordinates are (xi',yi')), according to Equations (1) below:

When $I(xi,yi) > I(xi',yi') + t$, $s(xi,yi) = 1$

When $I(xi,yi) < I(xi',yi') - t$, $s(xi,yi) = -1$ and at any times other than those described above, $s(xi,yi) = 0$  Equations (1)

In Equations (1) above, t is a threshold value, I(xi,yi) is the luminance value of the i-th subject point Pai, and I(xi',yi') is the luminance value of the i-th reference point Pri. According to Equations (1) above, if the luminance value of the subject point Pai is higher than the luminance value of the reference point Pri added to the threshold value t, then the attribute s(xi,yi) of that subject point Pai becomes "1". On the other hand, if the luminance value of the subject point Pai is lower than the luminance value of the reference point Pri with the threshold value t subtracted therefrom, then the attribute s(xi,yi) of that subject point Pai becomes "−1". Moreover, in the case of any other relationship between the luminance value of the subject point Pai and the luminance value of the reference point Pri, the attribute s(xi,yi) of that subject point Pai becomes "0". This threshold value t is set in advance, and can also be changed according to a control command generated by the control unit 39; the details of this will be described hereinafter.

Next, from the continuities c(xi,yi) of the attribute s along the subject line La, the edge line detection unit 36 determines whether or not the subject line La is an edge line, on the basis of Equations (2) below:

When $s(xi,yi) = s(xi+1,yi+1)$ (and moreover excluding $0=0$), $c(xi,yi) = 1$

In any other case, $c(xi,yi) = 0$  Equations (2)

If the attribute s(xi,yi) of the subject point Pai and the attribute s(xi+1,yi+1) of the adjacent subject point Pai+1 are the same, then the continuity c(xi,yi) becomes "1". However, if the attribute s(xi,yi) of the subject point Pai and the attribute s(xi+1,yi+1) of the adjacent subject point Pai+1 are not the same, then the continuity c(xi,yi) becomes "0".

Next, the edge line detection unit 36 obtains the sum total of the continuities c for all of the subject points Pa upon the subject line La. The edge line detection unit 36 normalizes the continuities c by dividing the sum total of the continuities c that have been obtained by the number N of the subject points Pa. And, if the normalized value is greater than a threshold value θ, then the edge line detection unit 36 decides that the subject line La is an edge line. It should be understood that the threshold value θ is a value that is set in advance by experiment or the like. It would be acceptable for the threshold value θ to be set in advance; or it would also be acceptable for it to be changed according to a control command from the control unit 39 corresponding to the result of false image determination, as will be described hereinafter.

In other words, the edge line detection unit 36 decides whether or not the subject line La is an edge line, on the basis of Equation (3) described below. And, for all of the subject lines La that have been drawn in the detection region A1, the edge line detection unit 36 decides whether or not they are edge lines.

$\Sigma c(xi,yi)/N > \theta$  Equation (3)

Returning to FIG. 15, the three dimensional body detection unit 37 detects a three dimensional body on the basis of the amount of edge lines that have been detected by the edge line detection unit 36. As described above, with the in-vehicle surrounding environment recognition device 100 according to this embodiment, edge lines that extend in the vertical dimension in actual space are detected. The fact that a large number of edge lines that extend in the vertical dimension in actual space have been detected implies that the possibility that a three dimensional body is present is high. Due to this, the three dimensional body detection unit 37 detects a three dimensional body on the basis of the amount of edge lines that have been detected by the edge line detection unit 36. Moreover, the three dimensional body detection unit 37 is adapted, before determining that a three dimensional body is present, to determine whether or not the edge lines that have been detected by the edge line detection unit 36 are correct. The three dimensional body detection unit 37 determines whether or not the luminance change along an edge line of a bird's-eye view image over the edge line is greater than a predetermined threshold value. And, if the luminance change of the bird's-eye view image over the edge line is greater than the threshold value, then it is determined that this edge line is one that was detected due to an erroneous determination. On the other hand, if the luminance change of the bird's-eye view image over the edge line is not greater than the threshold value, then it is determined that this edge line is a correct one. It should be understood that this threshold value is a value that is set in advance according to experiment or the like.

Figure 28:
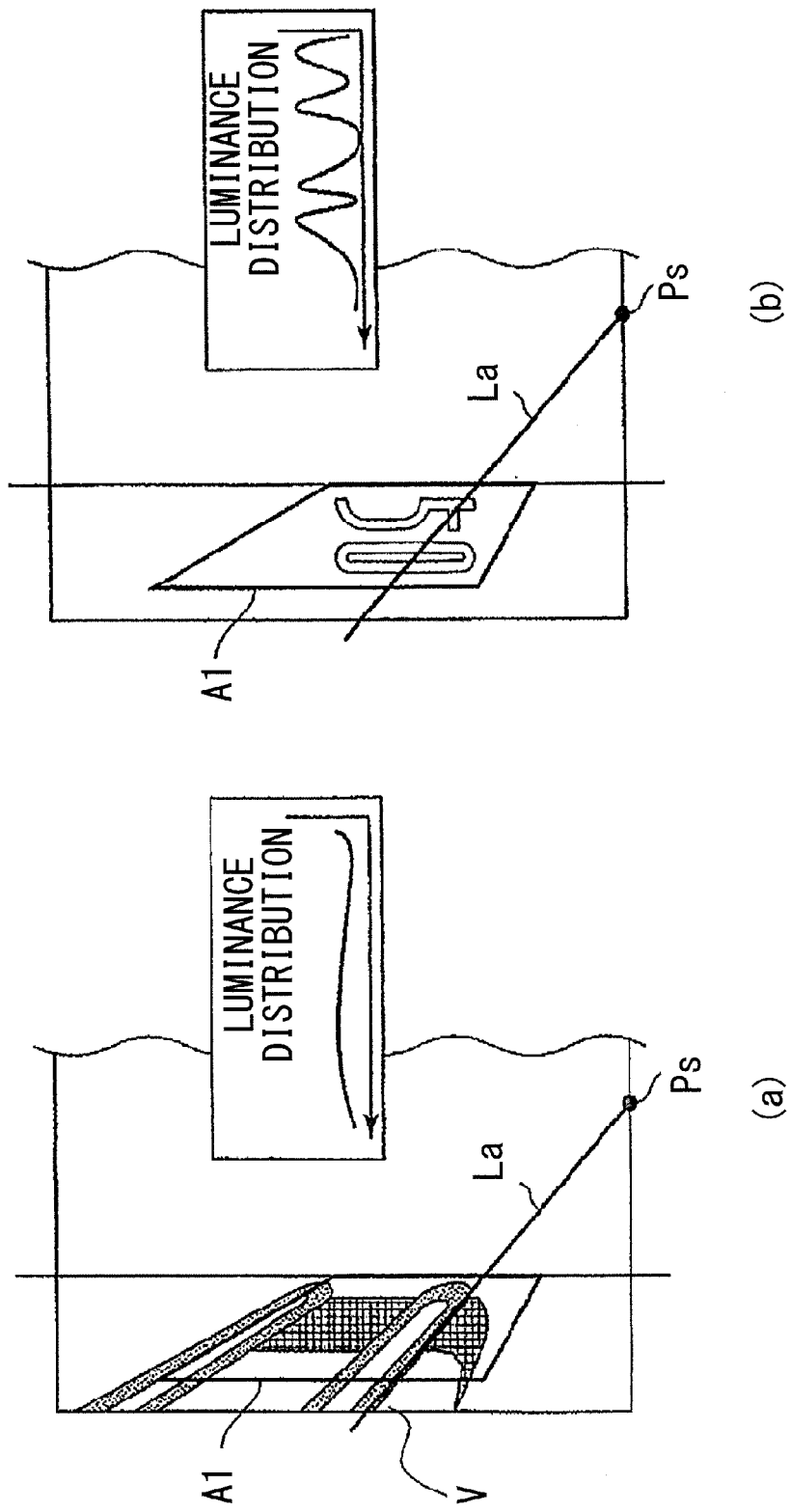
FIG. 28 A figure showing an edge line and a luminance distribution along that edge line.

FIG. 28 is a figure showing the luminance distribution along an edge line: FIG. 28(a) shows an edge line and its luminance distribution when another vehicle VX is present as a three dimensional body in the detection region A1, and FIG. 28(b) shows this edge line and its luminance distribution when no three dimensional body is present in the detection region A1.

Suppose that, as shown in FIG. 28(a), it has been decided that a subject line La that has been set on the tire rubber portion of the other vehicle VX in the image as seen in a bird's-eye view is an edge line. In this case, the luminance change upon the subject line La in the bird's-eye view image is gently sloping. This is due to the fact that, in the bird's-eye view image, the tire of the other vehicle VX has been stretched out, due to the point of view of the image captured by the camera 1 being converted into that of the bird's-eye view image. On the other hand, suppose that, as shown in FIG. 28(b), a subject line La that has been set in the bird's-eye view image in a white colored letter portion "50" drawn upon the road surface has been mistakenly determined to be an edge line. In this case, the variations of the luminance change upon the subject line La in the bird's-eye view image are large. This is because portions that are in the white colored letters and whose luminance is high and portions that are on the road surface or the like and whose luminance is low are mixed together on the edge line.

As described above, on the basis of the discrepancies of luminance distribution upon the subject line La, the three dimensional body detection unit 37 determines whether or not the edge line is one that has been detected as a result of mistaken determination. And, if the luminance change along the edge line is greater than the predetermined threshold value, then the three dimensional body detection unit 37 determines that this edge line is one that has been detected due to erroneous detection. And this edge line is not employed in three dimensional body detection. Due to this, it is possible to prevent white colored letters upon the road surface like "50" or weeds on the soft shoulder or the like being erroneously determined as being an edge line, so that deterioration of the accuracy of three dimensional body detection can be prevented.

In concrete terms, the three dimensional body detection unit 37 calculates the luminance change upon the edge line according to Equations (4) or (5) below. The luminance change on this edge line corresponds to the values evaluated in the vertical direction in actual space. Equation (4) below evaluates the luminance distribution in terms of the sum of the squares of the difference between the i-th luminance value I(xi,yi) and the adjacent i+1-th luminance value I(xi+1,yi+1) on the subject line La. And Equation (5) below evaluates the luminance distribution in terms of the sum of the absolute values of the difference between the i-th luminance value I(xi,yi) and the adjacent i+1-th luminance value I(xi+1,yi+1) on the subject line La.

Evaluated value in direction corresponding to vertical=$[\{I(xi,yi)-I(xi+1,yi+1)\}^2]$    Equation (4)

Evaluated value in direction corresponding to vertical=$\Sigma|I(xi,yi)-I(xi+1,yi+1)|$    Equation (5)

It should be understood that the method for evaluation is not to be considered as being limited to Equation (5); as in Equation (6) below, it would also be possible to assign a binarized attribute b to adjacent luminance values by employing a threshold value t2, and to take the sum total of this binarized attribute b for all of the subject points Pa:

Evaluated value in direction corresponding to vertical=$\Sigma b(xi,yi)$

Here, when $|I(xi,yi)-I(xi+1,yi+1)|>t2$, $b(xi,yi)=1$

In any other case, $b(xi,yi)=0$    Equations (6)

If the absolute value of the difference between the luminance value of the subject point Pai and the luminance value at the reference point Pri is greater than the threshold value t2, then the attribute b(xi,yi) at that subject point Pa(xi,yi) is set to "1". In the case of any other relationship, the attribute b(xi,yi) at that subject point Pa(xi,yi) is set to "0". This threshold value t2 is set in advance by experiment or the like, in order to determine whether the subject line La is on the same three dimensional body. And the three dimensional body detection unit 37 takes the sum total of the attribute b for all the subject points Pa upon the subject line La, and makes a determination as to whether or not the edge line is a correct one by obtaining the evaluated value in the direction corresponding to the vertical.

Figure 29:
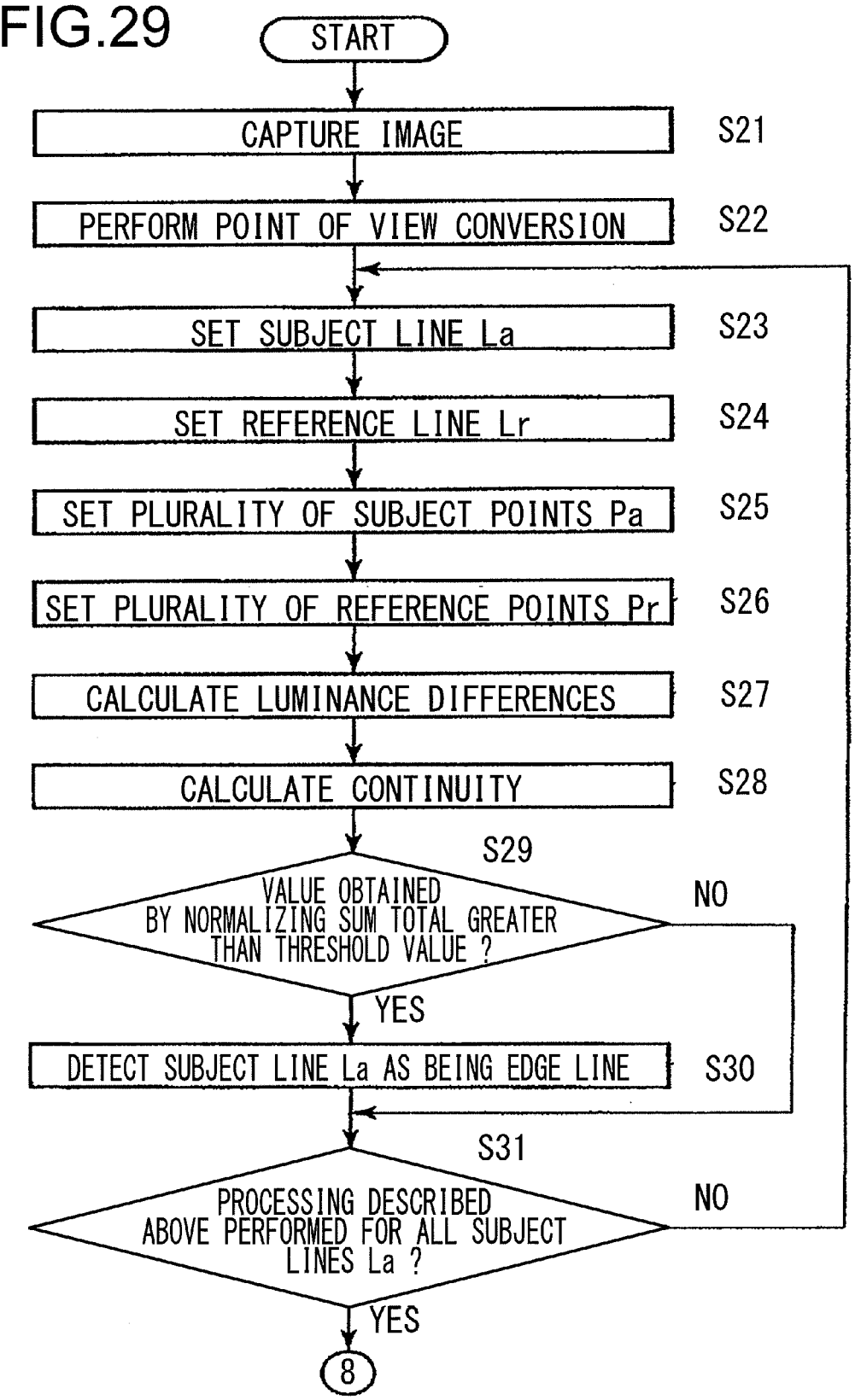
FIG. 29 A first part of a flow chart showing a three dimensional body detection method using edge information, performed by the point of view conversion unit, the luminance difference calculation unit, an edge line detection unit, and the three dimensional body detection unit of FIG. 15.
Figure 30:
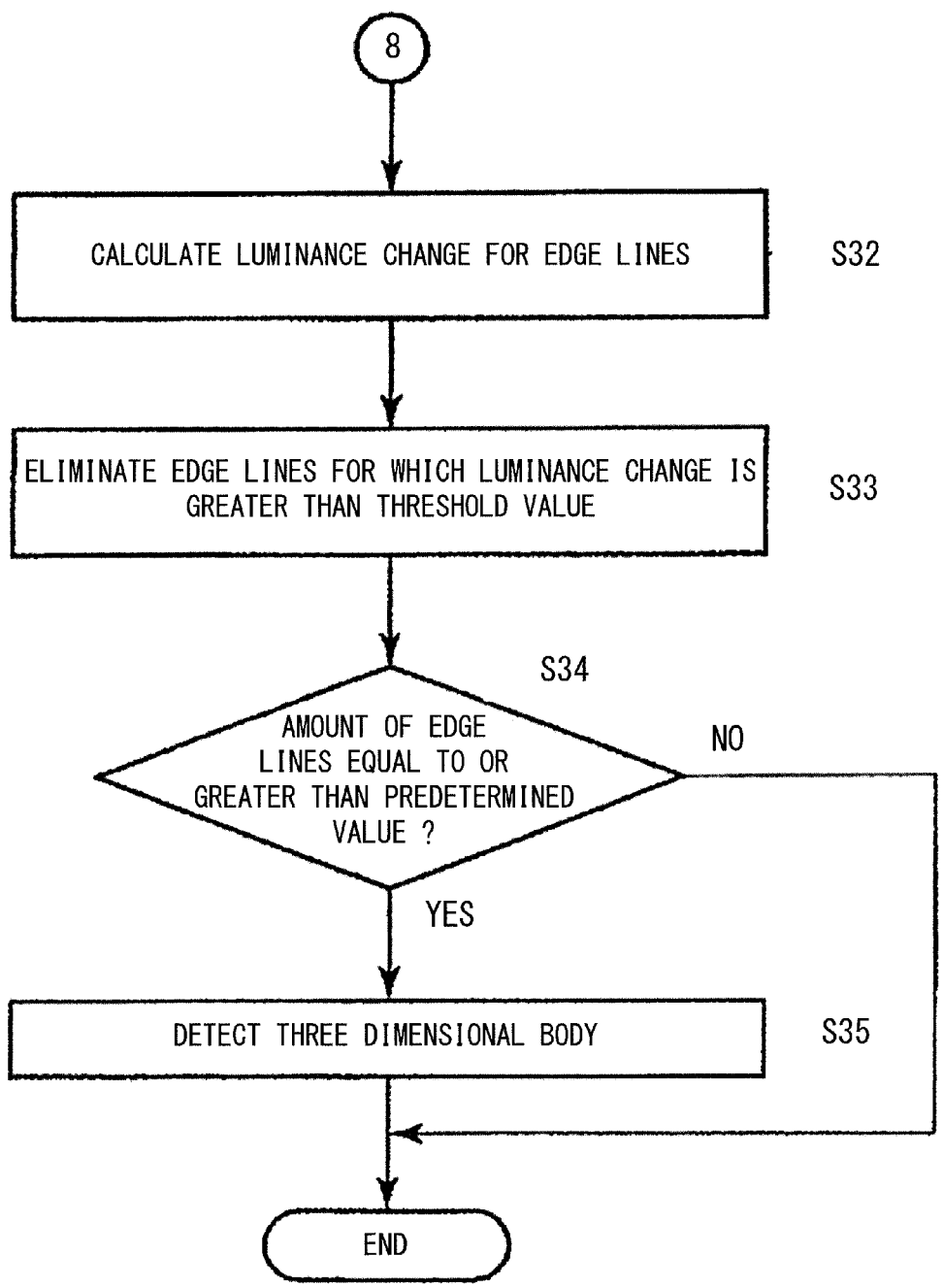
FIG. 30 A second part of the flow chart showing a three dimensional body detection method using edge information, performed by the point of view conversion unit, the luminance difference calculation unit, the edge line detection unit, and the three dimensional body detection unit of FIG. 15.

Next, the three dimensional body detection method according to this embodiment that employs the edge information will be explained. FIG. 29 and FIG. 30 are flow charts showing the details of the three dimensional body detection method according to this embodiment. While, for the sake of convenience, the processing that takes the detection region A1 as subject is explained in FIG. 29 and FIG. 30, similar processing is also executed for the detection region A2 as well.

As shown in FIG. 29, first in step S21 the camera 1 captures an image of a predetermined region specified by the angle of view a and the attachment position. And next in step S22 the point of view conversion unit 31 inputs the image data captured by the camera 1 in step S21 and performs point of view conversion thereupon, thus generating image data as seen in a bird's-eye view.

Next, in step S23, the luminance difference calculation unit 35 sets a subject line La in the detection region A1. At this time, the luminance difference calculation unit 35 sets a line corresponding to a line extending in the vertical direction in actual space as the subject line La. And next, in step S24, the luminance difference calculation unit 35 sets a reference line Lr in the detection region A1. At this time, as the reference line Lr, the luminance difference calculation unit 35 sets a line corresponding to a line segment that extends in the vertical direction in actual space, and that moreover is separated by a predetermined distance in actual space from the subject line La.

Next, in step S25, the luminance difference calculation unit 35 sets a plurality of subject points Pa on the subject line La. At this time, the luminance difference calculation unit 35 sets a number of subject points Pa such that no problem will arise during edge detection by the edge line detection unit 36. Moreover, in step S26, the luminance difference calculation unit 35 sets reference points Pr so that the subject points Pa and the reference points Pr are approximately the same height in actual space. Due to this, the subject points Pa and the reference points Pr are approximately lined up in the horizontal direction, so that it becomes easy to detect an edge line that extends in the vertical direction in actual space.

Next, in step S27, the luminance difference calculation unit 35 calculates the luminance differences between the subject points Pa and the reference points Pr that are the same height in actual space. And next the edge line detection unit 36 calculates the attributes s of the subject points Pa according to Equation (1) described above. Then in step S28 the edge line detection unit 36 calculates the continuities c of the attributes s of the subject points Pa according to Equation (2) described above. And next, in step S29, the edge line detection unit 36 determines whether or not the value obtained by normalizing the sum total of the continuities c according to Equation (3) described above is greater than the threshold value θ. If the edge line detection unit 36 decides that the normalized value is greater than the threshold value θ (S29: YES), then in step S30 it detects this subject line La as being an edge line. And then the flow of control continues to step S31. But if the edge line detection unit 36 decides that the normalized value is not greater than the threshold value θ (S29: NO), then it does not detect this subject line La as being an edge line, and the flow of control continues to step S31. While this threshold value θ may be set in advance, it may also be varied according to a control command from the control unit 39.

And in step S31 the luminance difference calculation unit 35 determines whether or not the processing of step S23 through step S30 described above has been performed for all of the subject lines La that can be set in the detection region A1. If it is decided that the processing described above has not been performed for all of the subject lines La (S31: NO), then the flow of control returns to step S23, a new subject line La is set, and the processing up to step S31 is repeated. On the other hand, if it is decided that the processing described above has been performed for all of the subject lines La (S31: YES), then the flow of control proceeds to step S32 of FIG. 30.

In step S32 of FIG. 30, for the edge line detected in step S30 of FIG. 29, the three dimensional body detection unit 37 calculates the luminance change along that edge line. The three dimensional body detection unit 37 calculates the luminance change along the edge line according to any one of Equations (4), (5), and (6) described above. Next, in step S33, among the edge lines, the three dimensional body detection unit 37 eliminates edge lines for which the luminance change is higher than some threshold value. In other words, edge lines along which the luminance change is large are determined as not being correct edge lines, and these edge lines are not used in the detection of a three dimensional body. This is in order, as described above, to suppress letters upon the road surface or weeds upon the soft shoulder or the like, included in the detection region A1, being undesirably detected as being edge lines. Accordingly, this predetermined threshold value is a value that is determined in advance by experiment or the like, and is set on the basis of the luminance change that is generated by letters on the road surface or weeds on the soft shoulder or the like.

Next, in step S34, the three dimensional body detection unit 37 determines whether or not the amount of edge lines is greater than or equal to a second threshold value β. It should be understood that this second threshold value β may be set in advance by being obtained by experiment or the like, and that, while the value β may be varied according to a control command generated by the control unit 39 shown in FIG. 15, the details thereof will be described hereinafter. For example, if a four wheeled vehicle is set as being the subject for three dimensional body detection, then this second threshold value β may be set in advance by experiment or the like on the basis of the number of edge lines of a four wheeled vehicle that appear within the detection region A1. If it is determined that the amount of edge lines is greater than or equal to the second threshold value β (S34: YES), then in step S35 the three dimensional body detection unit 37 determines that a three dimensional body is present within the detection region A1. On the other hand, if it is determined that the amount of edge lines is not greater than or equal to the second threshold value β (S34: NO), then the three dimensional body detection unit 37 determines that no three dimensional body is present within the detection region A1. Subsequently, the processing shown in FIG. 29 and FIG. 30 terminates. It would also be acceptable to arrange to determine that the three dimensional body that has been detected is another vehicle VX that is traveling in an adjacent road lane next to the road lane in which the subject vehicle V is traveling, and to decide whether or not it is such another vehicle VX that is traveling in an adjacent road lane in consideration of the relative speed of the three dimensional body with respect to the subject vehicle V. While this second threshold value β may be set in advance, it may also be varied according to a control command from the control unit 39.

As explained above, according to the method of this embodiment for detection of a three dimensional body using edge information, in order to detect a three dimensional body present in the detection regions A1 and A2, in the image as seen in a bird's-eye view, vertical virtual lines are provided that are line segments extending in the vertical direction in actual space. And, for each of a plurality of positions along these vertical virtual lines, the luminance difference between two pixels in the neighborhood of these two positions is calculated, and the presence or absence of a three dimensional body can be determined on the basis of the continuity of this luminance difference.

In concrete terms, a subject line La corresponding to a line segment that extends in the vertical direction in actual space and a reference line Lr that is different from the subject line La are provided in the detection regions A1 and A2 in the image as seen in a bird's-eye view. And the luminance difference between a subject point Pa on the subject line La and a reference point Pr on the reference line Lr are successively obtained along the subject line La and the reference line La. By doing this, and by thus successively obtaining the luminance differences between corresponding points, the luminance differences between the subject line La and the reference line Lr are obtained. If the luminance differences between the subject line La and the reference line Lr are high, then the possibility is high that an edge of the three dimensional body is present at the spot set by the subject line La. Due to this, it is possible to detect the presence of a three dimensional body on the basis of these successive luminance differences. In particular, since comparison is performed of the luminances between the two vertical virtual lines that are extended in the vertical direction in actual space, even if due to the conversion to a bird's-eye view image the three dimensional body is undesirably stretched out according to its height from the road surface, still there is no influence upon the processing for detecting the presence of a three dimensional body. Therefore, according to this method, it is possible to enhance the accuracy of detection of the presence of a three dimensional body.

Furthermore, in this embodiment, the luminance difference is obtained for two points that are at approximately the same height in the vicinity of the vertical virtual lines. In concrete terms, since the luminance difference is obtained from the subject point Pa on the subject line La and the reference point Pr on the reference line Lr that are at approximately the same height in actual space, accordingly it is possible to detect the luminance difference clearly when an edge is present that extends in the vertical direction.

Figure 31:
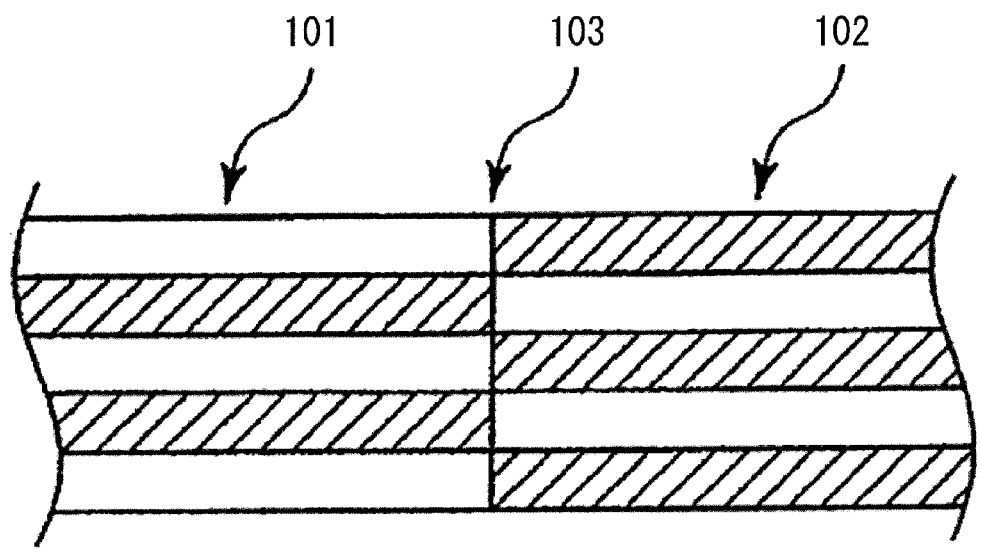
FIG. 31 A figure showing an example of an image for explanation of an edge line operation.

Moreover since, in this embodiment, assignment of the attribute to the subject point Pa is performed on the basis of the luminance difference between the subject point Pa on the subject line La and the reference point Pr on the reference line Lr, and it is decided whether or not the subject line La is an edge line on the basis of the continuity c of the attribute along this subject line La, accordingly it is possible to detect the boundary between a region of high luminance and a region of low luminance as being an edge line, so that it is possible to perform edge detection according to the natural feeling of a human being. The beneficial effects of this will now be explained in detail. FIG. 31 is a figure showing an example of an image for explanation of the processing performed by the edge line detection unit 36. This image example is an image in which a first banded pattern 101 that exhibits a banded pattern in which regions of high luminance and regions of low luminance are repeated, and a second banded pattern 102 that exhibits a banded pattern in which regions of low luminance and regions of high luminance are repeated, are adjacent. Moreover, in this example image, regions of the first banded pattern 101 in which the luminance is high and regions of the second banded pattern 102 in which the luminance is low are adjacent to one another, and moreover regions of the first banded pattern 101 in which the luminance is low and regions of the second banded pattern 102 in which the luminance is high are adjacent to one another. Due to human sensory characteristics, there is a tendency for sites 103 that are positioned at the boundary between the first banded pattern 101 and the second banded pattern 102 not to be perceived as edges by a human being.

By contrast, since regions where the luminance is low and regions where the luminance is high are mutually adjacent, accordingly these sites 103 may undesirably be recognized as being edges, if edges are only detected by differences of luminance. However since, in addition to the luminance differences at the sites 103, also the edge detection unit 36 determines these sites 103 as being edge lines only if the attribute of those luminance differences is continuous, accordingly it is possible for the edge line detection unit 36 to suppress erroneous determination in which the sites 103 are undesirably recognized as being edge lines although they would not be recognized as being edge lines according to human senses, and thus it is possible to perform edge detection in harmony with human sensory characteristics.

Furthermore, in this embodiment, if the luminance change upon an edge line that has been detected by the edge line detection unit 36 is greater than a predetermined threshold value, then it is determined that this edge line has been detected due to erroneous determination. When an image that has been acquired by the camera 1 is converted into an image as seen in a bird's-eye view, there is a tendency for a three dimensional body that is included in that captured image to appear in a stretched out state in the bird's-eye view image. For example, as described above, if a tire of another vehicle VX is stretched out in this way, then, since the single site that is the tire is stretched out, there is a tendency for the change of luminance of the bird's-eye view image to be small in the direction in which it is stretched out. By contrast, if a letter or the like that is written upon the surface of the road is erroneously determined to be an edge line, then, in the bird's-eye view image, then regions in which the luminance is high such as portions of the letter and regions in which the luminance is low such as portions of the road surface will be included as mixed together. In this case, there is a tendency for the change of luminance in the bird's-eye view image to be high in the direction in which it is stretched out. Accordingly, it is possible to recognize the edge lines that have been detected due to erroneous determination by determining the luminance change in the image as seen in a bird's-eye view along the edge line as in this embodiment, so that it is possible to enhance the accuracy of three dimensional body detection.

<<Final Determination of the Presence of a Three Dimensional Body>>

Returning to FIG. 15, in the detection of a three dimensional body by the two three dimensional body detection units 33 described above (or by the three dimensional body detection unit 37), the other vehicle recognition unit 204b of the in-vehicle surrounding environment recognition device 100 of this embodiment comprises the three dimensional body determination unit 34, the false image determination unit 38, and the control unit 39. The three dimensional body determination unit 34 finally determines whether or not a three dimensional body that has been detected is another vehicle VX that is present in the detection region A1 or A2, on the basis of the result of detection by the three dimensional body detection unit 33 (or by the three dimensional body detection unit 37). The three dimensional body detection unit 33 (or the three dimensional body detection unit 37) performs detection of a three dimensional body in which the result of determination by the false image determination unit 38 that will be described hereinafter is reflected. From the result of texture analysis of the image corresponding to the three dimensional body that has been detected, the false image determination unit 38 decides whether or not this three dimensional body is a false image due to an image of a building or the like being reflected by a layer of water or the like that has been formed upon the road surface. If it has been decided by the false image determination unit 38 that the image corresponding to the three dimensional body that has been detected is a false image, then the control unit 39 outputs a control command that controls the various sections included in the other vehicle recognition unit 204b (including the control unit 39), so as to prevent a decision to the effect that the three dimensional body that has been detected is some other vehicle V that is present in the detection region A1 or A2.

Finally, the three dimensional body determination unit 34 of this embodiment decides whether or not a three dimensional body that has been detected by the three dimensional body detection unit 33 or 37 is another vehicle VX that is present in the detection region A1 or A2. If the three dimensional body determination unit 34 has determined that the three dimensional body that has been detected is another vehicle VX that is present in the detection region A1 or A2, then processing to notify the driver or the like is performed. According to a control command from the control unit 39, this three dimensional body determination unit 34 is able to suppress a decision to the effect that the three dimensional body that has been detected is another vehicle VX. In concrete terms, if it has been decided by the false image determination unit 38 that an image of a three dimensional body that has been detected is a false image, then the control unit 39 outputs a control command to the three dimensional body determination unit 34 commanding that the decision to the effect that the three dimensional body that has been detected is another vehicle VX is to be suppressed. And, according to this control command, the three dimensional body determination unit 34 stops the processing for determination of the three dimensional body, or decides that the three dimensional body that has been detected is not another vehicle VX, in other words decides that no other vehicle VX is present in the detection regions A1 and A2. Of course, when no such control command is acquired, it is also possible for it to be determined that a three dimensional body that has been detected by the three dimensional body detection unit 33 or 37 is indeed another vehicle VX that is present in the detection region A1 or A2.

The processing performed by the false image determination unit 38 of this embodiment will now be explained. On the basis of differential waveform information generated by the three dimensional body detection unit 33, the false image determination unit 38 of this embodiment is able to decide whether or not the image of a three dimensional body related to such detection is a false image. Although this feature is not to be considered as being particularly limitative, if the luminance difference over the image region of image information corresponding to a three dimensional body, in particular image information corresponding to the contour of a three dimensional body along the vertical direction, is less than a predetermined value, then the false image determination unit 38 of this embodiment determines that the three dimensional body that has been detected in a region including the image region is a false image.

In concrete terms, among the determination lines (La through Lf in FIG. 17) along the direction in which the three dimensional body was distorted during conversion of the point of view of the image as seen in a bird's-eye view, the false image determination unit 38 specifies one reference determination line (for example La) upon which the number of counted times in the differential waveform information is greater than or equal to a predetermined value, determines whether or not the luminance differences between the luminance of an image region upon the reference determination line (La) and the luminances of image regions upon one or a plurality of the comparison determination lines (Lb, Lc, Ld, Le) that include a determination line (Lc or Ld) adjacent to the reference determination line are less than a predetermined value, and decides that the three dimensional body detected in a region that includes the image region is a false image if these luminance differences are less than a predetermined value. This comparison of the luminance differences can be performed by comparing together the luminance of one pixel upon the reference determination line (La) or of an image region that includes that pixel, and the luminance of one pixel upon the comparison determination line (Lb, Lc, Ld, or Le) or of an image region that includes that pixel. Moreover, the luminance difference may be determined on the basis of the number of pixels that exhibit a predetermined differential in the differential waveform information shown in FIG. 17, or on the basis of the frequency distribution thereof.

If the luminance difference of pixels or image regions upon a plurality of adjacent determination lines that are determination lines along the direction in which the three dimensional body was distorted during conversion of the point of view of the image as seen in a bird's-eye view is small, and the contrast of the image region which corresponds to a three dimensional body that has been detected is low, then it can be determined that this image is not an image that has been obtained from an actual three dimensional body, but is a false image in which a three dimensional body is glaring in a puddle or layer of water upon the road surface.

At this time, if there are at least a predetermined number of the comparison determination lines (Lb, Lc, Ld, Le) including the image region for which the luminance difference from the luminance of the image region upon the reference determination line (La) is less than a predetermined value, then the false image determination unit 38 can determine that the three dimensional body that has been detected in a region including the image region is a false image. By verifying the presence or absence of contrast over a broad range in this manner, and by thus determining whether or not the image is a false image, it is possible to perform accurate determination as to whether or not the image is a false image.

Figure 32:
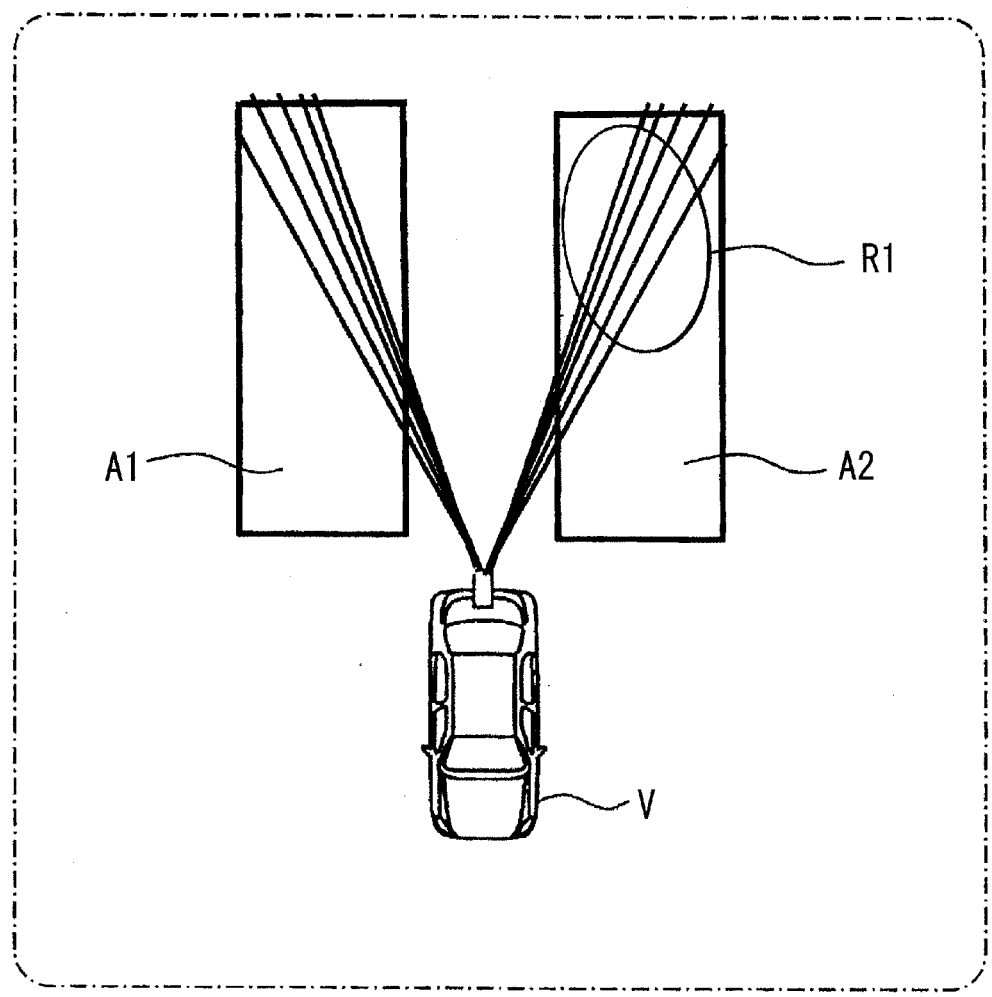
FIG. 32 A figure for explanation of a situation in which a layer of water is formed within a detection region.
Figure 33:
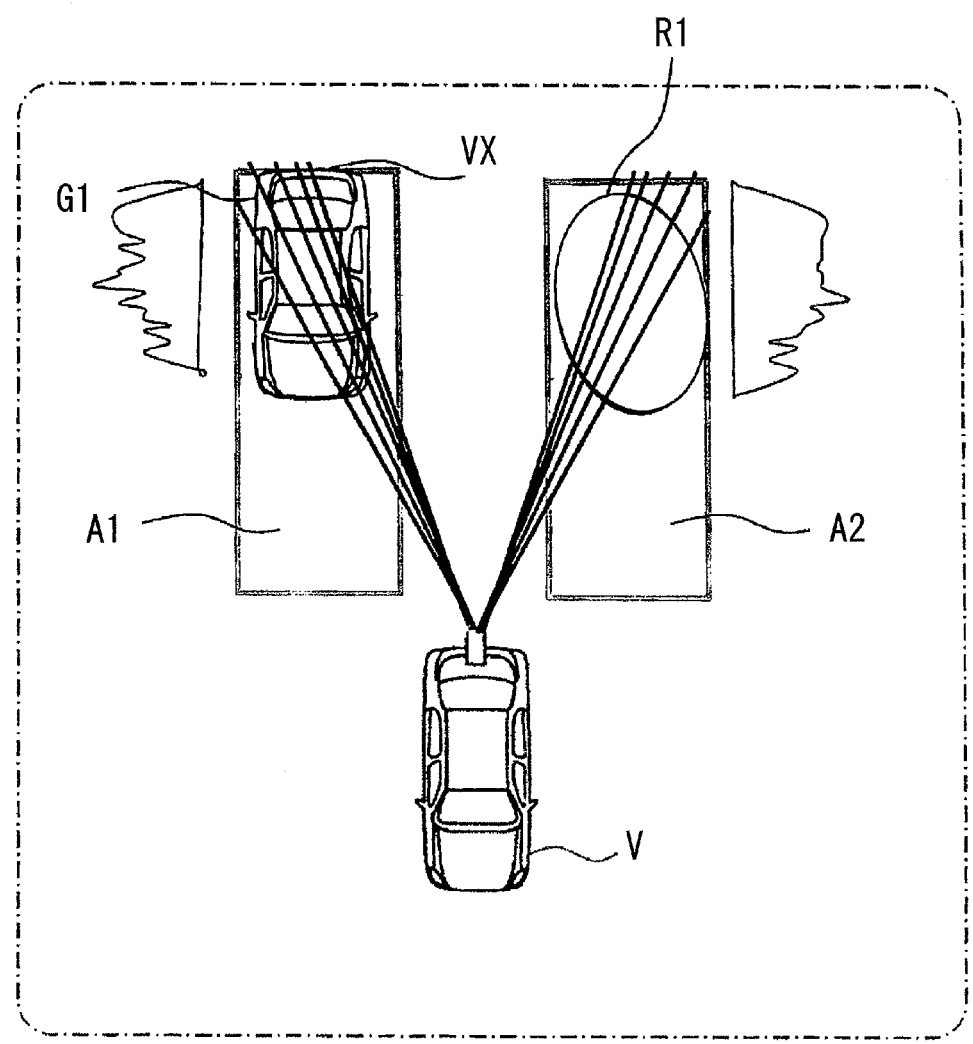
FIG. 33 A figure for explanation of image information when a layer of water has been formed in a detection region.

FIG. 32 is a figure showing a situation in which a puddle of water (i.e. a layer of water) has been formed upon the road surface within the detection region A2, and the image of a structure at the side is glaring out from the surface of this water. And FIG. 33 and FIG. 34 show differential waveform information DWt1 that has been generated from an image of an actual other vehicle VX in the detection region A1 as seen in a bird's-eye view, and differential waveform information DWt2 that has been generated from an image of some neighboring structure being reflected in a layer of water that has been formed in the detection region A2 and being seen in a bird's-eye view. As shown at the left side of FIG. 33 and in FIG. 34(A), pixels exhibiting the predetermined differential along the direction of distortion of the three dimensional body are detected in the differential waveform information DWt1 that has been generated from the image of the actual other vehicle VX as seen in a bird's-eye view, so that peaks appear corresponding to the characteristics of the external appearance of the three dimensional body; but, by contrast, as shown at the right side of FIG. 33 and in FIG. 34(B), there is no change in the number of pixels that exhibit the predetermined differential along the direction of distortion of the three dimensional body in the differential waveform information DWt2 that has been generated from the image of the false image as seen in a bird's-eye view in which a neighboring structure is reflected in a layer of water, and there are no peaks corresponding to the characteristics of a three dimensional body. In this manner, in this embodiment, by employing the characteristic that the contrast is low in a false image in which a neighboring structure has been reflected in a layer of water on the road surface, it is possible to determine whether an image corresponding to a three dimensional body that has been detected is a genuine image or is a false image.

Furthermore, from a similar standpoint, on the basis of edge information generated by the three dimensional body detection unit 37, the false image determination unit 38 of this embodiment is able to decide whether or not the image of a three dimensional body related to such detection is a false image. In concrete terms, among the determination lines (La through Ld and Lr in FIG. 26) along the direction of distortion of the three dimensional body during point of view conversion to a bird's-eye view image, the false image determination unit 38 specifies one reference determination line (for example, Lr) on which an edge has been detected where the luminance difference between mutually adjacent image regions is greater than or equal to a predetermined threshold value, and decides that a three dimensional body that has been detected in a region including the image region is a false image if the luminance differences between the luminance of an image region upon the reference determination line (Lr) and the luminances of image regions upon one or a plurality of comparison determination lines (La through Ld) including the determination lines (Lb through Lc) adjacent to the reference determination line (Lr) are less than a predetermined value. At this time, if the number of comparison determination lines (Lb through Lc) that include image regions for which the luminance differences from the luminance of an image region upon the reference determination line (Lr) is less than the predetermined value is greater than or equal to a predetermined number, then the false image determination unit 38 is able to determine that the three dimensional body that has been detected in a region including the image region is a false image. In this manner, it is possible to perform the determination as to whether or not the three dimensional body is a false image in an accurate manner, by checking upon the presence or absence of contrast over a broad range, and by deciding whether or not a false image is present.

The false image determination unit 38 of this embodiment determines whether the image information corresponding to a three dimensional body that has been detected on the basis of the image information contrast in the detection region A1 and in the detection region A2 is a false image, or is a genuine image. In this embodiment, the image information contrast is calculated on the basis of the amount of texture features of the image information in the detection region A1 and in the detection region A2. In this embodiment, as appropriate, a per se known technique such as extraction, evaluation, quantification, or the like of the texture of the image information may be applied as a texture analysis technique.

Next, the control unit 39 will be explained. When, in the previous cycle of processing, it has been determined by the false image determination unit 38 that the three dimensional body that has been detected by the three dimensional body detection unit 33 is a false image, then, in the next state of processing, the control unit 39 of this embodiment is able to generate control commands that are executed by any one or more of the three dimensional body detection unit 33 or 37, the three dimensional body determination unit 34, the false image determination unit 38, or the control unit 39 itself.

The control commands of this embodiment are commands for controlling the operation of the various sections, so as to suppress a decision that a three dimensional body that has been detected is another vehicle VX. This is in order to prevent a false image in which some neighboring structure has been reflected in a layer of water upon the surface of the road from being mistakenly determined to be another vehicle VX. Since the other vehicle recognition unit 204b of this embodiment is a computer, accordingly the control commands for performing three dimensional body detection processing, three dimensional body determination processing, and false image determination processing could be installed in advance in programs for such processing; or they could also be sent when they are to be executed. The control commands of this embodiment may be commands relating to results that cause termination of processing for determining that the three dimensional body that has been detected is another vehicle or that force a decision which the three dimensional body that has been detected is not another vehicle; or they may also be commands that decrease the sensitivity when detecting a three dimensional body on the basis of the differential waveform information, commands that adjust the sensitivity when detecting a three dimensional body on the basis of the edge information, or commands that adjust the value of the luminance difference during determination as to whether or not the image is a false image.

The control commands outputted by the control unit 39 will now be explained in the following.

First, the control commands when detecting a three dimensional body on the basis of the differential waveform information will be explained. As has been discussed above, the three dimensional body detection unit 33 detects a three dimensional body on the basis of the differential waveform information and the first threshold value $\alpha$. And, if the false image determination unit 38 has determined that the image corresponding to a three dimensional body is a false image, then the control unit 39 of this embodiment generates a control command that increases the first threshold value $\alpha$, and outputs this command to the three dimensional body detection unit 33. This first threshold value $\alpha$ is a first threshold value $\alpha$ for determining the peak of the differential waveform $DW_t$ in step S7 of FIG. 23 (refer to FIG. 17). Moreover, the control unit 39 may output a control command to the three dimensional body detection unit 33 for raising the threshold value p related to the difference of the pixel values in the differential waveform information.

If in the previous processing cycle it has been decided that the image information corresponding to a three dimensional body is a false image, then the control unit 39 is able to determine that the possibility is high that a layer of water has been formed in the detection region A1 or A2, and that the reflection of a neighboring structure is present in the detection region A1 or A2. If three dimensional body detection is performed using the same technique as in normal cases without modification, then in some cases it may happen that a false image reflected in the layer of water may erroneously be detected as being the genuine image of another vehicle VX, even though no other vehicle VX is present in the detection region A1 or A2. Due to this, in this embodiment, the threshold value related to the difference of pixel values when generating the differential waveform information is changed to be higher, so that the detection of a three dimensional body in the next cycle of processing becomes more difficult. Since, by changing the threshold value for decision by raising it in this manner, the sensitivity for detection is adjusted so as to make it more difficult for another vehicle VX that is traveling next to the road lane in which the subject vehicle V is traveling to be detected, accordingly it is possible to prevent a neighboring structure that has been reflected in a layer of water from being erroneously detected as being another vehicle VX that is traveling in an adjacent road lane.

Furthermore, if the false image determination unit 38 has decided that image information corresponding to a three dimensional body is a false image, then the control unit 39 of this embodiment is able to output a control command to the three dimensional body detection unit 33 that commands it to lower the value that is obtained by counting the number of pixels that exhibit a predetermined differential in the differential image as seen in a bird's-eye view and constructing a frequency distribution. This value that is obtained by counting the number of pixels exhibiting a predetermined differential in the differential image as seen in a bird's-eye view and constructing a frequency distribution is the value on the vertical axis of the differential waveform $DW_t$ that is generated in step S5 of FIG. 23. If it is determined in the previous processing cycle that a three dimensional body is a false image, then the control unit 39 is able to determine that the possibility is high that a layer of water has been formed upon the detection region A1 or A2, and accordingly it changes the value that is obtained by making a frequency distribution of the differential waveform $DW_t$ so as to make it lower, so that in the next cycle of processing it becomes more difficult for it to be erroneously determined that another vehicle VX is present in the detection region A1 or A2. By doing this, it is possible to prevent a false image that is created by such a layer of water from being erroneously determined to be another vehicle VX that is traveling in an adjacent road lane, since, by lowering the output value, the detection sensitivity is adjusted so that it becomes more difficult for another vehicle VX that is traveling next to the road lane upon which the subject vehicle V is traveling to be detected.

Next, the control commands when detecting a three dimensional body on the basis of edge information will be explained. If it has been determined by the false image determination unit 38 that image information corresponding to a three dimensional body is a false image, then the control unit 39 of this embodiment outputs a control command to the three dimensional body detection unit 37 commanding it to increase the predetermined threshold value related to luminance that is used during detection of the edge information. The predetermined threshold value related to luminance that is used during detection of the edge information is the threshold value $\theta$ for deciding upon the value obtained by normalizing the sum total of the continuities c of the attributes of the subject points Pa in step S29 of FIG. 29, or the second threshold value $\beta$ for evaluation of the amount of edge lines in step 34 of FIG. 30. If it was decided in the previous cycle of processing that the three dimensional body was a false image, then, since it can be decided that the possibility is high that a layer of water has been formed in the detection region A1 or A2, and that a neighboring structure is being reflected in this layer of water, accordingly the control unit 39 changes the threshold value $\theta$ that is used during detection of the edge lines, or the second threshold value $\beta$ that is used for evaluation of the amount of the edge lines, so as to make it larger, thus making it more difficult for a three dimensional body to be detected in the next cycle of processing. By changing the threshold value for determination so as to make it larger in this manner, it is possible to prevent erroneous detection of a false image in which a neighboring structure is reflected in a layer of water as being another vehicle VX that is traveling in an adjacent road lane, since the detection sensitivity is adjusted so as to make it more difficult for another vehicle VX to be detected that is traveling next to the road lane in which the subject vehicle V is traveling.

Furthermore, if it has been determined by the false image determination unit 38 that the image information corresponding to a three dimensional body is a false image, then the control unit 39 of this embodiment outputs a command to the three dimensional body detection unit 37 commanding it to reduce the amount of edge information that it detects and outputs. The amount of edge information that is detected is the normalized value of the sum total of the continuities c of the attributes of the subject points Pa in step S29 of FIG. 29, or the amount of edge lines in step 34 of FIG. 30. If in the previous cycle of processing it has been decided that a three dimensional body is a false image, since it can be determined that the possibility is high that a neighboring structure is being reflected in a layer of water such as a puddle or the like, accordingly the control unit 39 changes the normalized value of the sum total of the continuities c of the attributes of the subject points Pa or the amount of edge lines so as to make it smaller, so that it becomes more difficult for a three dimensional body to be detected in the next cycle of processing. By changing the output value so as to make it smaller in this manner, it is possible to prevent erroneous detection of a false image in which a neighboring structure is reflected in a layer of water as being another vehicle VX that is traveling in an adjacent road lane, since the detection sensitivity is adjusted by reducing the output value, so as to make it more difficult for another vehicle VX to be detected that is traveling next to the road lane in which the subject vehicle V is traveling.

Yet further, if the luminance in the detection region A1 or A2 is greater than or equal to a predetermined value, then the control unit 39 of this embodiment can generate a control command to further increase any one of the first threshold value $\alpha$, the threshold value p, the second threshold value $\beta$, or the threshold value $\theta$, and can output this control command to the three dimensional body detection unit 33 or 37. The luminance of the detection region A1 or A2 can be acquired from the image captured by the camera 1. If the luminance of the detection region A1 or A2 is higher and brighter than the predetermined value, then it can be decided that the possibility is high that a layer of water has been formed that reflects light in the detection region A1 or A2. In this embodiment, if the luminance of the detection region A1 or A2 is higher than the predetermined value, then it is possible to prevent erroneous detection of a false image in which a neighboring structure is reflected in a layer of water as being another vehicle VX that is traveling in an adjacent road lane by adjusting the detection sensitivity by increasing the threshold value, so as to make it more difficult for another vehicle VX to be detected that is traveling next to the road lane in which the subject vehicle V is traveling.

Even further, the shifting speed of the subject vehicle V is acquired from the vehicle speed sensor 5, and, if the shifting speed of the subject vehicle V as detected by the vehicle speed sensor 5 is less than a predetermined value, then the control unit 39 of this embodiment is able to generate a control command for making the first threshold value $\alpha$, the threshold value p, the second threshold value $\beta$, or the threshold value $\theta$ yet higher, and is able to output this command to the three dimensional body detection unit. When the shifting speed of the subject vehicle is low, there is a tendency for the power at which the differences in the differential waveform information and the differences in the edge information can be identified to decrease. In other words, when the shifting speed of the subject vehicle V is low, sometimes it is the case that the presence of the three dimensional body is not accurately reflected in the differential waveform information or in the edge information. Due to this, in this embodiment, if the shifting speed of the subject vehicle is less than a predetermined value, then, by adjusting the detection sensitivity by raising the threshold value so that it becomes more difficult for another vehicle VX that is traveling next to the road lane in which the subject vehicle V is traveling to be detected, it is possible to prevent erroneous detection of a false image in which a neighboring structure is reflected in a layer of water as being another vehicle VX that is traveling in an adjacent road lane.

Still further, if the relative shifting speed of a three dimensional body that has been detected by the three dimensional body detection unit 33 or 37 with respect to the subject vehicle V is within a predetermined value range, then in the processing to determine whether the three dimensional body that is the subject of detection is another vehicle VX or the like, the control unit 39 of this embodiment adjusts the sensitivity for detection, so as to make it more difficult for another vehicle VX that is traveling next to the road lane in which the subject vehicle V is traveling to be detected. In concrete terms, if it has been determined by the false image determination unit 38 that a three dimensional body is a false image, then the control unit 39 of this embodiment generates and outputs to the three dimensional body detection unit 33 or 37 a control command commanding the predetermined value range in order for the three dimensional body detection unit 33 or 37 to evaluate the relative shifting speed to be shrunk down. Thus, if it has been determined that a three dimensional body that has been detected in the previous cycle of processing is actually a false image, then it is possible to conclude that the three dimensional body is an image in a layer of water that has been formed upon the surface of the road, and that the thing that has been detected as being the three dimensional body is really a stationary object. By narrowing the predetermined value range for the relative shifting speed that is used for determining whether or not the three dimensional body is another vehicle VX, it is possible to increase the detection sensitivity, so that erroneous detection of this type of stationary object as being another vehicle VX does not occur.

In this case, the control unit 39 is able to generate a control command for narrowing down the predetermined value range for evaluating the relative shifting speed by changing the lower limit value of the predetermined value range, that is expressed by a negative value, to a higher value. In concrete terms, the control unit 39 is able to change the lower limit value for the predetermined range that has, for example, been defined as being −20 km through 100 km, and that is expressed as a negative value, to a higher value, for example by defining the range as being −5 km through 100 km. A relative shifting speed that is expressed as a negative value is a speed of progression rearward with respect to the direction of progression of the subject vehicle V. If a three dimensional body that was detected in the previous cycle of processing was determined to be a false image, then it is possible to infer that the three dimensional body is an image in a layer of water that has been formed upon the road surface, and that the thing that has been detected as being a three dimensional body is really a stationary object. Since, a stationary object will be moving rearward with respect to the direction of progression of the subject vehicle V, and therefore the possibility is high that an object that is progressing rearward at least at the predetermined speed that is expressed as a negative value is a layer of water, accordingly, in order to eliminate this occurrence, the lower limit value of the predetermined range, that is expressed by a negative value, is changed to a higher value, so that this object should not be erroneously detected as being another vehicle VX. By changing the lower limit value that is expressed as a negative value to a higher value in this manner, it is possible to ensure that a layer of water or the like that is moving rearward at least at the predetermined speed is not erroneously detected as being another vehicle VX.

If, in adjustment of the threshold value related to speed, the luminance of the detection region A1 or A2 is greater than or equal to a predetermined value, then the control unit 39 may generate a control command to further narrow down the predetermined range for evaluating the relative shifting speed, and may output this control command to the three dimensional body detection unit 33 or 37. As previously described, the luminance of the detection regions A1 and A2 can be acquired from the image information from the camera 1. And, if the luminance of the detection region A1 or A2 is higher (i.e. brighter) than the predetermined value, then it can be decided that the possibility is high that a layer of water has been formed that reflects light in the detection region A1 or A2. In this embodiment, if the luminance of the detection region A1 or A2 is higher than the predetermined value, then it is possible to prevent erroneous detection of a false image in which a neighboring structure is reflected in a layer of water as being another vehicle VX that is traveling in an adjacent road lane by adjusting the detection sensitivity to further narrow down the predetermined value range for evaluating the relative shifting speed, thereby making it more difficult for another vehicle VX to be detected that is traveling next to the road lane in which the subject vehicle V is traveling.

In the same manner, in the adjustment of the threshold value relating to speed, the shifting speed of the subject vehicle V is acquired from the vehicle speed sensor 5, and, if the shifting speed of the subject vehicle V as detected by the vehicle speed sensor 5 is less than a predetermined value, then the control unit 39 is able to generate a control command for further narrowing down the predetermined value range for evaluation of the relative shifting speed, and is able to output this command to the three dimensional body detection unit 33 or 37. When the shifting speed of the subject vehicle V is low, there is a tendency for the power at which the differences in the differential waveform information and the differences in the edge information can be identified to decrease. In other words, when the shifting speed of the subject vehicle V is low, in some cases the presence of a three dimensional body is not accurately reflected in the differential waveform information or in the edge information, so that there is a tendency for some object other than another vehicle VX to be detected as being a three dimensional body. Due to this, in this embodiment, if the shifting speed of the subject vehicle is less than a predetermined value, then, by further narrowing down the predetermined value range for evaluation of the relative shifting speed and thereby adjusting the detection sensitivity by raising the threshold value so that it becomes more difficult for another vehicle VX that is traveling next to the road lane in which the subject vehicle V is traveling to be detected, it is possible to prevent erroneous detection of a false image in which a neighboring structure is reflected in a layer of water as being another vehicle VX that is traveling in an adjacent road lane.

In the following, the operation of the control unit 39, and the operations of the three dimensional body determination unit 34 and of the three dimensional body detection unit 33 or 37 that have acquired a control command, will be explained with reference to FIG. 35 through FIG. 39. The processing shown in FIG. 35 through FIG. 39 is three dimensional body detection processing during this cycle, after the previous cycle of three dimensional body detection processing, that is performed using the result of processing in the previous cycle.

Figure 35:
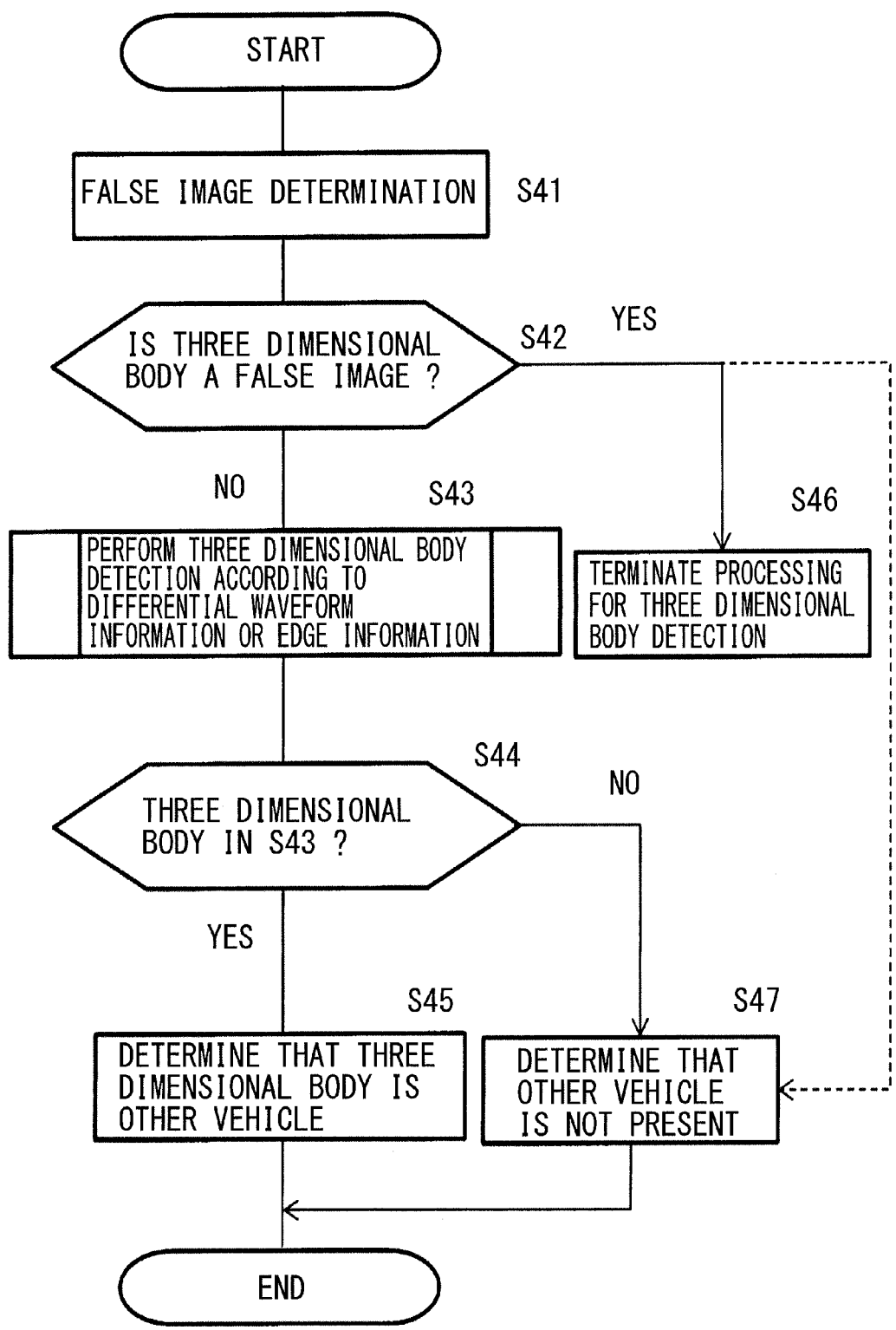
FIG. 35 A first flow chart showing a control procedure for three dimensional body determination that takes into account the presence of a false image.

First, in step S41 shown in FIG. 35, the false image determination unit 38 determines whether or not a three dimensional body that has been detected by the three dimensional body detection unit 33 is a false image. This determination as to whether or not the three dimensional body is a false image may be performed on the basis of the contrast of the image information for the three dimensional body that has been detected. In this case, it would be possible to perform the determination on the basis of differential waveform information that has been generated by the three dimensional body detection unit 33 as explained previously; or, alternatively, it would also be possible to perform it on the basis of edge information that has been generated by the three dimensional body detection unit 37.

Next in step 42 the control unit 39 determines whether or not, in the false image decision calculated in step 41, the three dimensional body that has been detected is a false image.

If the three dimensional body that has been detected is a false image, then the control unit 39 outputs control commands to the various sections so as to prevent the three dimensional body that has been detected from being decided to be another vehicle VX. As one example thereof, proceeding to step S46, the control unit 39 may output a control command to the three dimensional body determination unit 34 whose contents terminate three dimensional body detection processing. Moreover, as another example thereof, proceeding to step S47, the control unit 39 may also decide that the three dimensional body that has been detected is not another vehicle VX.

If the three dimensional body that has been detected is not a false image, then the flow of control proceeds to step S43, and detection processing for the three dimensional body is performed. This three dimensional body detection processing is performed according to the processing of FIG. 23 and FIG. 24 by the three dimensional body detection unit 33 described above using the differential waveform information, or according to the processing of FIG. 29 and FIG. 30 by the three dimensional body detection unit 37 using the edge information. And if, in step 43, a three dimensional body in the detection region A1 or A2 has been detected by this three dimensional body detection unit 33 or 37, then the flow of control is transferred to step S45, in which it is determined that the three dimensional body that has been detected is another vehicle VX. On the other hand, if no three dimensional body is detected by the three dimensional body detection unit 33 or 37 in the detection region A1 or A2, then the flow of control proceeds to step S47, and it is decided that no other vehicle VX is present in the detection region A1 or A2.

Figure 36:
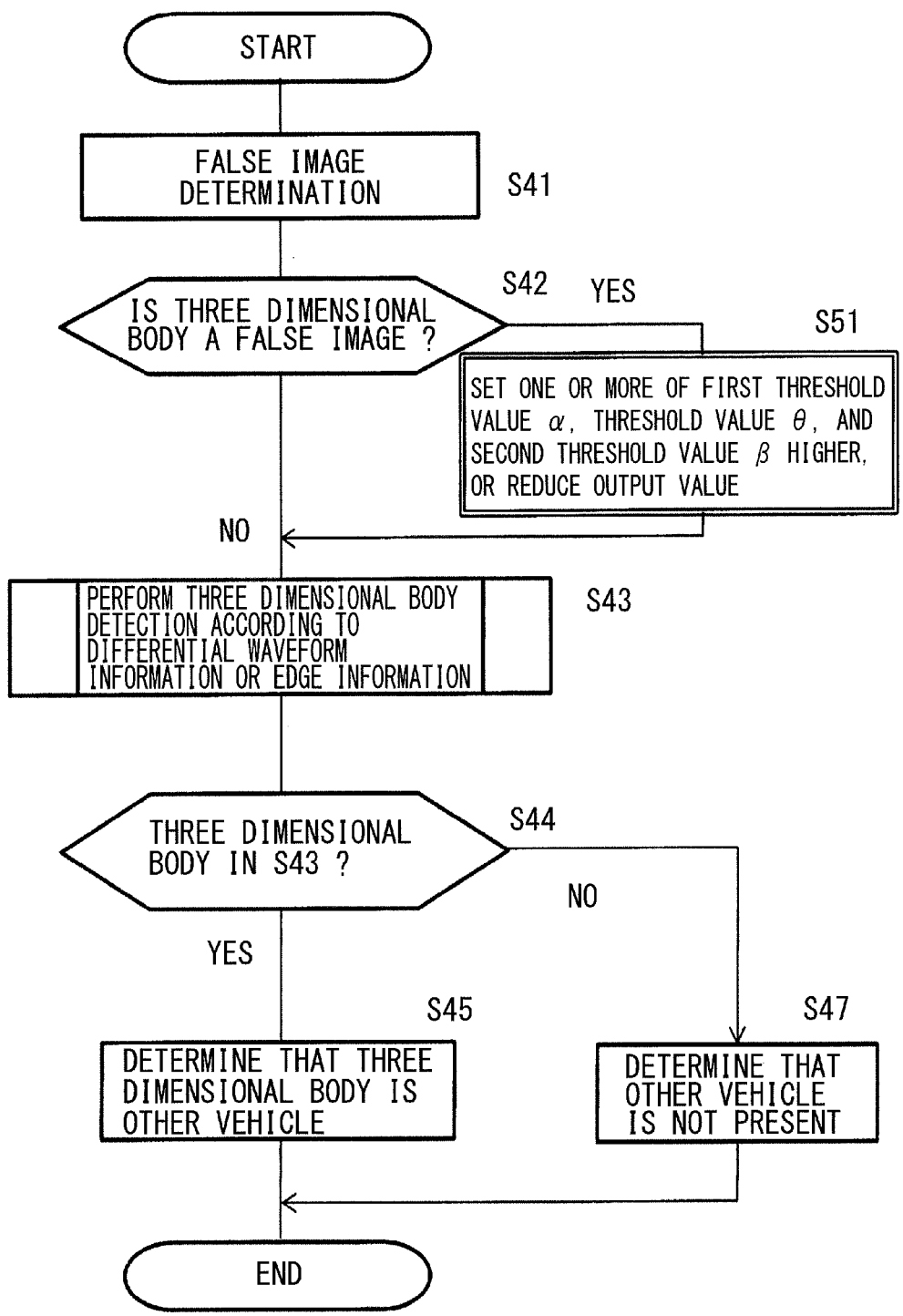
FIG. 36 A second flow chart showing another control procedure for three dimensional body determination that takes into account the presence of a false image.

FIG. 36 shows an example of other processing. If in step 42 it has been determined that a three dimensional body that has been detected is a false image, then the flow of control proceeds to step S51, and the control unit 39 outputs a control command to the three dimensional body detection unit 33 or 37 to the effect that the setting is to be increased for any one or more of the threshold value p relating to the differential between pixel values when generating the differential waveform information, the first threshold value $\alpha$ that is used when determining upon the presence of a three dimensional body from the differential waveform information, the threshold value $\theta$ when generating the edge information, and the second threshold value $\beta$ that is used when determining upon the presence of a three dimensional body from the edge information. As previously described, the first threshold value $\alpha$ is for determining the peaks of the differential waveform $DW_t$ in step S7 of FIG. 23. And the threshold value $\theta$ is a threshold value for determining the normalized value of the sum total of the continuity c of the attributes of the subject points Pa in step S29 of FIG. 29, while the second threshold value $\beta$ is a threshold value for evaluating the amount of edge lines in step 34 of FIG. 30. It should be understood that it would also be acceptable to arrange for the control unit 39, instead of increasing one of these threshold values, to generate a control command to lower the output value that is to be evaluated according to that threshold value, and to output that control command to the three dimensional body detection unit 33 or 37. The remainder of the processing is the same as that shown in FIG. 35.

Figure 37:
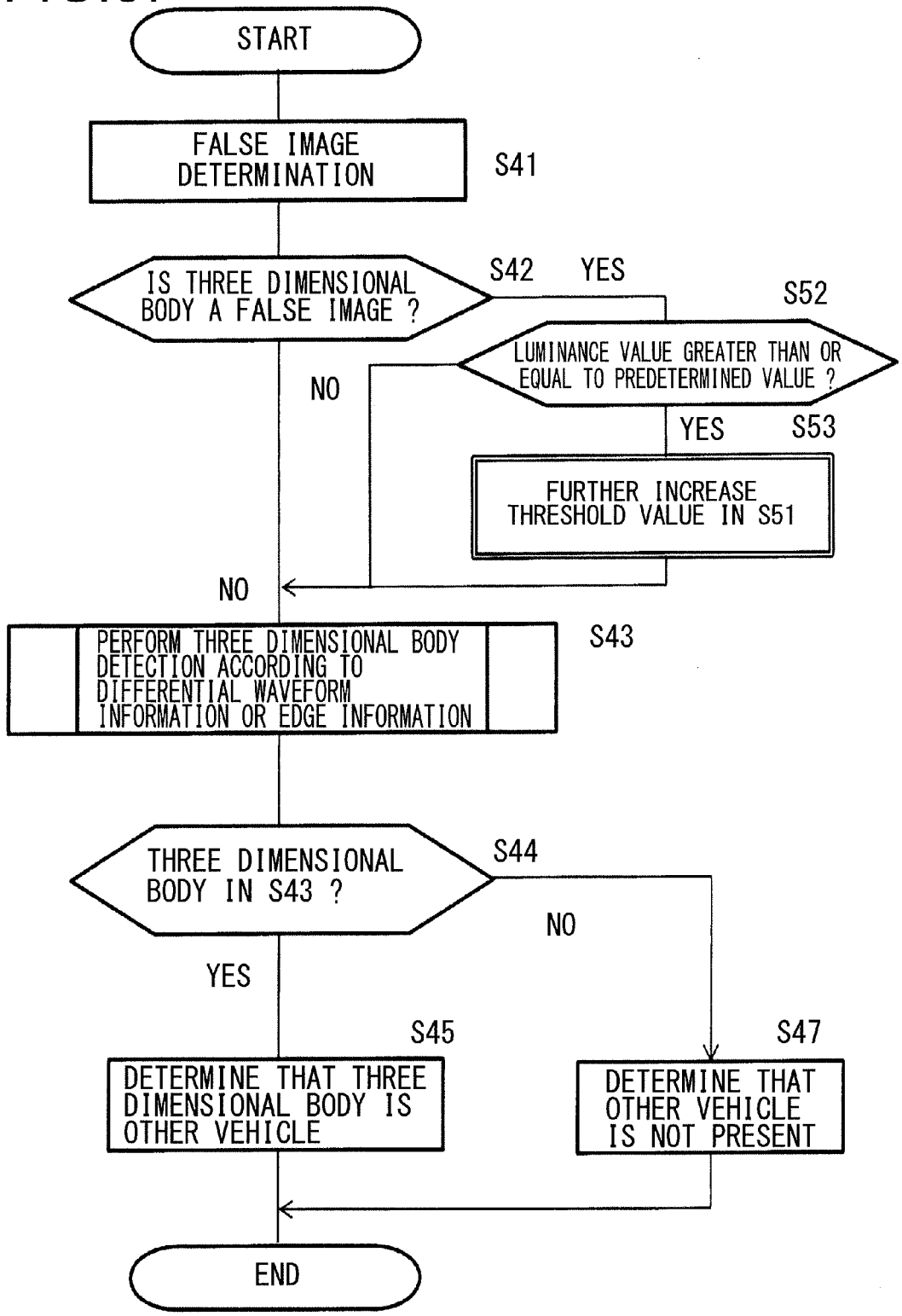
FIG. 37 A third flow chart showing another control procedure for three dimensional body determination that takes into account the presence of a false image.

Furthermore, as shown in FIG. 37, if in step 42 it has been determined that a three dimensional body that has been detected is a false image, then the flow of control is transferred to step S52, in which the control unit 39 determines whether or not the luminance in the detection region A1 or A2 is greater than or equal to a predetermined value. If the luminance in the detection region A1 or A2 is greater than or equal to the predetermined value then it may be arranged for the flow of control to proceed to step S53, in which a control command is generated to further raise the threshold value of step S51 of FIG. 36, and this control command is outputted to the three dimensional body detection unit 33 or 37. It should be understood that it would also be acceptable to arrange for the control unit 39, instead of raising the threshold value, to generate a control command to further lower the output value that is to be evaluated using the threshold value, and to output this control command to the three dimensional body detection unit 33 or 37. The remainder of the processing is the same as that shown in FIG. 35.

Figure 38:
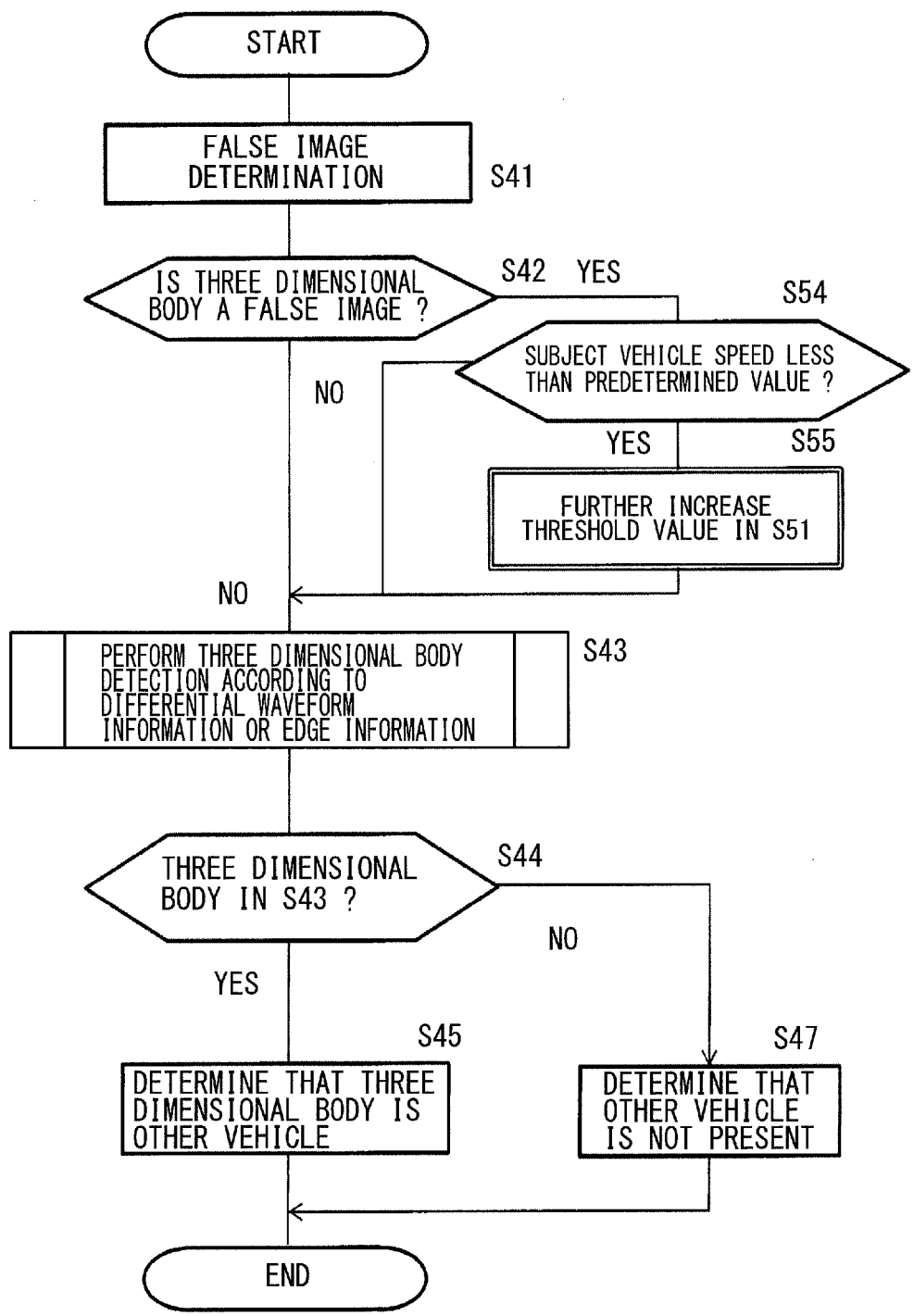
FIG. 38 A fourth flow chart showing another control procedure for three dimensional body determination that takes into account the presence of a false image.

Furthermore, as shown in FIG. 38, if in step 42 it has been determined that a three dimensional body that has been detected is a false image, then the flow of control is transferred to step S54, in which the control unit 39 determines whether or not the shifting speed of the subject vehicle is less than a predetermined value. If the shifting speed of the subject vehicle is less than the predetermined value, then the flow of control proceeds to step S55, in which a control command is generated to raise the threshold value for step S51 of FIG. 36 yet further, and this control command is outputted to the three dimensional body detection unit 33 or 37. It should be understood that, instead of raising the threshold value, the control unit 39 may generate a control command to further lower the output value that is to be evaluated with the threshold value; and then the remainder of the processing is the same as that shown in FIG. 35.

It should be understood that, when the output value is reduced, the control unit 39 outputs a control command to the three dimensional body detection unit 33 that commands lowering and outputting of the value that is obtained by counting the number of pixels in the differential image as seen in a bird's-eye view that exhibit a predetermined differential, and constructing a frequency distribution. The value that is obtained by counting the number of pixels in the differential image as seen in a bird's-eye view that exhibit a predetermined differential and constructing a frequency distribution is the value on the vertical axis of the differential waveform $DW_t$ that is generated in step S5 of FIG. 23. In a similar manner, the control unit 39 may output a control command to the three dimensional body detection unit 37, commanding lowering of the amount of edge information that is detected and outputting thereof. The amount of edge information that is detected is the normalized value of the sum total of the continuities c of the attributes of the subject points Pa in step S29 of FIG. 29, or the amount of edge lines in step 34 of FIG. 30. If it has been determined in the previous cycle of processing that a three dimensional body that has been detected is a false image, then, since it can be decided that a layer of water is formed upon the detection region A1 or A2, in the next cycle of processing, accordingly the control unit 39 is able to output a control command to the three dimensional body detection unit 37 to change the normalized value of the sum total of the continuities c of the attributes of the subject points Pa, or the amount of edge lines, so as to lower it, and accordingly it becomes more difficult for a three dimensional body to be detected.

Figure 39:
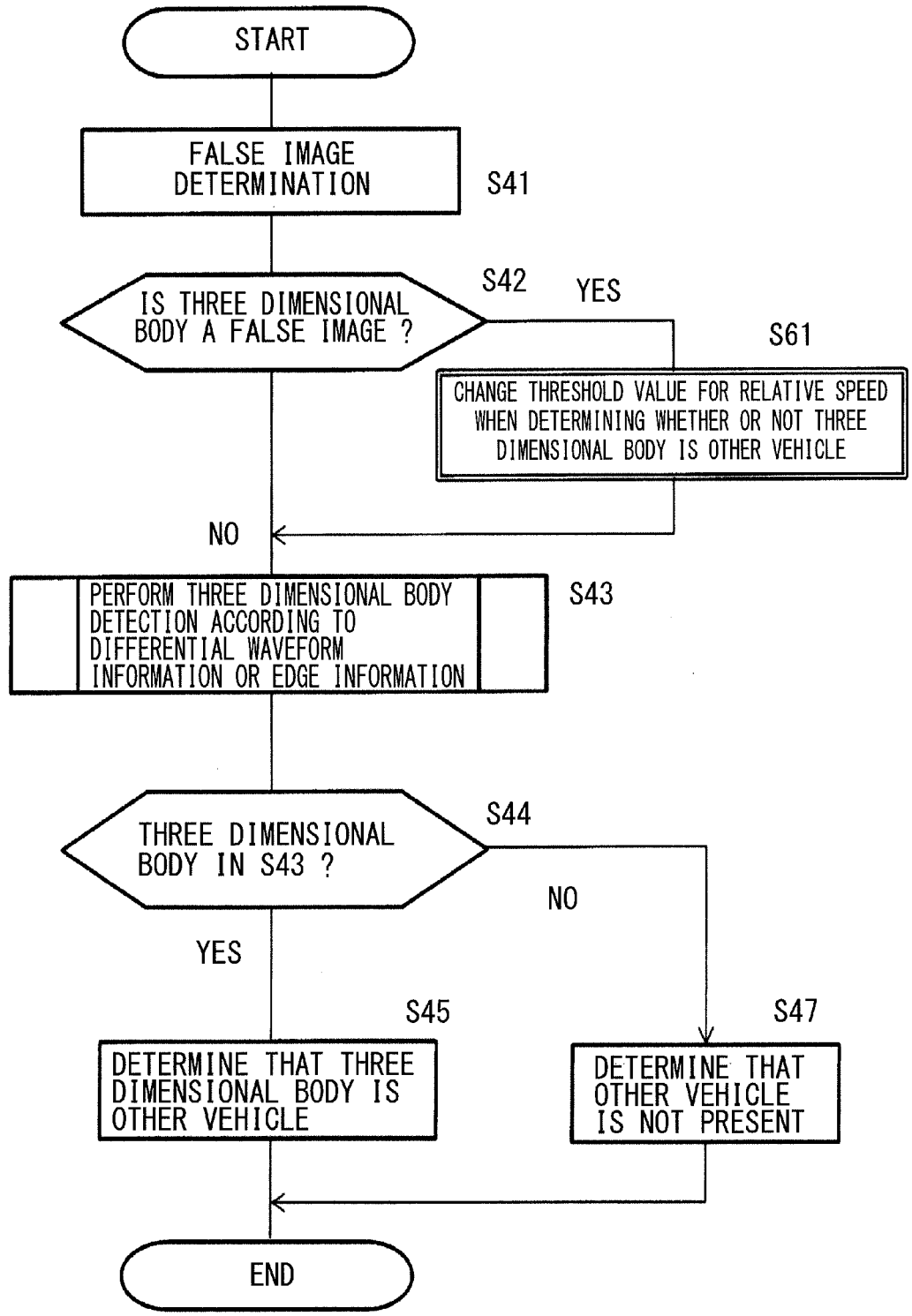
FIG. 39 A fifth flow chart showing another control procedure for three dimensional body determination that takes into account the presence of a false image.

An example of yet further different processing is shown in FIG. 39. If in step 42 it has been determined that a three dimensional body that has been detected is a false image, then the flow of control is transferred to step S61, in which the control unit 39 generates a control command to narrow down the predetermined value range for evaluating the relative shifting speed, and outputs this control command to the three dimensional body detection unit 33 or 37. In this connection, if the relative shifting speed with respect to the subject vehicle of the three dimensional body that has been detected is within the predetermined value range, then the three dimensional body detection unit 33 or 37 sends to the three dimensional body determination unit 34 a detection result to the effect that the three dimensional body is to be taken as being another vehicle or the like that is the subject of detection.

In step S130 of FIG. 5, it is possible for the other vehicle recognition unit 204b of the application execution unit 204 to execute other vehicle recognition processing like that explained above.

According to the first embodiment of the present invention as explained above, the following beneficial operational effects are obtained.

(1) The in-vehicle surrounding environment recognition device 100 recognizes another vehicle that is traveling in the neighborhood of the vehicle on the basis of the photographic image acquired by the camera 1, and detects the relative speed of the other vehicle with respect to this vehicle (step S130). Moreover, the presence or absence of the reflection of a background object from the road surface is determined by the reflection determination unit 203 on the basis of the photographic image (step S180). And, if in step S180 it has been determined that there is a reflection, then the warning output signal from the warning control unit 205 to the warning output unit 3 is stopped (step S200), so that output of a warning by the warning output unit 3 is prevented. At this time, the level of suppression of the output of a warning signal is adjusted (step S160) by the warning prevention adjustment unit 206 on the basis of the relative speed of the other vehicle detected in step S130, and the output of a warning signal is suppressed according to this level of suppression that has been adjusted. Since it is arranged to do this, accordingly it is possible to prevent output of a warning due to erroneous detection of a reflection of a background object from the road surface as a vehicle being outputted at an erroneous timing.

(2) In step S160, the warning prevention adjustment unit 206 is able to adjust the level of suppression of the output of a warning signal by changing the condition for the reflection determination unit 203 to determine upon the presence or absence of the reflection of a background object from the road surface, according to the relative speed of the other vehicle. In concrete terms, adjustment of the level of warning prevention is performed by changing the reference value when determining the presence or absence of the reflection of a background object from the road surface by comparing and correlating the feature amounts of the various regions in step S180. In other words, with the area setting unit 201, the in-vehicle surrounding environment recognition device 100 sets the background regions 34a through 34f and 36a through 36f and the reflection regions 35a through 35f and 37a through 37f in the photographic image 30 acquired by the camera 1 (step S20). And, in step S180, the reflection determination unit 203 compares together the images from the photographic image 30 within the background regions 34a through 34f and 36a through 36f and the images from the photographic image 30 within the reflection regions 35a through 35f and 37a through 37f, and, by determining whether or not their correlation is greater than or equal to a predetermined threshold value, determines upon the presence or absence of a reflection of a background object from the road surface. And in step S160 the threshold value corresponding to the relative speed of the other vehicle is changed; in more concrete terms, adjustment of the level of warning prevention is performed by lowering the threshold value when the relative speed of the other vehicle is within the predetermined range. Since this is done, accordingly it is possible to perform adjustment of the level of warning prevention in a simple and moreover reliable manner. Furthermore, it would also be possible to arrange to relax the condition in step S180 for determining upon the presence or absence of a reflection of a background object, thus making it easier for warning prevention to be performed.

(3) Moreover, the warning prevention adjustment unit 206 is also able to perform adjustment of the level of warning prevention, by changing the condition when calculating the feature amount of each region in step S170. In other words, with this in-vehicle surrounding environment recognition device 100, edges that satisfy the predetermined detection condition are detected by the feature amount calculation unit 202 in each of the images in the background regions 34a through 34f and 36a through 36f, and in each of the images in the reflection regions 35a through 35f and 37a through 37f, and feature amounts according to the edges that have thus been detected are calculated for each of the background regions 34a through 34f and 36a through 36f, and for each of the reflection regions 35a through 35f and 37a through 37f (step S170). And, in step S180, the reflection determination unit 203 determines upon the presence or absence of a reflection of a background object from the road surface by comparing together the feature amounts of the background regions 34a through 34f and 36a through 36f and the feature amounts of the reflection regions 35a through 35f and 37a through 37f. And in step S160 the detection condition corresponding to the relative speed of the other vehicle is changed; in more concrete terms, adjustment of the level of warning prevention is performed by lowering the luminance difference that serves as an edge detection condition when the relative speed of the other vehicle is within the predetermined range. Since this is done, accordingly it is possible to perform adjustment of the level of warning prevention in a simple and moreover reliable manner. Furthermore, it would also be possible to arrange to relax the condition in step S180 for determining upon the presence or absence of a reflection of a background object, thus making it easier for warning prevention to be performed.

Embodiment #2

Next, a second embodiment of the present invention will be explained. In the first embodiment explained in the above description, an example was explained of a case in which, when notification of the presence of a reflection was received from the reflection determination unit 203, warning output was suppressed by stopping the output of a warning output signal from the warning control unit 205 to the warning output unit 3. By contrast, in this embodiment, an example will be explained of a case in which, when notification of the presence of a reflection is received from the reflection determination unit 203, the output of a warning is suppressed by making it more difficult for recognition of another vehicle to be performed in the other vehicle recognition processing executed by the other vehicle recognition unit 204*b* of the application execution unit 204. It should be understood that the structure of the in-vehicle surrounding environment recognition device 100 according to this embodiment, and the control block diagram of the control unit 2 in relation to warning prevention when a reflection from the road surface is present, are both the same as those shown in FIGS. 1 and 4. Due to this, explanation of the above structures will be omitted in the following description.

Figure 40:
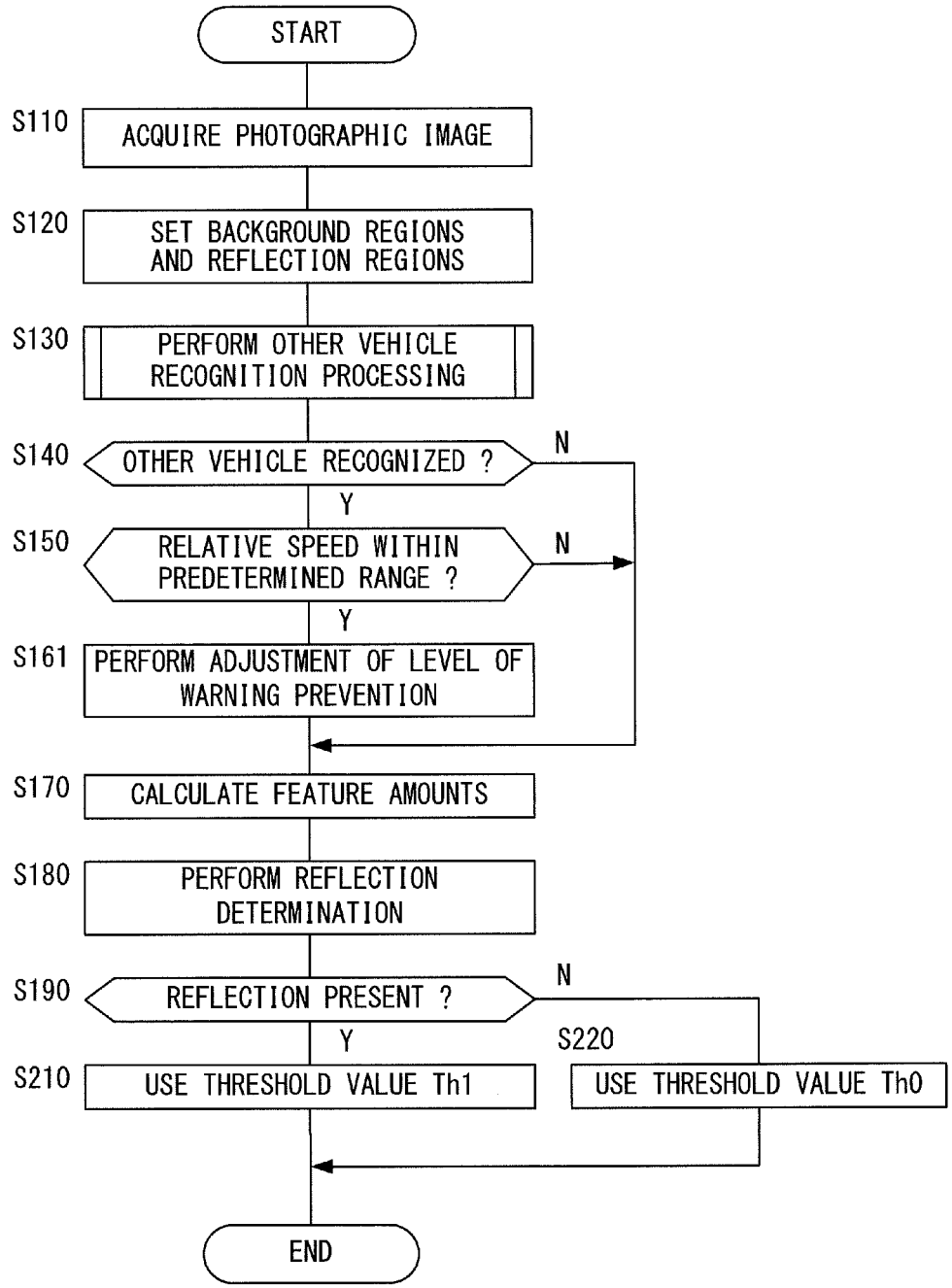
FIG. 40 A flow chart for processing executed in this second embodiment for warning prevention when a reflection from the road surface is present.

FIG. 40 is a flow chart for processing that is executed in this embodiment for warning prevention when a reflection from the road surface is present. In a similar manner to the case for the flow chart of FIG. 5, during execution of the application, the processing shown in this flow chart is executed by the control unit 2 repeatedly on a predetermined processing cycle.

It should be understood that, in the flow chart of FIG. 40, the same step numbers as in FIG. 5 are appended to processing steps that perform the same processing as steps of the FIG. 5 flow chart. In the following, explanation of such processing steps whose step numbers are the same as those of steps in FIG. 5 is omitted, provided that such explanation is not particularly required.

In step S161, the control unit 2 performs adjustment of the level of warning prevention by the warning prevention adjustment unit 206. Here, the level of warning prevention is adjusted by any one of the methods (A), (B), and (C) described below, so that, when the relative speed of the other vehicle is within a predetermined range, it becomes easier for warning prevention to be performed as compared to when this is not the case.

(A) Changing the Other Vehicle Recognition Condition

In this method, in step S130 of the other vehicle recognition processing of the next and subsequent cycles, the other vehicle recognition condition is changed when it has been determined that there is a reflection of a background object from the road surface. In other words, if differential waveform information is acquired as image information values on the basis of the images within the detection regions that are provided within the photographic image and, on the basis thereof, another vehicle is recognized by execution of three dimensional body detection with the differential waveform information as described above, then the threshold value for determining from the differential waveform $DW_t$ whether or not a three dimensional body is present is increased; in concrete terms, the value of the first threshold value α that is used in the determination of step S7 of FIG. 23 is increased. Or, also, edge information that serves as image information values is acquired on the basis of the images within the detection regions that are provided within the photographic image, and if, on the basis thereof, another vehicle is recognized by execution of three dimensional body detection with the edge information as described above, then the threshold value for determining whether a subject line is an edge line or not is increased; in concrete terms, the value of the threshold value θ in Equation (3) is increased. It is possible to vary the other vehicle recognition condition by adjusting these threshold values.

Or, instead of performing adjustment of the threshold value in the detection condition for the three dimensional body as described above, it would also be acceptable to arrange to change the condition when acquiring the image information values. In other words, if the differential waveform information is acquired as the image information values on the basis of the images in the detection regions provided in the photographic image and another vehicle is recognized by performing three dimensional body detection according to the differential waveform information described above on the basis thereof, then the threshold value for obtaining the differential image $PD_t$ that is used for generating the differential waveform $DW_t$ is increased; in concrete terms, the value of the threshold value p explained with reference to FIG. 16(*b*) is increased. Or, also, if the edge information is acquired as the image information values on the basis of the images in the detection regions provided in the photographic image and another vehicle is recognized by performing three dimensional body detection according to the edge information described above on the basis thereof, then the threshold value for assigning attributes to the subject points is increased; in concrete terms, the value of the threshold value t in Equation (1) is increased. It is possible to change the other vehicle recognition condition by adjusting these threshold values as well.

According to the methods explained above, it is possible to enhance the level of suppression of warning output by making it more difficult for another vehicle to be recognized by making the condition in step S130 for recognizing another vehicle more stringent. Due to this, the level of warning prevention is adjusted so that it becomes more easy for warning prevention to be performed if the relative speed of another vehicle is within the predetermined range, as compared to when this is not the case. It should be understood that it would be acceptable to perform either adjustment of the threshold value in the three dimensional body detection condition described above, or adjustment of the threshold value in the image information value acquisition condition described above, individually; or it would also be acceptable to perform both of these adjustments at the same time.

(B) Changing the Reflection Determination Condition

In this method, the condition for determining the presence or absence of the reflection of a background object from the surface of the road is changed by using a similar technique to that previously explained in connection with the first embodiment. In other words, the threshold value for determining correlation between the images of FIG. 6 in the background regions 34*a* through 34*f* and the reflection regions 35*a* through 35*f*, and the background regions 36*a* through 36*f* and the reflection regions 37*a* through 37*f*, is lowered. Or, the luminance difference in the edge detection condition for the background regions 34*a* through 34*f* and the reflection regions 35*a* through 35*f*, and the background regions 36*a* through 36*f* and the reflection regions 37*a* through 37*f*, may be lowered.

According to a method like that explained above, by relaxing the condition in step S180 for determining upon the presence or absence of the reflection of a background object from the road surface, it is possible to enhance the level of suppression of warning output so as to make it easier to obtain a determination result that such a reflection is present. Due to this, the level of warning prevention is adjusted so that it becomes more easy for warning prevention to be performed if the relative speed of another vehicle is within the predetermined range, as compared to when this is not the case. It should be understood that it would be acceptable to perform either adjustment of the threshold value for the correlation described above, or adjustment of the edge detection condition, individually; or it would also be acceptable to perform both of these adjustments at the same time.

(C) Prolongation of the Warning Prevention Interval

With this method, the warning prevention interval is prolonged when it has been determined that there is no reflection of a background object from the road surface. In other words if, in the reflection determination in step S180, it has been determined that there is no reflection of a background object from the road surface, and subsequently it has been continuously determined that no reflection is present, then it is arranged to prolong the warning suppression, even after the determination result that no reflection is present has been obtained. Due to this, the level of warning prevention is adjusted so that it becomes easier for warning prevention to be performed when the relative speed of the other vehicle is within the predetermined range, as compared with when this is not the case. It should be understood that it would be acceptable to arrange for the interval over which warning prevention is prolonged to be the interval from when it is determined that a reflection of a background object is present while the relative speed of the other vehicle continues to be within the predetermined range; or, it would also be acceptable to arrange for this interval to be a predetermined time period, or to be until the subject vehicle has traveled through a predetermined distance.

In step S161, the level of warning prevention may be adjusted by using at least one of the methods (A) through (C) explained above. It should be understood that it would be acceptable to arrange to use only one of the methods (A) through (C) above, by itself; or, alternatively, it would also be acceptable to arrange to use a plurality thereof in combination, as appropriate.

And in step S190 the control unit 2 determines upon the presence or absence of the reflection of a background object from the road surface from the result of reflection determination in step S180, in a similar manner to the case with the flow chart of FIG. 5 explained above in connection with the first embodiment. If it has been determined in step S180 that there is a reflection of a background object from the road surface either leftward and rearward of the vehicle or rightward and rearward of the vehicle or both, then the flow of control is transferred from step S190 to step S210. On the other hand, if it has been determined in step S180 that there is no reflection of a background object from the road surface either leftward and rearward of the vehicle or rightward and rearward of the vehicle, then the flow of control is transferred from step S190 to step S220.

If the flow of control has proceeded from step S190 to step S210, then in step S210 the control unit 2 employs a threshold value Th1 for the other vehicle recognition processing in step S130 of the next and subsequent cycles of processing. On the other hand, if the flow of control has proceeded from step S190 to step S220, then in step S220 the control unit 2 employs a threshold value Th0 for the other vehicle recognition processing in step S130 of the next and subsequent cycles of processing. Here, Th1>Th0. When step S210 or S220 has been executed, the control unit 2 terminates the flow chart of FIG. 40.

It should be understood that the threshold values Th1 and Th0 described above are values that correspond to the threshold value in the three dimensional body detection condition that is used in method (A) in step S161 described above. In other words, if the differential waveform information is acquired as the image information values on the basis of the images within the detection regions that have been set in the photographic image and another vehicle is recognized by execution of three dimensional body detection according to the differential waveform information as previously described, then either of the values Th1 or Th0 may be employed as the first threshold value α that is used in the determination of step S7 of FIG. 23. Moreover, if the edge information may be acquired as the image information values on the basis of the images within the detection regions that have been set in the photographic image and another vehicle is recognized by execution of three dimensional body detection according to the edge information as previously described, then either of the values Th1 or Th0 may be employed as the threshold value θ in Equation (3).

As has been explained above, if it has been determined in the reflection determination of step S180 that a reflection of a background object from the surface of the road is present, then in step S210 the threshold value Th1 that is higher than the threshold value Th0 when no reflection is present is employed as the threshold value for other vehicle recognition processing. In this manner, it is possible to suppress warning output so as to make it more difficult for another vehicle to be recognized, by making the condition in step S130 for recognition of another vehicle more stringent. It should be understood that, if the method (A) described above is employed in step S161, then, when the relative speed of the other vehicle is within the predetermined range, the output of a warning is further suppressed by raising the threshold value Th1 when it has been determined that this is a reflection of a background object from the road surface, or by making more stringent the image information value acquisition condition when it has been determined that this is a reflection of a background object from the road surface.

Figure 41:
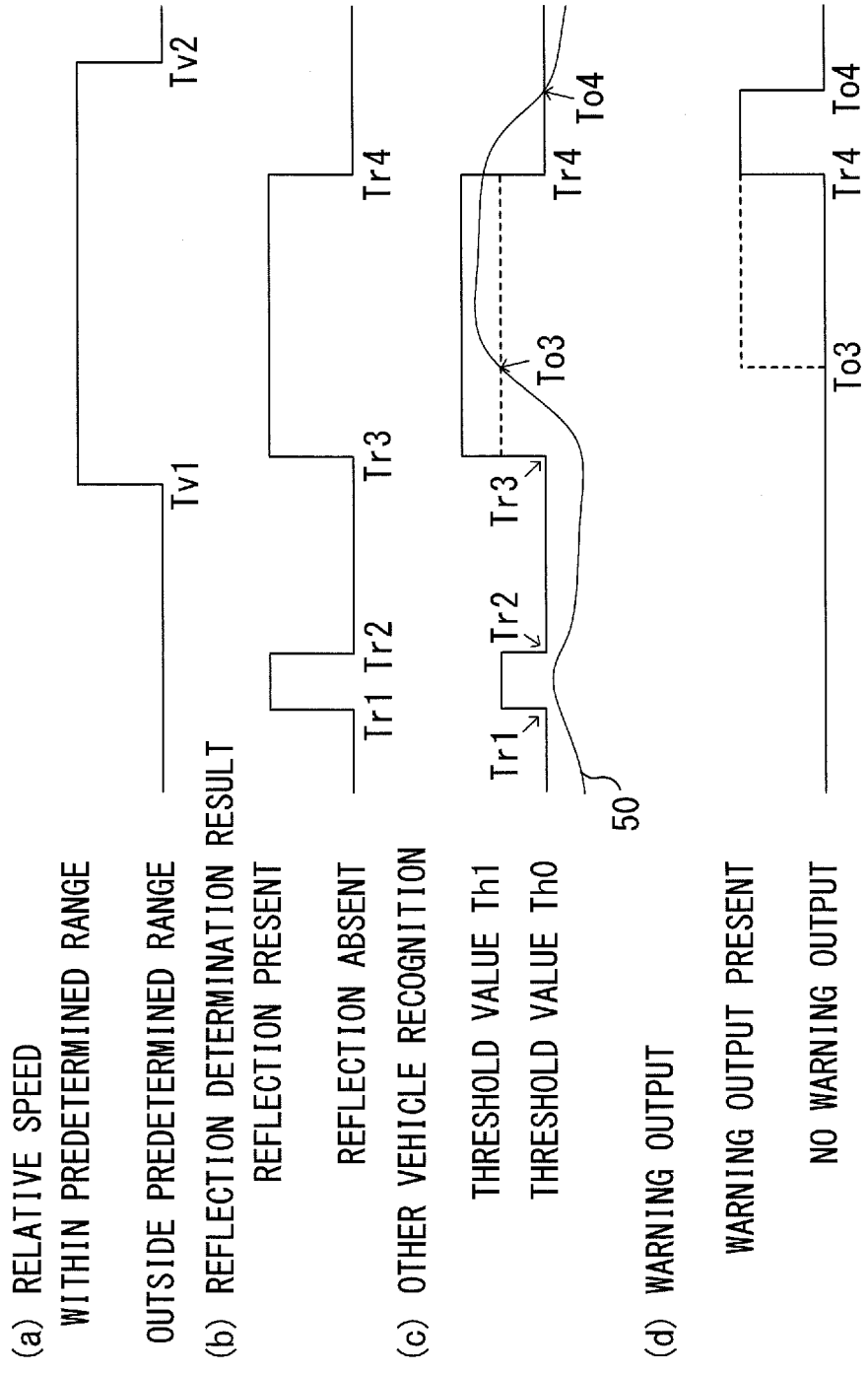
FIG. 41 A figure for explanation of the beneficial effects of reducing erroneous warning that are obtained according to the second embodiment, and shows an example of a case in which the level of warning prevention is adjusted using a method (A), by adjusting a threshold value that is a condition for detection of a three dimensional body.

FIGS. 41 through 45 are figures for explanation of the beneficial effects of reducing erroneous warnings that are obtained by the in-vehicle surrounding environment recognition device 100 of this embodiment as explained above. In these figures, examples are shown of how the output timing of warning from the warning output unit 3 changes due to adjustment of the level of suppression of warning output performed by the warning prevention adjustment unit 206, under the supposition that the relative speed of another vehicle as shown in FIG. 41(*a*) through FIG. 45(*a*) respectively changes in a similar manner to that in FIG. 12 as explained in connection with the first embodiment.

Figure 42:
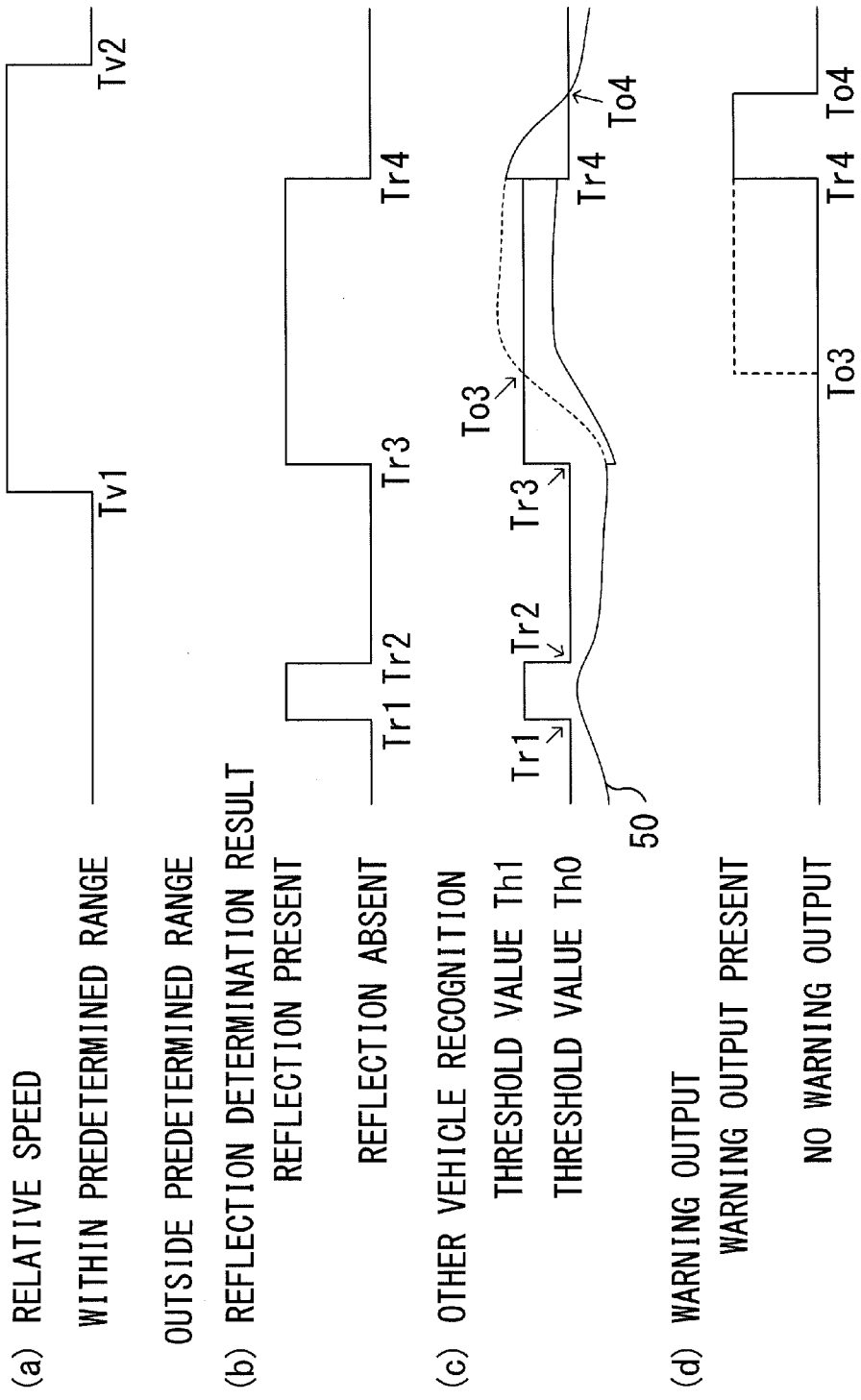
FIG. 42 A figure for explanation of the beneficial effects of reducing erroneous warning that are obtained according to the second embodiment, and shows an example of a case in which the level of warning prevention is adjusted using the method (A), by adjusting a threshold value that is a condition for acquisition of image information values.

FIG. 41 and FIG. 42 both show examples of cases when the level of warning prevention in step S161 of FIG. 40 has been adjusted by using the method (A) among the methods (A) through (C) described above. FIG. 41 is an example of a case in which the threshold value in the three dimensional body detection condition, in other words the threshold value Th1 for other vehicle recognition that corresponds to the first threshold value α or to the threshold value θ previously described, is adjusted; while FIG. 42 is an example of a case in which the threshold value in the image information value acquisition condition, in other words the previously described threshold value p or the previously described threshold value t is adjusted.

In FIG. 41, the warning prevention adjustment unit 206 suppresses warning output by changing the threshold value for recognition of another vehicle from Th0 to Th1 during the interval from the time point Tr1 at which it has been determined that a reflection of a background object from the road surface is present to the time point Tr2, and during the interval from the time point Tr3 to the time point Tr4, as shown in FIG. 41(*c*). Furthermore, during the interval from the time point Tr3 until the time point Tr4, adjustment of the level of suppression of warning output is performed by raising the threshold value Th1, since the relative speed of the other vehicle is within the predetermined range. It should be understood that the portion shown by the broken line in FIG. 41(*c*) shows the threshold value Th1 when adjustment to the level of suppression of warning output is not being performed.

Due to adjustment of the level of suppression of warning output as described above and due to the fact that the condition for recognition of another vehicle is made more stringent, it becomes more difficult for another vehicle to be recognized by the other vehicle recognition unit 204b of the application execution unit 204. As a result, as for example shown in FIG. 41(*c*), the timing at which the other vehicle starts to be recognized is changed from the time point To3 at which the image information value 50 exceeds the threshold value Th1 before adjustment, to the time point Tr4 at which it is determined that reflection is absent and suppression of warning output is terminated. It should be understood that the timing at which the image information value 50 drops below the threshold value Th0 and the recognition of the other vehicle ends remains at the time point To4, and is not changed. Due to this, as shown in FIG. 41(*d*), the interval during which a warning is outputted is shortened to the interval from the time point Tr4 to the time point To4. It should be understood that the portion shown in FIG. 41(*d*) by the broken line is the timing of warning output when adjustment of the level of suppression of warning output is not performed, and shows that, in addition to the interval described above, warning output is also performed during the interval from the time point To3 to the time point Tr4.

As has been explained above, during the interval from the time point Tr3 to the time point Tr4 in which the relative speed of the other vehicle is within the predetermined range and moreover it has been determined that a reflection is present, the level of suppression of warning output is adjusted by changing the threshold value Th1 for recognition of another vehicle. As a result, it is possible to suppress warning output during the interval from the time point To3 to the time point Tr4.

In FIG. 42, during the interval from the time point Tr1 to the time point Tr2 and during the interval from the time point Tr3 to the time point Tr4, in which it has been determined that a reflection of a background object from the road surface is present, the warning prevention adjustment unit 206 suppresses warning output by changing the threshold value for recognition of another vehicle from Th0 to Th1, in a similar manner to the case in FIG. 41. Moreover, since the relative speed of the other vehicle is within the predetermined range during the interval from the time point Tr3 to the time point Tr4, accordingly adjustment of the level of suppression of warning output is performed by making the condition when acquiring the image information value more stringent.

By doing as described above and thereby adjusting the level of suppression of warning output, and by thus making the condition for recognition of another vehicle more stringent, the image information value 50 that is obtained is reduced, as for example shown in FIG. 42(*c*), so that it becomes more difficult for another vehicle to be recognized by the other vehicle recognition unit 204b of the application execution unit 204. It should be understood that the portion in the image information value 50 in FIG. 42(*c*) shown by the broken line shows the value when adjustment of the level of suppression of warning output is not performed. As a result, as for example shown in FIG. 42(*c*), the timing at which recognition of the other vehicle is started is changed from the time point To3 at which the information value 50 exceeds the threshold value Th1, to the time point Tr4 at which it is determined that no reflection is present and suppression of warning output is ended. Due to this, as shown in FIG. 42(*d*), the interval during which warning output is performed is shortened to the interval from the time point Tr4 to the time point To4, in a similar manner to the case in FIG. 41. It should be understood that the portion shown by the broken line in FIG. 42(*d*) is the timing of warning output when adjustment of the level of suppression of warning output is not performed, and shows that, in addition to the interval described above, warning output is also performed during the interval from the time point To3 to the time point Tr4.

As has been explained above, during the interval from the time point Tr3 to the time point Tr4 in which the relative speed of the other vehicle is within the predetermined range and moreover it has been determined that a reflection is present, the level of suppression of warning output is adjusted by making the condition when acquiring the image information value 50 for recognition of the other vehicle more stringent. As a result, it is possible to suppress warning output during the interval from the time point To3 to the time point Tr4.

FIG. 43 shows an example of a case when the level of warning prevention in step S161 of FIG. 40 has been adjusted by using the method (B) among the methods (A) through (C) described above.

In FIG. 43, during the interval from the time point Tv1 to the time point Tv2 in which the relative speed of the other vehicle shown in FIG. 43(*a*) is within the predetermined range, in a similar manner to the case with FIG. 12 explained in connection with the first embodiment, the warning prevention adjustment unit 206 performs adjustment of the level of suppression of warning output by relaxing the condition for determining upon the presence or absence of a reflection of a background object from the road surface. Due to this, it becomes easier for the reflection determination unit 203 to obtain a determination result that a reflection is present. As a result, as for example shown in FIG. 43(*b*), the timing at which it is determined that no reflection is present is shifted from the time point Tr4 to the time point Tr4a, so that the interval in which a determination result that a reflection is present is lengthened.

When, as described above, the length of the interval in which the determination result that a reflection is present is obtained is increased, then corresponding thereto, as shown in FIG. 43(*c*), the length of the interval in which warning output is suppressed is also increased by just the same amount. In other words, the timing at which the threshold value for recognition of another vehicle is reduced from Th1 to Th0 is changed from the time point Tr4 to the time point Tr4a. As a result, the timing at which recognition of another vehicle ends is changed from the time point To4 at which the image information value 50 drops below the threshold value Th0 when warning output is not suppressed to the time point To4a at which the image information value 50 drops below the threshold value Th1 when warning output is suppressed. It should be understood that the timing at which the image information value 50 exceeds the threshold value Th1 and recognition of the other vehicle is started remains at the time point To3 and does not change. Due to this, as shown in FIG. 43(*d*), the interval during which warning output is performed is shortened to the interval from the time point To3 to the time point To4a. It should be understood that the portion shown by the broken line in FIG. 43(*d*) is the timing of warning output when adjustment of the level of suppression of warning output is not performed, and shows that, in addition to the interval described above, warning output is also performed during the interval from the time point To4a to the time point To4.

As has been explained above, during the interval from the time point Tv1 to the time point Tv2 in which the relative speed of the other vehicle is within the predetermined range, the level of suppression of warning output is adjusted by relaxing the condition for determination of the presence or absence of the reflection of a background object from the road surface, and, corresponding thereto, the interval in which a determination result that a reflection is present is lengthened. As a result, it is possible to suppress warning output during the interval from the time point To4a to the time point To4.

FIG. 44 shows an example of a case when the level of warning prevention in step S161 of FIG. 40 has been adjusted by using the method (C) among the methods (A) through (C) described above.

In FIG. 44, during the interval from the time point Tr1 to the time point Tr2 and during the interval from the time point Tr3 to the time point Tr4 in which it is determined that a reflection of a background object from the road surface is present, in a similar manner to the cases in FIG. 41 through 43, the warning prevention adjustment unit 206 performs suppression of warning output by changing the threshold value for recognition of another vehicle from Th0 to Th1. Moreover, after the time point Tr4 as well, adjustment of the level of suppression of warning output is performed by prolonging the interval in which the threshold value is set to Th1 to the time point Tv2 while the relative speed of the other vehicle continues to be within the predetermined range. It should be understood that the portion in FIG. 44(c) shown by the broken line shows the timing at which the threshold value is reduced from Th1 to Th0 when adjustment of the level of suppression of warning output is not performed.

By adjusting the level of suppression of warning output as described above, the timing at which the threshold value for recognition of another vehicle is reduced from Th1 to Th0 is changed from the time point Tr4 to the time point Tv2. As a result, in a similar manner to the case with FIG. 43, the timing at which recognition of the other vehicle ends is changed from the time point To4 at which the image information value 50 drops below the threshold value Th0 when warning output is not suppressed to the time point To4a at which the image information value 50 drops below the threshold value Th1 when warning output is suppressed. Due to this, as shown in FIG. 44(d), the interval during which a warning is outputted is shortened to the interval from the time point To3 to the time point To4a. It should be understood that the portion shown by the broken line in FIG. 44(d) is the timing of warning output when adjustment of the level of suppression of warning output is not performed, and shows that, in addition to the interval described above, warning output is also performed during the interval from the time point To4a to the time point To4.

As has been explained above, the level of suppression of warning output is adjusted by performing warning prevention prolongedly during the interval from the time point Tr4 at which determination that a reflection of a background object from the road surface is present ends to the time point Tv2 at which the relative speed of the other vehicle is within the predetermined range. As a result, it is possible to suppress warning output during the interval from the time point To4a until the time point To4.

FIG. 45 shows an example of a case when the level of warning prevention in step S161 of FIG. 40 has been adjusted by using a combination of the methods (A) and (C), among the methods (A) through (C) described above. It should be understood that, in this FIG. 45 example, in the method (A), it is arranged to adjust the threshold value in the three dimensional body detection condition, in other words the first threshold value α or the threshold value θ described above.

In FIG. 45, the warning prevention adjustment unit 206 suppresses warning output by changing the threshold value for recognition of another vehicle from Th0 to Th1 during the interval from the time point Tr1 at which it is determined that the reflection of a background object from the road surface is present until the time point Tr2 and during the interval from the time point Tr3 until the time point Tr4, as shown in FIG. 45(c). Moreover, during the interval from the time point Tr3 to the time point Tr4, since the relative speed of the other vehicle is within the predetermined range, accordingly adjustment of the level of suppression of warning output is performed by raising the threshold value Th1. Furthermore, after the time point Tr4 as well, adjustment of the level of suppression of warning output is performed by prolonging the interval at which the threshold value is held at Th1 until the time point Tv2 while the relative speed of the other vehicle is within the predetermined range. It should be understood that the portion shown by the broken line in (c) shows the threshold value Th1 in the interval from the time point Tr3 to the time point Tr4 when adjustment of the level of suppression of warning output is not performed, and the timing at which the threshold value is lowered from Th1 to Th0 after the time point Tr4 when adjustment of the level of suppression of warning output is not performed.

By the level of suppression of warning output being adjusted as described above, it becomes more difficult for recognition of another vehicle to be performed by the other vehicle recognition unit 204b of the application execution unit 204. As a result, as for example shown in FIG. 45(c), in the interval from the time point Tr3 to the time point Tv2, the image information value 50 no longer exceeds the threshold value Th1 after adjustment, so that recognition of another vehicle ceases to be performed. Due to this, as shown in FIG. 45(d), no warning is outputted in any of the intervals. In other words, it is possible to suppress warning output in all of the intervals. It should be understood that the portion shown by the broken line in FIG. 45(d) is the timing of warning output when adjustment of the level of suppression of warning output is not performed, and shows that warning output is performed during the interval from the time point To3 to the time point To4.

It should be understood that, while a case has been explained in FIG. 45 described above in which the level of warning prevention is adjusted by employing a combination of the method (A) and the method (C), it would also be acceptable to arrange to utilize some other combination. For example, it would also be possible to employ a combination of all of the methods (A) through (C). Moreover it would also be acceptable to arrange to determine which of the methods (A) through (C) is to be employed, or which combination thereof is to be employed, according to the circumstances in which an erroneous warning may be issued, or the like.

According to the second embodiment of the present invention as explained above, the following beneficial operational effects are obtained.

(1) With the application execution unit 204, this in-vehicle surrounding environment recognition device 100 recognizes another vehicle that is traveling in the neighborhood of this vehicle on the basis of the photographic image acquired by the camera 1, and detects the relative speed of the other vehicle with respect to this vehicle (step S130). Moreover, on the basis of the photographic image, the presence or absence of the reflection of a background object from the road surface is detected by the reflection determination unit 203 (step S180). And, if it has been determined in step S180 that a reflection is present, then the threshold value Th1 is employed (step S210), and output of a warning by the warning output unit 3 is suppressed. At this time, the level of suppression of warning signal output is adjusted (step S161) by the warning prevention adjustment unit 206 on the basis of the relative speed of the other vehicle detected in step S130, and the output of a warning signal is suppressed according to this level of suppression that has been adjusted. Since these arrangements are made, accordingly, in a similar manner to the case with the first embodiment, accordingly it is possible to prevent the output of a warning at an erroneous timing due to a reflection of a background object from the road surface being mistakenly detected as being a vehicle.

(2) In step S161, the warning prevention adjustment unit 206 is able to adjust the level of suppression of warning signal output using a method such as the methods (A) through (C) described above. In the case of the method (B), in a similar manner to the case with the first embodiment, it is possible to adjust the level of suppression of output of a warning signal by changing the condition for the reflection determination unit 203 to determine upon the presence or absence of a reflection of a background object from the road surface, according to the relative speed of the other vehicle. In other words, adjustment of the degree of warning prevention is performed by changing the threshold value for the correlation when determining upon the presence or absence of a reflection of a background object from the road surface by comparing and correlating the feature amounts in the various regions in step S180, or by changing the edge detection condition when calculating the feature amount for each region in step S170. Since it is arranged to do this, accordingly it is possible to perform adjustment of the level of warning prevention in a simple, easy, and also reliable manner. Moreover, it would also be possible to arrange to relax the condition for determining upon the presence or absence of the reflection of a background object in step S180, so that it becomes easier for warning prevention to be performed.

(3) And, in the case of the method (A), the warning prevention adjustment unit 206 is able to adjust the level of suppression of output of a warning signal by changing the condition for the application execution unit 204 to recognize another vehicle according to the relative speed of the other vehicle. In other words, with the application execution unit 204, this in-vehicle surrounding environment recognition device 100 recognizes another vehicle by determining whether or not the image information value 50 based upon images within the detection regions that are set in the photographic image exceeds the predetermined threshold value Th0 or Th1. In step S161, this threshold value is changed according to the relative speed of the other vehicle; in more concrete terms, if the relative speed of the other vehicle is within a predetermined range, then adjustment of the level of warning prevention is performed by further increasing the threshold value Th1 during other vehicle recognition. Since it is arranged to do this, accordingly it is possible to perform adjustment of the level of warning prevention in a simple, easy, and also reliable manner. Furthermore, it would also be possible to arrange to make the condition for recognition of the other vehicle in step S130 more stringent, so that it becomes more easy for warning prevention to be performed.

(4) Furthermore, in the case of the method (A), the warning prevention adjustment unit 206 is also able to adjust the level of suppression of output of a warning signal by changing a different condition for the application execution unit 204 to recognize another vehicle according to the relative speed of the other vehicle. In other words, if an image information value based upon an image within a detection region that has been set in the photographic image satisfies a predetermined acquisition condition, then this in-vehicle surrounding environment recognition device 100 detects this image information value with the application execution unit 204 as being a subject for detection, and recognizes another vehicle on the basis of this image information value that has been detected. And in step S161 this detection condition is changed according to the relative speed of the other vehicle; in more concrete terms, if the relative speed of the other vehicle is within the predetermined range, then adjustment of the level of warning prevention is performed by setting the detection condition for the image information value to be more stringent. Since it is arranged to do this, accordingly, in a similar manner to that described above, it is possible to perform adjustment of the level of warning prevention in a simple, easy, and also reliable manner. Furthermore, it would also be possible to arrange to make the condition for recognition of the other vehicle in step S130 more stringent, so that it becomes more easy for warning prevention to be performed.

(5) And, in the case of the method (C), the warning prevention adjustment unit 206 is able to adjust the level of suppression of output of a warning signal by performing the suppression of output of a warning signal prolongedly according to the relative speed of the other vehicle, when it has been determined by the reflection determination unit 203 that a reflection of a background object from the road surface is present, and subsequently it has been determined that no such reflection of a background object from the road surface is present. In more concrete terms, adjustment of the level of warning prevention is performed by prolonging the suppression of the output of a warning signal while the relative speed of the other vehicle continues to be within the predetermined range, or for a predetermined time period. Since it is arranged to do this, accordingly, in a similar manner to that described above, it is possible to perform adjustment of the level of warning prevention in a simple, easy, and also reliable manner. Furthermore, it would also be possible to arrange to make the condition for recognition of the other vehicle in step S130 more stringent, so that it becomes more easy for warning prevention to be performed.

It should be understood that while, in the embodiments explained above, it was arranged to perform adjustment of the level of warning prevention according to the condition that the relative speed of the other vehicle was within the predetermined range, it would also be acceptable to employ some other condition relating to the relative speed of the other vehicle. For example, it would be possible to check the fluctuations of the relative speed of the other vehicle (i.e. to check the stability of that relative speed), and to perform adjustment of the level of warning prevention upon the condition that this stability is within a predetermined range. Or it would also be acceptable to employ a combination of the two conditions above.

Furthermore while, in the embodiments described above, it was arranged for the camera 1 to photograph the road surface behind the vehicle, it would also be acceptable to arrange for the camera 1 to photograph the road surface in front of the vehicle. The photographic range of the camera 1 may be set as desired, provided that it is possible to photograph the road surface around the vehicle.

The various embodiments and variant embodiments described above are only examples; the present invention is not to be considered as being limited by the details thereof, provided that the essential features of the present invention are not departed from.

The content of the disclosure of the following application, upon which priority is claimed, is incorporated herein by reference:

Japanese Patent Application No. 2012-167603 (filed on Jul. 27, 2012).

REFERENCE SIGNS LIST

1: camera
2: control unit
3: warning output unit
4: operational state notification unit
100: in-vehicle surrounding environment recognition device
201: area setting unit
202: feature amount calculation unit
203: reflection determination unit
204: application execution unit
205: warning control unit
206: warning prevention adjustment unit

The invention claimed is:

1. An in-vehicle surrounding environment recognition device, comprising:
a photographic unit that photographs a road surface around a vehicle and acquires a photographic image;
an application execution unit that recognizes another vehicle that is traveling near the vehicle on the basis of the photographic image acquired by the photographic unit, and detects a relative speed of the other vehicle with respect to the vehicle;
a reflection determination unit that, on the basis of the photographic image, determines upon presence or absence of a reflection of a background object from the road surface;
a warning control unit that controls output of a warning signal on the basis of the result of recognition of the other vehicle by the application execution unit; and
a warning prevention adjustment unit that suppresses output of the warning signal on the basis of the relative speed of the other vehicle, if it has been determined by the reflection determination unit that there is the reflection of the background object from the road surface, and wherein
the warning prevention adjustment unit adjusts a level of suppression of output of the warning signal by changing a condition for the reflection determination unit to determine upon the presence or absence of the reflection of the background object from the road surface, according to the relative speed of the other vehicle.

2. An in-vehicle surrounding environment recognition device according to claim 1, further comprising an area setting unit that sets a background region and a reflection region in the photographic image, and wherein:
the reflection determination unit determines upon the presence or absence of the reflection of the background object from the road surface by comparing an image within the background region in the photographic image, and an image within the reflected region in the photographic image, and by determining whether or not their correlation is greater than or equal to a predetermined threshold value; and the warning prevention adjustment unit adjusts the level of suppression of output of the warning signal by changing the threshold value according to the relative speed of the other vehicle.

3. An in-vehicle surrounding environment recognition device according to claim 1, further comprising:
an area setting unit that sets a background region and a reflection region in the photographic image; and
a feature amount calculation unit that detects edges that satisfy a predetermined detection condition, both in an image within the background region in the photographic image, and in an image within the reflection region in the photographic image, and that calculates feature amounts for both of the background region and the reflection region corresponding to the edges that have been detected therein, and wherein:
the reflection determination unit determines upon the presence or absence of the reflection of the background object from the road surface by comparing the feature amount of the background region and the feature amount of the reflection region; and
the warning prevention adjustment unit adjusts the level of suppression of output of the warning signal by changing the detection condition according to the relative speed of the other vehicle.

4. An in-vehicle surrounding environment recognition device, comprising:
a photographic unit that photographs a road surface around a vehicle and acquires a photographic image;
an application execution unit that recognizes another vehicle that is traveling near the vehicle on the basis of the photographic image acquired by the photographic unit, and detects a relative speed of the other vehicle with respect to the vehicle;
a reflection determination unit that, on the basis of the photographic image, determines upon presence or absence of a reflection of a background object from the road surface;
a warning control unit that controls output of a warning signal on the basis of the result of recognition of the other vehicle by the application execution unit; and
a warning prevention adjustment unit that suppresses output of the warning signal on the basis of the relative speed of the other vehicle, if it has been determined by the reflection determination unit that there is the reflection of the background object from the road surface, and wherein
the warning prevention adjustment unit adjusts the level of suppression of output of the warning signal by changing a condition for the application execution unit to recognize the other vehicle according to the relative speed of the other vehicle.

5. An in-vehicle surrounding environment recognition device according to claim 4, wherein:
the application execution unit recognizes the other vehicle by making a determination as to whether or not an image information value based upon an image within a detection region set in the photographic image is greater than or equal to a predetermined threshold value; and
the warning prevention adjustment unit adjusts the level of suppression of output of the warning signal by changing the threshold value according to the relative speed of the other vehicle.

6. An in-vehicle surrounding environment recognition device according to claim 4, wherein:

the application execution unit, if an image information value based upon an image within a detection region set in the photographic image satisfies a predetermined detection condition, detects this image information value as being a subject for detection, and recognizes the other vehicle on the basis of the image information value that has been detected; and the warning prevention adjustment unit adjusts the level of suppression of output of the warning signal by changing the detection condition according to the relative speed of the other vehicle.

7. An in-vehicle surrounding environment recognition device according to claim 1, wherein, when the reflection determination unit has determined that there is the reflection of the background object from the road surface, and subsequently has determined that there is no reflection of the background object from the road surface, the warning prevention adjustment unit adjusts the level of suppression of output of the warning signal by performing the suppression of output of the warning signal prolongedly according to the relative speed of the other vehicle.

8. An in-vehicle surrounding environment recognition device according to claim 1, wherein the warning prevention adjustment unit changes the level of suppression of output of the warning signal according to whether the relative speed of the other vehicle satisfies or does not satisfy a predetermined speed condition.

9. An in-vehicle surrounding environment recognition device according to claim 8, wherein the speed condition includes at least one of the relative speed of the other vehicle being within a predetermined range, and fluctuation of the relative speed of the other vehicle being within a predetermined range.

10. An in-vehicle surrounding environment recognition device, comprising:

a photographic unit that photographs a road surface around a vehicle and acquires a photographic image;

an application execution unit that recognizes another vehicle that is traveling near the vehicle on the basis of the photographic image acquired by the photographic unit; and a reflection determination unit that distinguishes a background region and a reflection region of the photographic image, and determines upon presence or absence of a reflection of a background object from the road surface on the basis of correlation between image characteristics of those regions, and wherein, if it has been determined by the reflection determination unit that the reflection of the background object from the road surface is present, recognition of the other vehicle by the application execution unit is suppressed.

* * * * *